(12) United States Patent
Wada et al.

(10) Patent No.: US 6,633,436 B2
(45) Date of Patent: Oct. 14, 2003

(54) OPTICAL SYSTEM, PROJECTION OPTICAL SYSTEM, IMAGE PROJECTION APPARATUS HAVING IT, AND IMAGE PICKUP APPARATUS

(75) Inventors: Ken Wada, Tochigi-ken (JP); Saburo Sugawara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 171 days.

(21) Appl. No.: 09/790,171

(22) Filed: Feb. 21, 2001

(65) Prior Publication Data

US 2001/0050818 A1 Dec. 13, 2001

(30) Foreign Application Priority Data

Feb. 23, 2000 (JP) .................................... 2000-045793
Jun. 5, 2000 (JP) .................................... 2000-167493

(51) Int. Cl.[7] ............................................ G02B 15/177
(52) U.S. Cl. ...................... 359/681; 359/676; 359/680; 359/682; 359/683
(58) Field of Search .................. 359/676, 677, 359/678, 679, 680, 681, 682, 683, 684, 685

(56) References Cited

U.S. PATENT DOCUMENTS 4,662,723 A * 5/1987 Imai ............................ 359/680
5,847,875 A * 12/1998 Kodama et al. ............. 359/557
6,285,509 B1 * 9/2001 Nakayama et al. .......... 359/676
2002/0176058 A1 * 11/2002 Yasui et al. .................. 353/100

FOREIGN PATENT DOCUMENTS

| JP | 10-186235 | 7/1998 |
| JP | 10-268193 | 12/1999 |
| JP | 11-095098 | 6/2000 |

* cited by examiner

*Primary Examiner*—Scott J. Sugarman
*Assistant Examiner*—Deborah Raizen
(74) *Attorney, Agent, or Firm*—Morgan & Finnegan, L.L.P.

(57) ABSTRACT

A projection lens of the following structure was invented for the purpose of providing a bright projection optical system with the F-number of approximately 2 or lower while maintaining good optical characteristics, in an image display apparatus. The projection lens is constructed of six lens units, a first lens unit L1 of a negative optical power, a second lens unit L2 of a positive optical power, a third lens unit L3 of a positive optical power, a fourth lens unit L4 of a negative optical power, a fifth lens unit L5, and a sixth lens unit L6 of a positive optical power, in the order named from the enlargement conjugate side, and four lens units (L2 to L5) out of the lens units move toward the enlargement conjugate side during zooming from the wideangle extreme to the telephoto extreme.

40 Claims, 49 Drawing Sheets

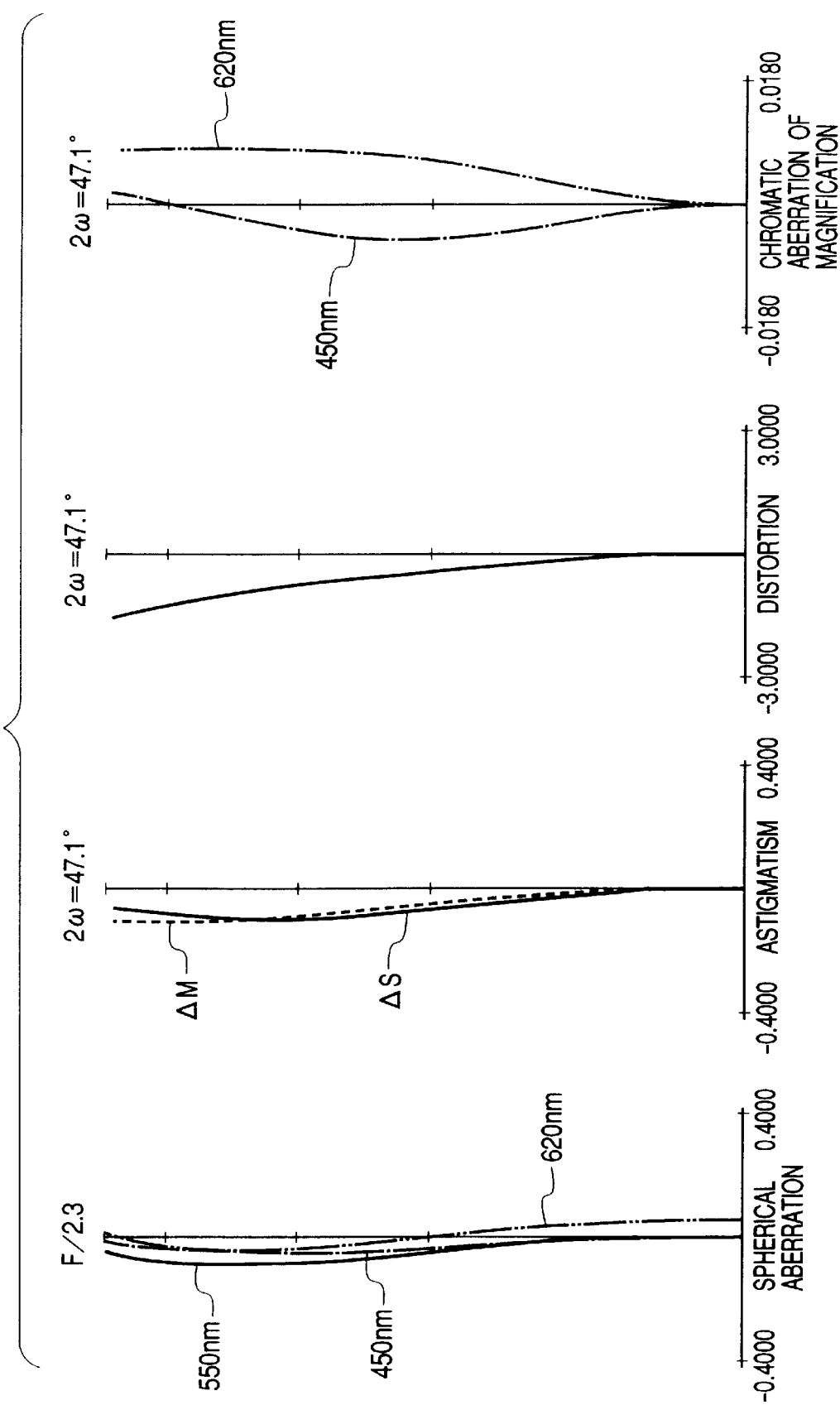

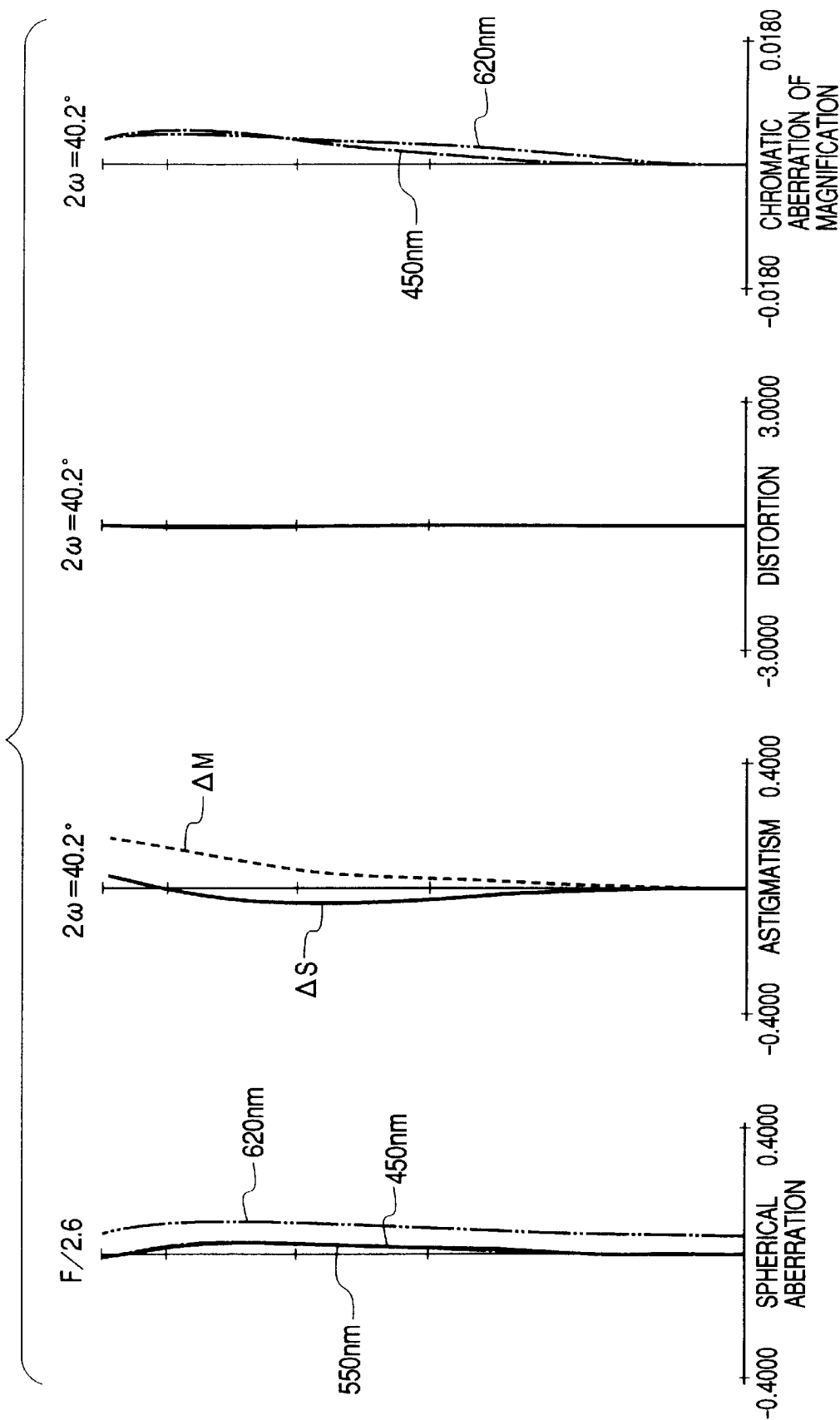

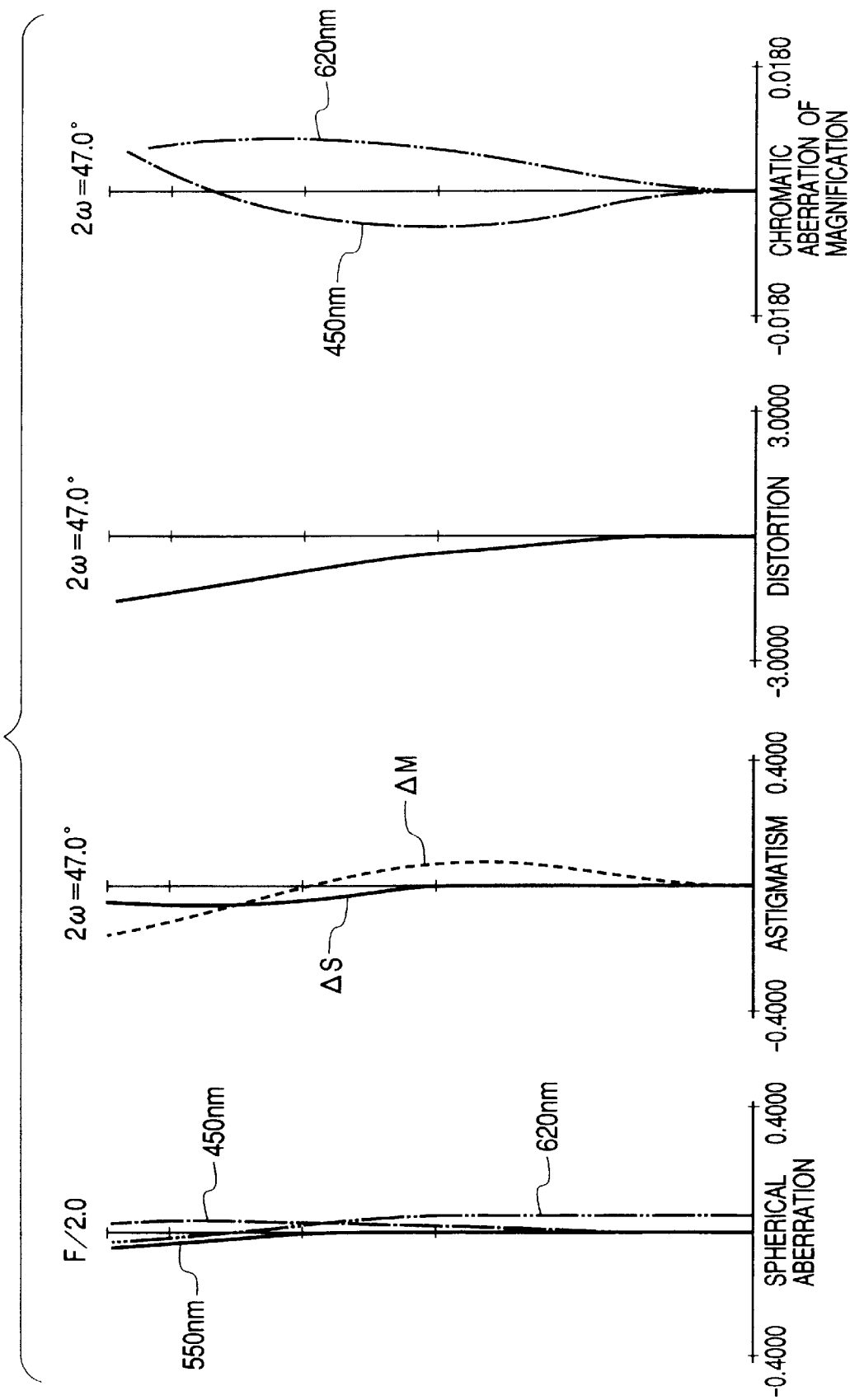

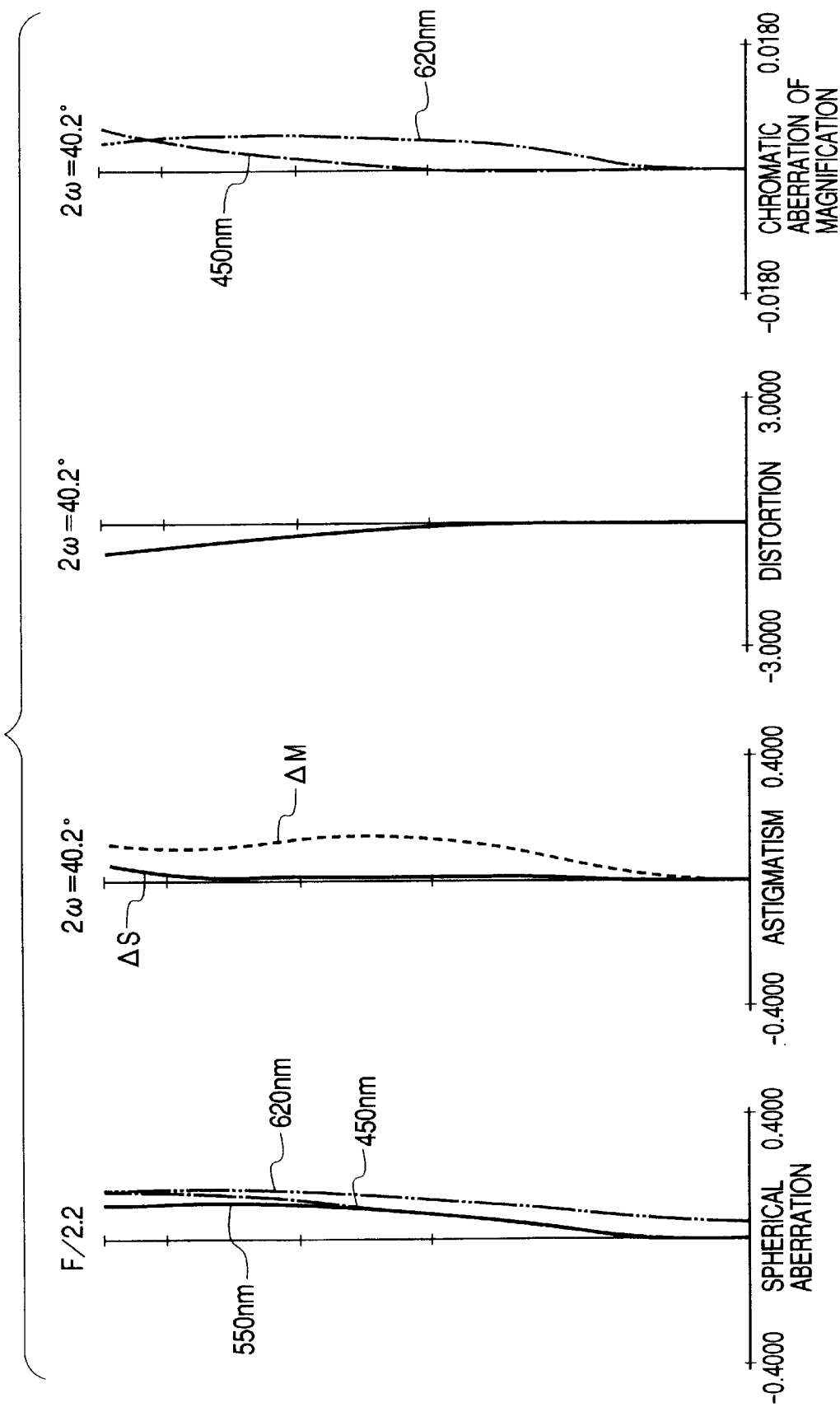

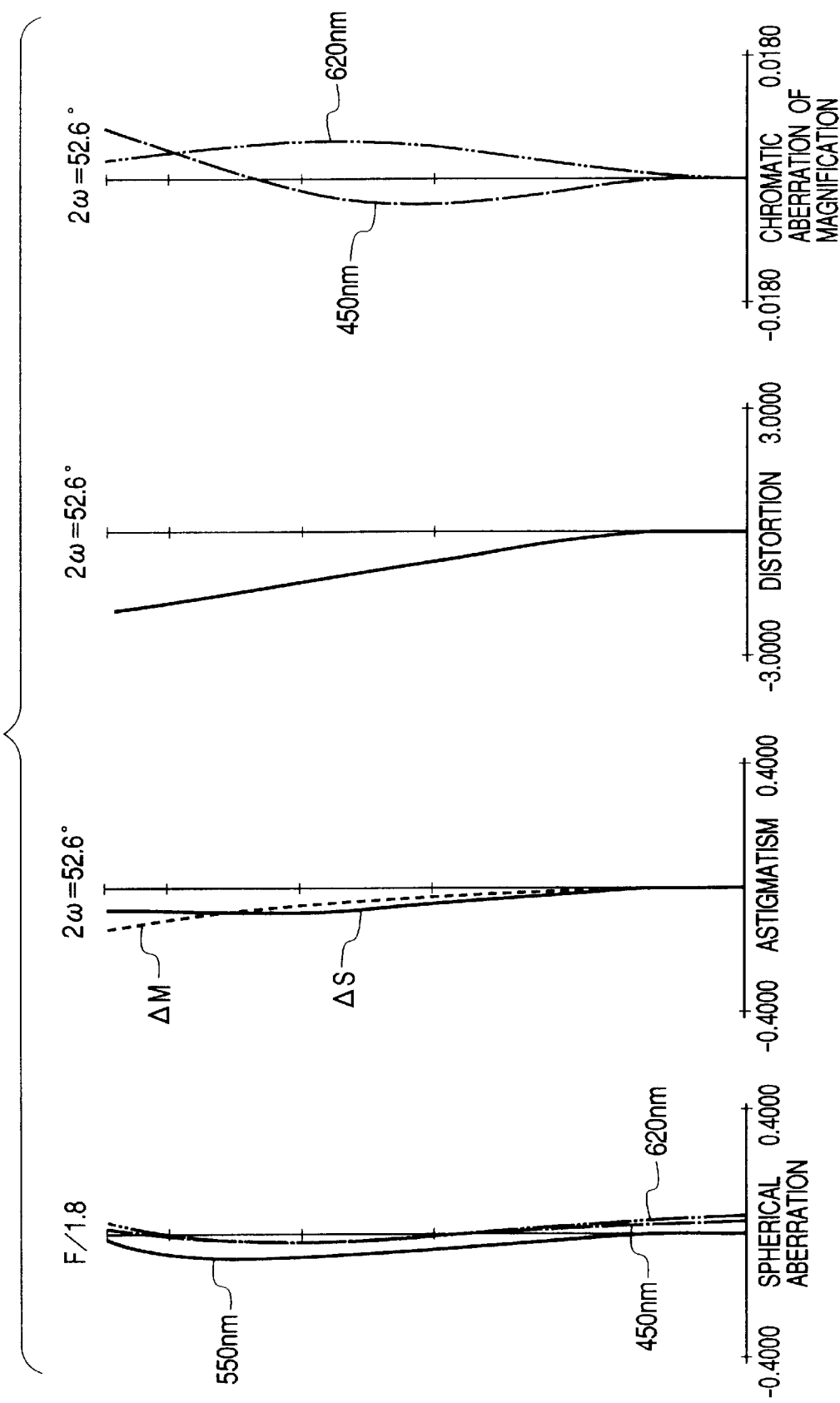

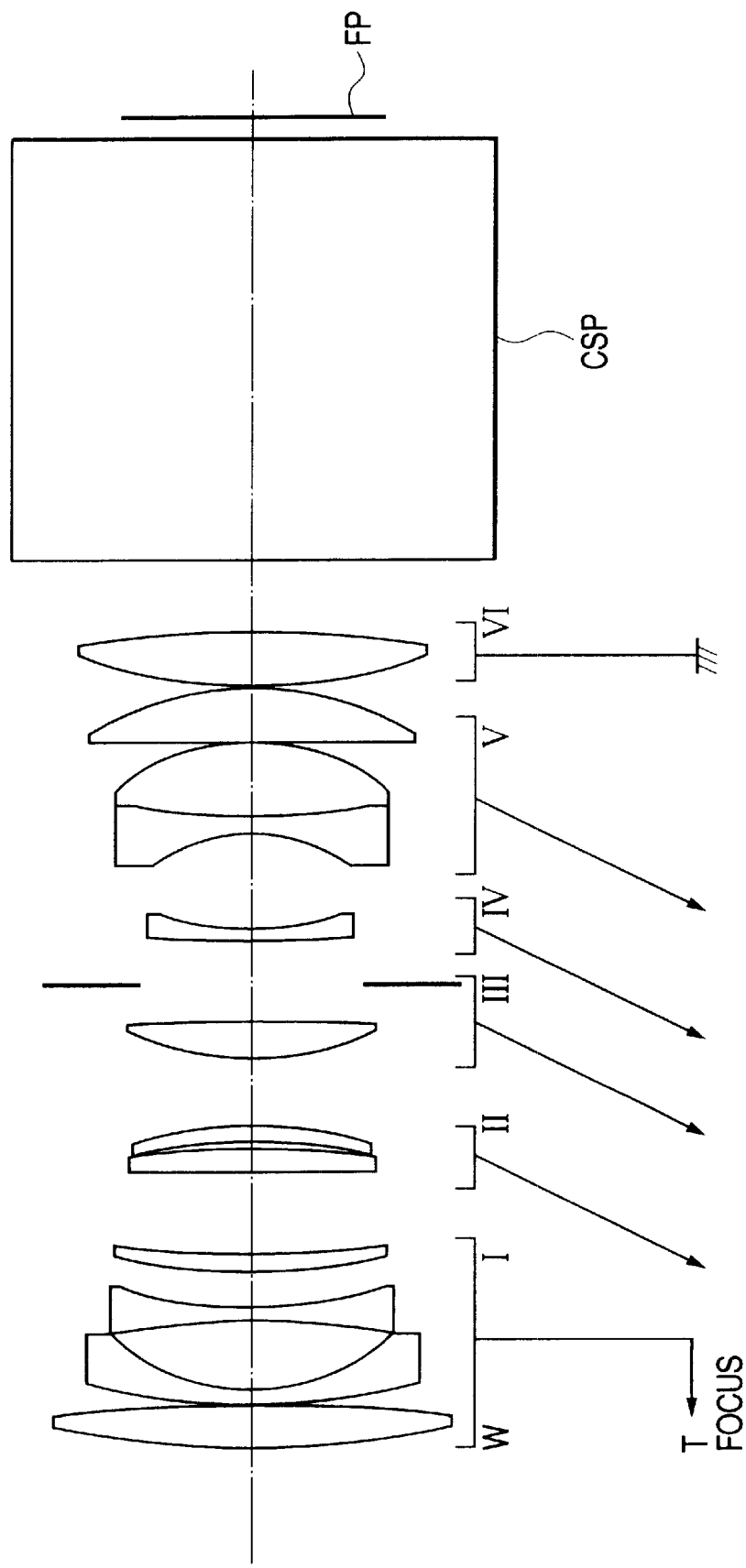

OPTICAL SYSTEM, PROJECTION OPTICAL SYSTEM, IMAGE PROJECTION APPARATUS HAVING IT, AND IMAGE PICKUP APPARATUS

BACKGROUND OF THE INVENTION

1. Field of the Invention

The present invention relates to an optical system having a long back focus, a compact structure, and good optical characteristics and, for example, to an optical system suitable for a projection lens of a high-definition mobile liquid crystal projector.

2. Related Background Art

In recent years, the liquid crystal projectors have commonly been utilized as devices capable of presenting a projection of an image of a personal computer or the like on a large screen in conferences, presentations, and so on. Among others, it is preferable to use a three-panel-type liquid crystal projector using three liquid crystal displays (LCDs) for the respective colors of R (red), G (green), and B (blue) and arranged to project a synthetic image of image information displayed on the respective LCDs, onto the screen, in order to present a high-definition image with high contrast. Projection lenses of such three-panel-type liquid crystal projectors are desirably those satisfying the following requirements:

1) The back focus of a certain length is ensured in order to provide a space for placement of such elements as a dichroic prism and polarizers for combining color beams from the liquid crystal displays for the respective colors of R, G, and B, between the liquid crystal displays and the projection lens;

2) The projection lens is an optical system telecentric on the liquid crystal display side whose pupil viewed from the liquid crystal display (reduction) side is at infinity, in order to minimize influence of angle dependence of color combining films and in order to ensure good pupil matching with an illumination system;

3) Corresponding pixels of the respective color liquid crystal displays have to be well superimposed throughout the entire screen in order to prevent degradation of resolution sense and quality due to doubling of characters etc. of the personal computer when the synthetic image of the image information of the three color liquid crystal displays is projected onto the screen.

For that purpose, chromatic deviation (chromatic aberration of magnification) occurring in the projection lens has to be corrected well in the visible band (to realize an apochromat system);

4) The optical system is corrected so that the maximum distortion is not more than about 2% in order to prevent the projected image from being distorted in the contour part and degrading (particularly, if there remains sudden distortion change or the like in the periphery and intermediate part or the like the quality of image will degrade and thus it is not preferable); and so on.

The prior arts intended for meeting the above requirements include, for example, the projection lenses for liquid crystal projectors as described in Japanese Patent Applications Laid-Open No. H10-186235 and No. H10-268193. The projection lenses disclosed in these applications are comprised of five lens units having their respective optical powers which are negative, positive, positive, negative, and positive in the order named from the enlargement conjugate side, and magnification variation (zooming) from the wide-angle extreme to the telephoto extreme is implemented by fixing the first and fifth lens units and moving all the second to fourth lens units in the lens system toward the enlargement conjugate side. Since the first and fifth lens units closest to the enlargement conjugate side and to the reduction conjugate side are fixed, the total length is maintained constant during zooming. This optical system is also a telecentric zoom lens having the back focus of a fixed length and realizing low distortion and low chromatic aberration.

There are, however, strong market needs for achievement of much smaller mobile liquid crystal projectors at present and toward the future.

For this theme of "downsizing of liquid crystal projector," the size of the liquid crystal displays providing the original images first has to be decreased. However, for ensuring the resolution of the same level as before, the aperture ratio of the liquid crystal displays is reduced and the ratio of sizes of illuminated areas and emission light sources (=size of illuminated areas/size of light sources) becomes smaller, so that illumination efficiency is usually lowered. This will results in losing commercial values in respect of brightness even though the apparatus can be downsized.

Against the above problem, in order to ensure screen illuminance enough for use even under fluorescent tubes and the daylight, it was difficult to attain sufficient brightness with marketability by the full-aperture F-value at the wide-angle extreme of about 2.5 (the F-values hereinafter representing full-aperture values) in spite of the projection lens for compact projector. It is thus necessary to attain brightness enough to maintain marketability, by setting the F-value to approximately 2.0.

However, the decrease of the F-value to about 2.0 or to below 2.0 will raise the possibility of forcing constraints from the F-value on design, decreasing freedom of correction of aberration, making correction of aberration, particularly, spherical aberration very hard, and thus degrading the optical characteristics. It is possible to well correct the spherical aberration by use of many lenses, but it will result in increasing the scale of the optical system and thus lowering the commercial values as a mobile liquid crystal projector.

The cross dichroic prism mainly used in the liquid crystal projectors and disclosed in Japanese Patent Application Laid-Open No. H11-95098 is very compact, but it is very difficult to fabricate the prism and join its prism elements. In order to decrease the production cost of the color combining prism, a method in which the dichroic mirror layers do not intersect with each other inside the prism, is also investigated as a new color combining method.

SUMMARY OF THE INVENTION

An object of the present invention is to provide an optical system having good optical characteristics while realizing a large aperture ratio. A further object of the present invention is to provide an optical system that can be constructed in a total length of very small value in combination with a cross dichroic prism and that can be constructed without increasing the scale of the entire system and realized in the scale approximately equal to that of the conventional systems using the cross dichroic prism, even in combination with a prism of a color combining method with a longer prism path length, other than the cross dichroic prism.

An optical system according to the first aspect of the present invention is an optical system comprising a first optical component, a second optical component, a third optical component, a fourth optical component, a fifth optical component, and a sixth optical component in the order named from the enlargement conjugate side, wherein at least four optical components out of said plurality of optical components move during zooming and said first optical component closest to the enlargement conjugate side has a negative optical power.

An optical system according to another aspect of the invention is the optical system according to the first aspect wherein during zooming the optical component closest to the enlargement conjugate side and the optical component closest to the reduction conjugate side both are fixed relative to a reduction-side conjugate point.

An optical system according to another aspect of the invention is the optical system according to the first aspect, which comprises at least one optical element having an aspherical surface.

An optical system according to another aspect of the invention is the optical system according to the first aspect, which comprises at least one optical element comprised of a material with an Abbe's number of not less than 80.

An optical system according to another aspect of the invention is the optical system according to the first aspect wherein during zooming at least two movable optical components integrally move.

An optical system according to another aspect of the invention is the optical system according to the above aspect wherein said second optical component and said fifth optical component integrally move during zooming.

An optical system according to another aspect of the invention is the optical system according to the first aspect wherein said second optical component has a positive optical power, said third optical component a positive optical power, said fourth optical component a negative optical power, and said sixth optical component a positive optical power.

An optical system according to another aspect of the invention is the optical system according to the first aspect wherein during zooming said second to fifth optical components move.

An optical system according to another aspect of the invention is the optical system according to the above aspect wherein during zooming from a wideangle extreme to a telephoto extreme the second to fifth optical components all move toward the enlargement conjugate side.

An optical system according to another aspect of the invention is the optical system according to the first aspect wherein the following condition is satisfied:

$$0.5 < -\beta 23w < 1.0 \tag{1},$$

where $\beta 23w$ is a magnification at a wideangle extreme in combination of the second optical component and the third optical component.

An optical system according to another aspect of the invention is the optical system according to the first aspect wherein the following condition is satisfied:

$$1.0 < \beta 4w < 5.0 \tag{2},$$

where $\beta 4w$ is a magnification at a wideangle extreme of the fourth optical component.

An optical system according to another aspect of the invention is the optical system according to the first aspect, which comprises a stop, wherein said stop is disposed in the second or third optical component.

An optical system according to another aspect of the invention is the optical system according to the above aspect wherein during zooming said stop moves integrally with said third optical component.

An optical system according to another aspect of the invention is the optical system according to the first aspect wherein at least one optical component out of the first, fifth, and sixth optical components includes an optical element having an aspherical surface.

An optical system according to another aspect of the invention is the optical system according to the first aspect wherein the fifth optical component comprises at least one biconcave lens and at least two positive lenses in the order named from the enlargement side.

An optical system according to another aspect of the invention is the optical system according to the first aspect wherein the following condition is satisfied:

$$1.2 < f6/fw < 2.2 \tag{3},$$

where fw is a focal length of the entire system at a wideangle extreme and f6 is a focal length of the sixth optical component.

An optical system according to another aspect of the invention is the optical system according to the first aspect wherein focus adjustment is implemented by moving the first optical component on the optical axis.

An optical system according to another aspect of the invention is the optical system according to the first aspect wherein said third optical component consists of one positive lens.

An optical system according to another aspect of the invention is the optical system according to the first aspect wherein said second optical component comprises a positive lens and a negative lens having a stronger power on the enlargement conjugate side than on the reduction conjugate side, in the order named from the enlargement conjugate side.

An optical system according to another aspect of the invention is the optical system according to the first aspect wherein said first optical component comprises a biconvex lens, a negative meniscus lens being convex on the enlargement conjugate side, a negative lens, and a positive lens having a stronger power on the enlargement conjugate side than on the reduction conjugate side, in the order named from the enlargement conjugate side.

An optical system according to another aspect of the invention is the optical system according to the first aspect wherein said first optical component comprises a biconvex lens, a negative meniscus lens being convex on the enlargement conjugate side, and a negative lens having a strong power on the enlargement conjugate side, in the order named from the enlargement conjugate side.

An optical system according to another aspect of the invention is the optical system according to the first aspect wherein the following condition is satisfied:

$$0.02 < fw/f2 < 0.6 \tag{4},$$

where fw is a focal length at a wideangle extreme of the entire optical system and f2 a focal length of said second optical component.

An optical system according to another aspect of the invention is the optical system according to the first aspect wherein the following condition is satisfied:

$$-1 < fw/f1 < -0.3 \tag{5},$$

where f1 is a focal length of said first optical component and fw a focal length at a wideangle extreme of the entire optical system.

An optical system according to another aspect of the invention is the optical system according to the first aspect wherein the following condition is satisfied:

$$0.45 < fw/f3 < 1.3 \quad (6),$$

where f3 is a focal length of said third optical component and fw a focal length at a wideangle extreme of the entire optical system.

An optical system according to another aspect of the invention is the optical system according to the first aspect wherein the following condition is satisfied:

$$-0.9 < fw/f4 < -0.1 \quad (7),$$

where f4 is a focal length of said fourth optical component and fw a focal length at a wideangle extreme of the entire optical system.

An optical system according to another aspect of the invention is the optical system according to the first aspect wherein the following condition is satisfied:

$$-0.15 < fw/f5 < 0.35 \quad (8),$$

where f5 is a focal length of said fifth optical component and fw a focal length at a wideangle extreme of the entire optical system.

An optical system according to another aspect of the invention is the optical system according to the first aspect wherein the following condition is satisfied:

$$0.2 < fw/f6 < 0.8 \quad (9),$$

where f6 is a focal length of said sixth optical component and fw a focal length at a wideangle extreme of the entire optical system.

An optical system according to another aspect of the invention is the optical system according to the first aspect wherein said fourth optical component comprises one negative lens having a stronger power on the reduction conjugate side than on the enlargement conjugate side.

An optical system according to another aspect of the invention is the optical system according to the first aspect wherein said fifth optical component comprises a negative lens having a stronger power on the enlargement conjugate side than on the reduction conjugate side, a positive lens having a strong power on the reduction conjugate side, and a positive lens having a strong power on the reduction conjugate side in the order named from the enlargement conjugate side.

An optical system according to another aspect of the invention is the optical system according to the first aspect wherein said sixth optical component comprises one positive lens having a stronger power on the enlargement conjugate side than on the reduction conjugate side.

An optical system according to another aspect of the invention is the optical system according to the first aspect wherein focus adjustment is implemented by moving said first optical component along the optical axis.

An optical system according to another aspect of the invention is the optical system according to the first aspect wherein the following condition is satisfied:

$$0.8 < bf/fw \quad (10),$$

where bf is an air-reduced length between a reduction-side conjugate point and a surface closest to the reduction conjugate side in the optical component closest to the reduction conjugate side out of said at least six optical components when an enlargement-side conjugate point is at infinity from said optical system, and fw a focal length at a wideangle extreme of the entire optical system.

An optical system according to another aspect of the invention is the optical system according to the first aspect wherein the following conditions are satisfied:

$$0.2 < M2/M3 < 1 \quad (11),$$

$$0.4 < M4/M3 < 1 \quad (12),$$

$$0.4 < M5/M3 < 1 \quad (13),$$

where M2 is a moving distance of the second optical component during zooming from a wideangle extreme to a telephoto extreme, M3 a moving distance of the third optical component during the zooming from the wideangle extreme to the telephoto extreme, M4 a moving distance of the fourth optical component during the zooming from the wideangle extreme to the telephoto extreme, and M5 a moving distance of the fifth optical component during the zooming from the wideangle extreme to the telephoto extreme.

An optical system according to another aspect of the invention is the optical system according to the first aspect wherein during zooming from a wideangle extreme to a telephoto extreme, a spacing between the first optical component and second optical component decreases, a spacing between the second optical component and third optical component decreases, a spacing between the third optical component and fourth optical component increases, and a spacing between the fifth optical component and sixth optical component increases.

An optical system according to another aspect of the invention is the optical system according to the first aspect wherein the following condition is satisfied:

$$|fw/tkw| < 0.25 \quad (14),$$

where fw is a focal length at a wideangle extreme of the entire optical system and tkw a distance between a reduction-side conjugate point at the wideangle extreme and a position of a reduction-side pupil.

An optical system according to another aspect of the invention is the optical system according to the first aspect wherein a full-aperture F-value at a wideangle extreme of the optical system is not more than 2.3.

An optical system according to another aspect of the invention is the optical system according to the first aspect wherein a full-aperture F-value at a wideangle extreme of the optical system is not more than 2.0.

A projection optical system according to the second aspect of the present invention is a projection optical system for projecting light from a plurality of image forming elements onto a projection surface, comprising color combining means for combining light beams of different colors from the plurality of image forming elements, wherein the following condition is satisfied:

$$1.2 < bf/p\text{path} < 1.5 \quad (16),$$

where bf is an air-reduced length between the image forming elements and the projection optical system when an enlargement-side conjugate point is at infinity from said projection optical system, and ppath an air-reduced length of said color combining means.

A projection optical system according to the third aspect of the invention is the projection optical system according to the second aspect wherein said color combining means comprises three or more prisms and has two dichroic mirror layers for reflecting light beams of mutually different wavelength regions, and wherein the two dichroic mirror layers do not intersect with each other inside said color combining means.

A projection optical system according to another aspect of the invention is the projection optical system according to the third aspect wherein said color combining means comprises a prism having a surface serving as a total reflection surface and as a transmissive surface, at a position closest to the exit side, and wherein, when a prism disposed between said two dichroic mirror layers is cut by a plane along a direction of color composition, an outline of a cross section thereof is constructed of four or more lines and at least one of bending points in a cross section of surfaces on which the dichroic mirror layers are not formed, exists inside of the prism with respect to a line connecting two ends of lines in a cross section of surfaces on which the two dichroic mirror layers are formed.

A projection optical system according to another aspect of the invention is the projection optical system according to the third aspect wherein said color combining means comprises a prism having a surface serving as a total reflection surface and as a transmissive surface, at a position closest to the exit side, and wherein, when a prism located between said two dichroic mirror layers is cut by a plane along a direction of color composition, an outline of a cross section thereof is constructed of four or more lines and at least one interior angle in the outline of the cross section is an angle exceeding 180°.

A projection optical system according to another aspect of the invention is the projection optical system according to the third aspect wherein said color combining means comprises four or more prisms, and comprises a prism having a surface serving as a total reflection surface and as a transmissive surface, at a position closest to the exit side, wherein the color combining means further comprises two dichroic mirror layers for reflecting light beams of mutually different wavelength regions, and wherein a plurality of prisms are disposed between the two dichroic mirror layers.

A projection optical system according to another aspect of the invention is the projection optical system according to the third aspect wherein said color combining means comprises a first prism having three or more optically smooth surfaces, a second prism having two or more optically smooth surfaces, a third prism having three or more optically smooth surfaces, and a fourth prism having two or more optically smooth surfaces, in the order named from the exit side of light, wherein said color combining means comprises a dichroic mirror layer for reflecting a first color beam on either one or both of opposed surfaces of the first prism and the second prism, and wherein said color combining means comprises a dichroic mirror layer for reflecting a second color beam on either one or both of opposed surfaces of the third prism and the fourth prism.

A projection optical system according to another aspect of the invention is the projection optical system according to the third aspect wherein said color combining means comprises a first prism having three or more optically smooth surfaces, one of said three or more surfaces being a surface serving as a transmissive surface and as a total reflection surface, a second prism having two or more optically smooth surfaces, a third prism having three or more optically smooth surfaces, and a fourth prism having two or more optically smooth surfaces, in the order named from the exit side of light, wherein said color combining means comprises a dichroic mirror layer for reflecting a first color beam on either one or both of opposed surfaces of the first prism and the second prism, and wherein said color combining means comprises a dichroic mirror layer for reflecting a second color beam on either one or both of opposed surfaces of the third prism and the fourth prism.

A projection optical system according to another aspect of the invention is the projection optical system according to the second aspect, comprising at least six optical components having respective optical powers, wherein at least four optical components out of said at least six optical components move during zooming and the first optical component closest to the enlargement conjugate side has a negative optical power.

A projection optical system according to the fourth aspect of the invention is a projection optical system comprising:

color combining means for combining light beams of different colors from a plurality of image forming elements, and the optical system according to the first aspect of the invention, as a projection optical system for projecting the light beams from said plurality of image forming elements, onto a projection surface, wherein the following condition is satisfied:

$$1.2 < bf/p\text{path} < 2.1 \qquad (15),$$

where bf is an air-reduce length between the image forming elements and the projection optical system when an enlargement-side conjugate point is at infinity from said projection optical system, and ppath an air-reduced length of said color combining means.

A projection optical system according to another aspect of the invention is the projection optical system according to the fourth aspect wherein the following condition is satisfied:

$$1.2 < bf/p\text{path} < 1.5 \qquad (16).$$

A projection optical system according to the fifth aspect of the invention is the projection optical system according to the fourth aspect wherein said color combining means comprises three or more prisms and has two dichroic mirror layers for reflecting light beams of mutually different wavelength regions, and wherein the two dichroic mirror layers do not intersect with each other inside said color combining means.

A projection optical system according to another aspect of the invention is the projection optical system according to the fifth aspect wherein said color combining means comprises a prism having a surface serving as a total reflection surface and as a transmissive surface, at a position closest to the exit side, and wherein, when a prism disposed between said two dichroic mirror layers is cut by a plane along a direction of color composition, an outline of a cross section thereof is constructed of four or more lines and at least one of bending points in a cross section of surfaces on which the dichroic mirror layers are not formed, exists inside of the prism with respect to a line connecting two ends of lines in a cross section of surfaces on which the two dichroic mirror layers are formed.

A projection optical system according to another aspect of the invention is the projection optical system according to the fifth aspect wherein said color combining means comprises a prism having a surface serving as a total reflection surface and as a transmissive surface, at a position closest to the exit side, and wherein, when a prism located between said two dichroic mirror layers is cut by a plane along a direction of color composition, an outline of a cross section thereof is constructed of four or more lines and at least one interior angle in the outline of the cross section is an angle exceeding 180°.

A projection optical system according to another aspect of the invention is the projection optical system according to the fifth aspect wherein said color combining means comprises four or more prisms, and comprises a prism having a surface serving as a total reflection surface and as a transmissive surface, at a position closest to the exit side, wherein the color combining means further comprises two dichroic mirror layers for reflecting light beams of mutually different wavelength regions, and wherein a plurality of prisms are disposed between the two dichroic mirror layers.

A projection optical system according to another aspect of the invention is the projection optical system according to the fifth aspect wherein said color combining means comprises a first prism having three or more optically smooth surfaces, a second prism having two or more optically smooth surfaces, a third prism having three or more optically smooth surfaces, and a fourth prism having two or more optically smooth surfaces, in the order named from the exit side of light, wherein said color combining means comprises a dichroic mirror layer for reflecting a first color beam on either one or both of opposed surfaces of the first prism and the second prism, and wherein said color combining means comprises a dichroic mirror layer for reflecting a second color beam on either one or both of opposed surfaces of the third prism and the fourth prism.

A projection optical system according to another aspect of the invention is the projection optical system according to the fifth aspect wherein said color combining means comprises a first prism having three or more optically smooth surfaces, one of said three or more surfaces being a surface serving as a transmissive surface and as a total reflection surface, a second prism having two or more optically smooth surfaces, a third prism having three or more optically smooth surfaces, and a fourth prism having two or more optically smooth surfaces, in the order named from the exit side of light, wherein said color combining means comprises a dichroic mirror layer for reflecting a first color beam on either one or both of opposed surfaces of the first prism and the second prism, and wherein said color combining means comprises a dichroic mirror layer for reflecting a second color beam on either one or both of opposed surfaces of the third prism and the fourth prism.

An image projection apparatus according to another aspect of the invention is an image projection apparatus comprising:

an image forming element for forming an image, and the optical system according to the first aspect of the invention, wherein the image formed by said image forming element located at a reduction-side conjugate point of said optical system is enlarged and projected.

An image projection apparatus according to another aspect of the invention is the image projection apparatus according to the above aspect wherein said image forming element is a liquid crystal display device.

An image pickup apparatus according to another aspect of the invention is an image pickup apparatus comprising:

the optical system according to the first aspect of the invention, and a photosensitive member disposed at a reduction-side conjugate point of said optical system, wherein an image of an object is projected onto said photosensitive member disposed at the reduction-side conjugate point, using said optical system.

An image projection apparatus according to another aspect of the invention is an image projection apparatus comprising:

an image forming element for forming an image, and the projection optical system according to the second aspect of the invention, wherein the image formed by the image forming element disposed at a reduction-side conjugate point is enlarged and projected, using said projection optical system.

An image projection apparatus according to another aspect of the invention is the image projection apparatus according to the above aspect wherein said image forming element is a liquid crystal display device.

An image pickup apparatus according to another aspect of the invention is an image pickup apparatus comprising:

the projection optical system according to the second aspect of the invention, and a photosensitive member disposed at a reduction-side conjugate point of said projection optical system, wherein an image of an object is projected onto said photosensitive member disposed at the reduction-side conjugate point, using said projection optical system.

BRIEF DESCRIPTION OF THE DRAWINGS

FIGS. 6A and 6B are aberration diagrams at the focus of 2.8 m in the first embodiment, wherein FIG. 6A and FIG. 6B show longitudinal aberrations, i.e., spherical aberration, curvature of field, distortion, and chromatic aberration of magnification at the focal length at the wideangle extreme and at the focal length at the telephoto extreme, respectively;

FIGS. 7A and 7B are aberration diagrams at the focus of 2.8 m in the second embodiment, wherein FIG. 7A and FIG. 7B show longitudinal aberrations, i.e., spherical aberration, curvature of field, distortion, and chromatic aberration of magnification at the focal length at the wideangle extreme and at the focal length at the telephoto extreme, respectively;

FIGS. 8A and 8B are aberration diagrams at the focus of 2.8 m in the third embodiment, wherein FIG. 8A and FIG. 8B show longitudinal aberrations, i.e., spherical aberration, curvature of field, distortion, and chromatic aberration of magnification at the focal length at the wideangle extreme and at the focal length at the telephoto extreme, respectively;

FIGS. 9A and 9B are aberration diagrams at the focus of 2.8 m in the fourth embodiment, wherein FIG. 9A and FIG. 9B show longitudinal aberrations, i.e., spherical aberration, curvature of field, distortion, and chromatic aberration of magnification at the focal length at the wideangle extreme and at the focal length at the telephoto extreme, respectively;

FIGS. 10A and 10B are aberration diagrams at the focus of 2.8 m in the fifth embodiment, wherein FIG. 10A and FIG. 10B show longitudinal aberrations, i.e., spherical aberration, curvature of field, distortion, and chromatic aberration of magnification at the focal length at the wideangle extreme and at the focal length at the telephoto extreme, respectively;

FIG. 11 is a cross-sectional view of the zoom lens in Embodiment 6 of the present invention;

DESCRIPTION OF THE PREFERRED EMBODIMENTS

Figure 1:
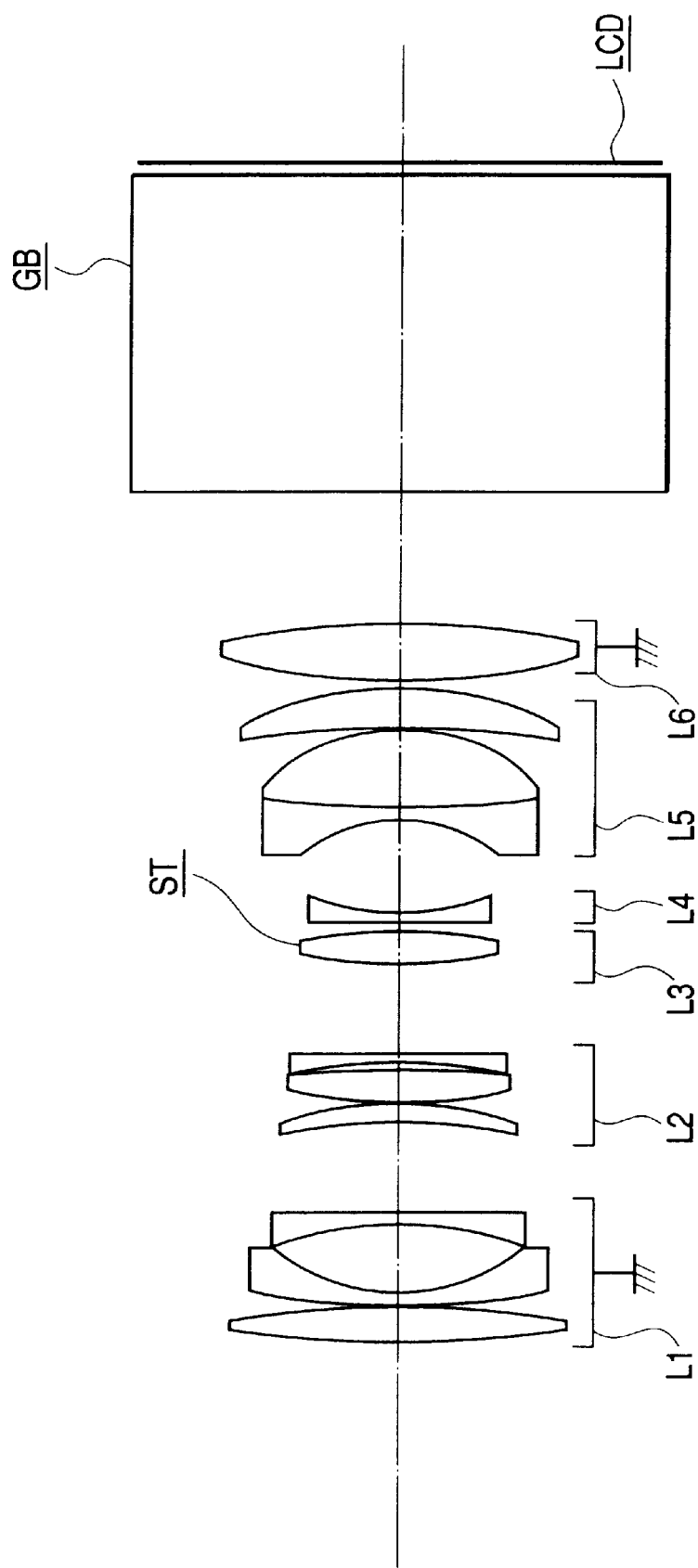
FIG. 1 is a cross-sectional view of the projection optical system in the first embodiment of the present invention.

Embodiments of the optical system of the present invention will be described below with reference to the drawings. In the embodiments, the optical system of the present invention is used as a projection optical system of a liquid crystal projector. It is, however, noted that the optical system of the present invention is by no means limited to the projection optical systems used in the liquid crystal projectors etc., but a variety of embodiments can also be contemplated in addition thereto. Now let us first describe the common features to Embodiments 1 to 5, concerning the embodiments where the optical system of the present invention is applied to the projection optical system.

In the embodiments, at least four lens units out of lens units (optical components) constituting the projection optical system are movable, thereby preventing degradation of optical characteristics with decrease in the F-value and well correcting the optical characteristics, particularly, spherical aberration while maintaining the total size of the projection optical system in the level equal to or close to the size before.

Since the lens units closest to the enlargement conjugate side (the screen side in the case of the liquid crystal projector) and closest to the reduction conjugate side (the original image side in the case of the liquid crystal projector) both are fixed relative to the reduction-side conjugate point during zooming, the total length of the lens units is invariant, solidness is maintained, and there is little change in a weight balance or the like because of the fixing of the large-diameter lens units, thus being advantageous in respect of mechanism.

In order to correct degradation of aberrations due to increase of refracting powers of the respective component lenses for achievement of compactification, it is also conceivable to employ at least one aspherical lens in the projection lens. The aspherical lens is preferably one of a glass mold type, a replica aspherical surface, or the like, but it can be a plastic aspherical lens, depending upon the target of resolution and sensitivity of the aspherical lens (if the sensitivity is low). Although depending upon an aberration to be removed, it is effective to locate the aspherical lens at a position as far as possible from the stop position in order to mainly correct off-axial aberrations well.

It is also possible to use an optical element of anomalous dispersion glass with the Abbe's number of not less than 80, in order to make it feasible to well correct deterioration of chromatic aberration (particularly, blue aberration of magnification on the short wavelength side of visible light) with increase in the refracting powers of the respective lens units due to compactification and to implement higher performance than in the case of configurations of ordinary lenses.

It is also possible to simplify the structure by arranging two or more movable lens units so as to move integrally.

The compact projection optical system is realized by arranging a first lens unit of a negative optical power (=inverse of focal length), a second lens unit of a positive optical power, a third lens unit of a positive optical power, a fourth lens unit of a negative optical power, a fifth lens unit, and a sixth lens unit of a positive optical power in the order named from the enlargement conjugate side and moving at least four lens units during zooming.

The desired zooming, focusing, aberration correction, and so on are achieved by the structure in which the second to fifth lens units are movable and in which all the second to fifth lens units move toward the enlargement conjugate side during zooming from the wideangle extreme to the telephoto extreme. In the embodiments, during zooming the second and third lens units act as zooming (variator) units mainly in charge of the zooming, and the fourth lens unit as an image plane position correcting (compensator) unit mainly in charge of correction of the image plane position during zooming.

A wideangle-extreme magnification $\beta 23w$ of the combination of the second and third lens units satisfies the following condition:

$$0.5 < -\beta 23w < 1.0 \qquad (1).$$

Condition (1) indicates that the magnification of the zooming units at the wideangle extreme is not more than 1. In the range below the lower limit in Condition (1), there will appear hindrance to compactification; e.g., the total lens length becomes long. In the range above the upper limit on the other hand, the structure becomes advantageous for compactification, but aberration variations during zooming tend to become large, which is not desirable. Concerning Condition (1), it is more desirable to set the upper limit to 0.8, because the structure becomes more advantageous for compactification and aberration variations during zooming become smaller.

A wideangle-extreme magnification $\beta 4w$ of the fourth lens unit preferably satisfies the following condition:

$$1.0 < \beta 4w < 5.0 \qquad (2).$$

Condition (2) is a condition for specifying the magnification of the image plane position correcting (compensator) unit. Below the lower limit, the refracting power of the fourth lens unit becomes small and the curvature of field becomes large in connection with the Petzval sum. In addition, the desired back focus is not ensured, the moving distance of the fourth lens unit increases for correction of image plane position during zooming, so as to increase the aberration variations during zooming, spacings between the lens units are reduced, and so on, thus posing the problems from the aspect of mechanism. Over the upper limit on the other hand, the refracting power of the negative lens unit becomes too strong and the back focus space appears more than necessary, which is not preferable in terms of compactification. Concerning Condition (2), when the lower limit is set to 2.0, the moving distance of the fourth lens unit becomes shorter and the aberration variations during zooming are also controlled smaller. When the upper limit is set to 4.5, the back focus length is not longer than necessary and can be set at a desired length, and the structure becomes more advantageous for compactification.

Properly speaking of the stop, when the stop is one moving independently of the lens units, it becomes feasible to efficiently correct the aberration variations during zooming, but it will raise the need for an additional cam groove for the stop. Therefore, the embodiments employ the simple structure in which the stop is provided in the third lens unit and is moved integrally with the third lens unit, in consideration of the production requirements. In the embodiments the stop is provided in the third lens unit, but it is contemplated that the same effect can also be achieved by setting the stop in the second lens unit.

In order to keep the aberration variations small during zooming, the fifth lens unit is preferably arranged to move toward the enlargement conjugate side during zooming in the direction along motion of the stop, i.e., during zooming from the wideangle extreme to the telephoto extreme and used near the magnification of about 1 and not more than the wideangle-extreme magnification of the fourth lens unit. Because of the above allocation of magnifications to the respective lens units, the second to fourth lens movable units move all toward the enlargement conjugate side during zooming from the wideangle extreme to the telephoto extreme.

The fifth lens unit disposed on the reduction conjugate side with respect to the stop is composed of a biconcave lens and at least two positive lenses in the order named from the enlargement conjugate side. By locating the lens of a strong negative refracting power at the position where the height of axial rays becomes smallest, in this way, the Petzval sum can be efficiently controlled small. The positive lenses are comprised of at least two lenses, because they need to realize good telecentricity by gently bending the rays diverged by the concave lenses located on the reduction conjugate side with respect to the stop. The positive lenses have their respective, concentric shapes toward the stop surface for the purpose of suppressing occurrence of astigmatism and the material for the positive lenses is preferably a glass material with an index of refraction as high as possible in the sense of decreasing the Petzval sum.

The sixth lens unit is characterized by satisfying the following condition:

$$1.2 < f6/fw < 2.2 \qquad (3),$$

where fw is a focal length of the total system at the wideangle extreme and f6 a focal length of the sixth lens unit. The sixth lens unit added near the image plane functions to weaken the total refracting power of the first to fifth lens units and acts advantageous for increase of angle of view and for increase of aperture. However, below the lower limit of Condition (3) the refracting power of the sixth lens unit is too large and thus it increases distortion, introversive comatic flare, and so on. Over the upper limit on the other hand, the refracting power of the sixth lens unit becomes too small, so as to reduce the effect of weakening the refracting powers of the first to fifth lens units and weaken the effect of performance enhancement. Thus it is not preferred. Concerning Condition (3), when the lower limit is set to 1.4, the refracting power of the sixth lens unit is kept not too strong and the distortion, introversive comatic flare, etc. can be suppressed to a small level. When the upper limit is set to 2.0, the refracting powers of the first to fifth lens units can be moderately weakened and it becomes easier to realize the increase of angle of view, increase of aperture, and so on. The material for the sixth lens unit is desirably a glass material with an index of refraction as high as possible, similar to the positive lenses of the fifth lens unit.

On the premise of the above structure, five numerical embodiments of first to fifth embodiments will be described below in detail with reference to the drawings.

First, symbols common to the first to fifth embodiments will be described. Symbol ri represents a radius of curvature of a surface located at the ith position from the screen side, di similarly a distance between the ith surface and the (i+1)th surface, ni an index of refraction for the d-line of a material making the ith member, and vi an Abbe's number of the material of the ith member similarly. The lens units are denoted by L1 for the first lens unit, L2 for the second lens unit, and L3, L4, L5, and L6 for the lens units thereafter. Symbol GB indicates a glass block such as a dichroic prism for color composition or the like, ST the stop surface, LCD a liquid crystal display, ASP an aspherical surface. As for aspherical coefficients, k represents a conical constant, and B, C, D, and E are fourth-order, sixth-order, eighth-order, and tenth-order coefficients, respectively.

Figure 45:
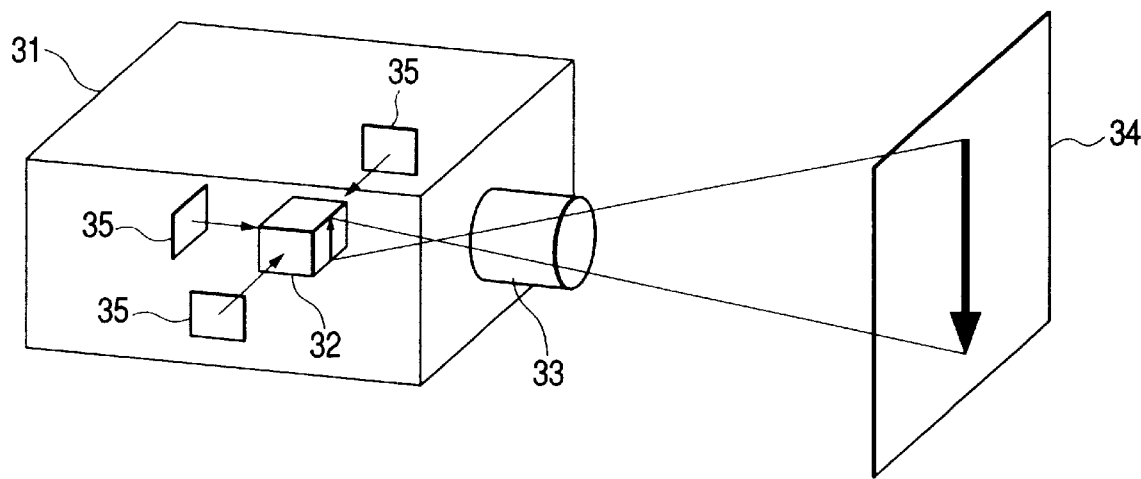
FIG. 45 is a schematic diagram to show an application of the present invention to a liquid crystal projector.
Figure 46:
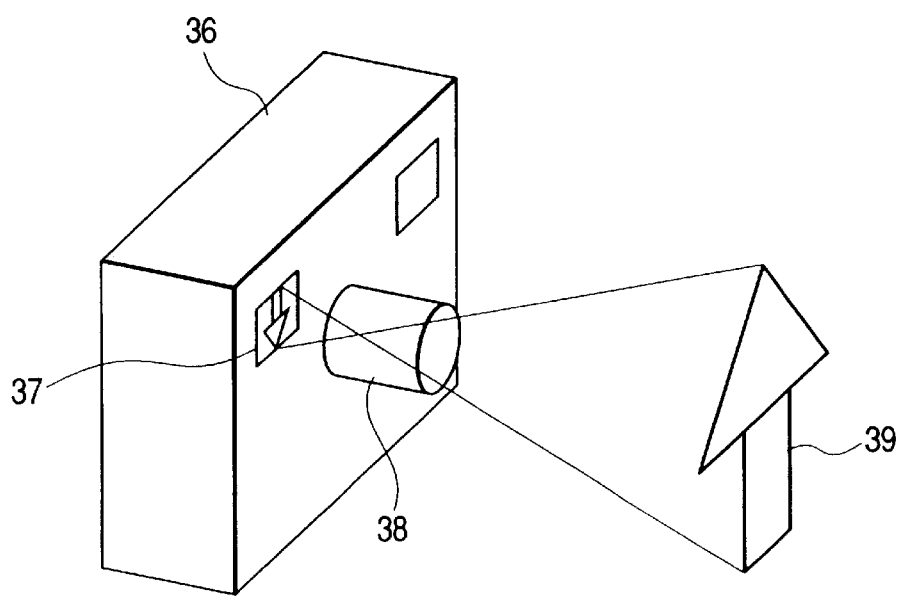
FIG. 46 is a schematic diagram to show an application of the present invention to a camera.

Next, the drawings and tables are briefly explained. FIGS. 1 to 5 are cross-sectional views of the optical systems in the first to fifth numerical embodiments corresponding to Numerical Examples 1 to 5. FIGS. 6A, 6B to 10A, 10B are aberration diagrams (longitudinal aberrations, spherical aberration, curvature of field, distortion, and chromatic aberration of magnification) at the wideangle extreme and at the telephoto extreme upon focusing at 2.8 m by the first lens unit in the projection lenses of the first to fifth numerical embodiments. FIGS. 45 and 46 are schematic diagrams of examples using the optical system of the present invention. Tables 1 to 5 provide numerical data of the first to fifth numerical embodiments and Table 6 values of Conditions (1), (2), and (3) for each of the first to fifth numerical embodiments.

In the first to fifth embodiments described hereinafter, the optical system consists of six lens units, and the second to fifth lens units independently move toward the enlargement conjugate side during zooming from the wideangle extreme to the telephoto extreme. In order to assure the illuminance on the screen, each lens surface is coated with a multilayer coat as an antireflection film.

First Embodiment

Figure 6A:
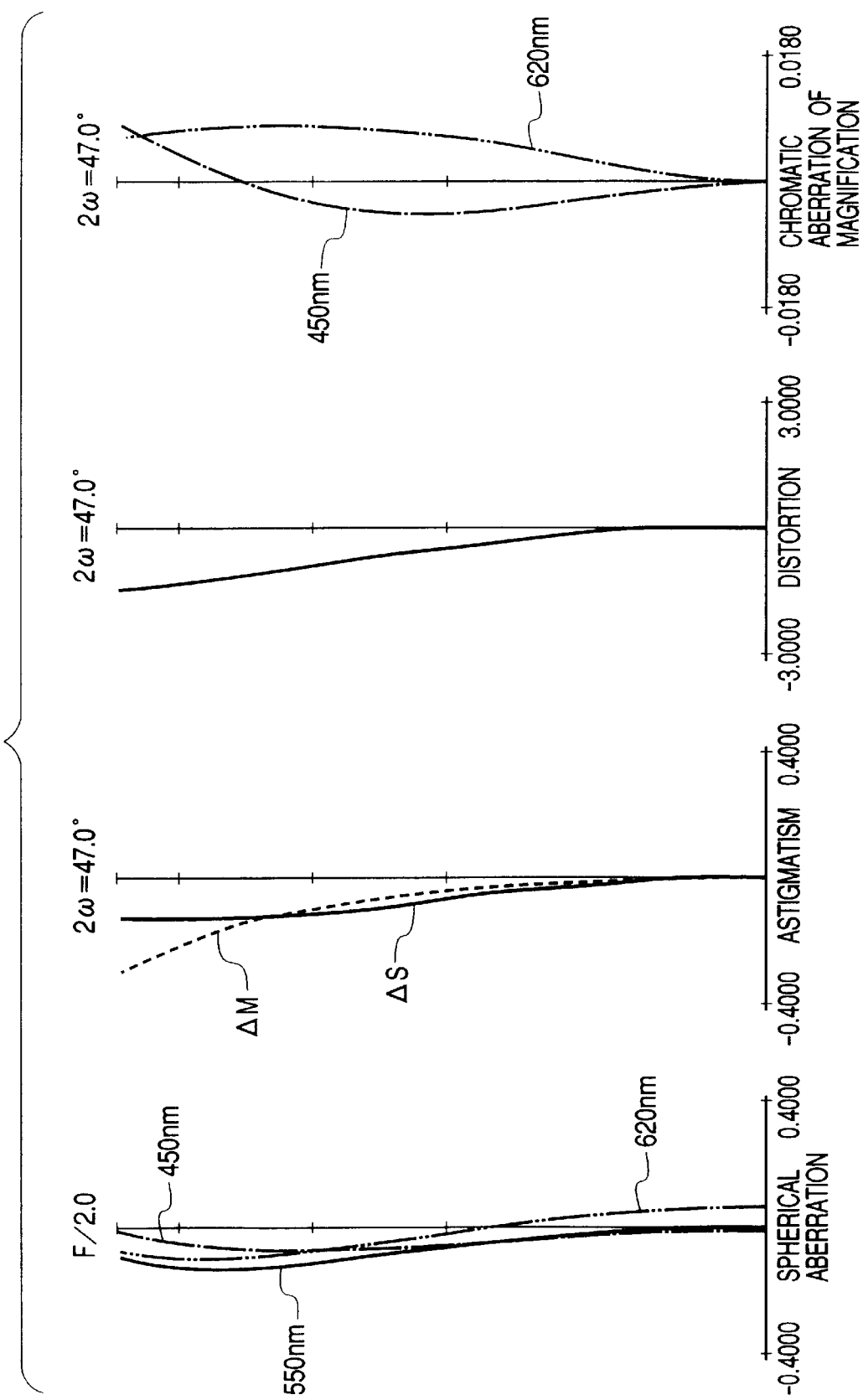
Figure 6B:
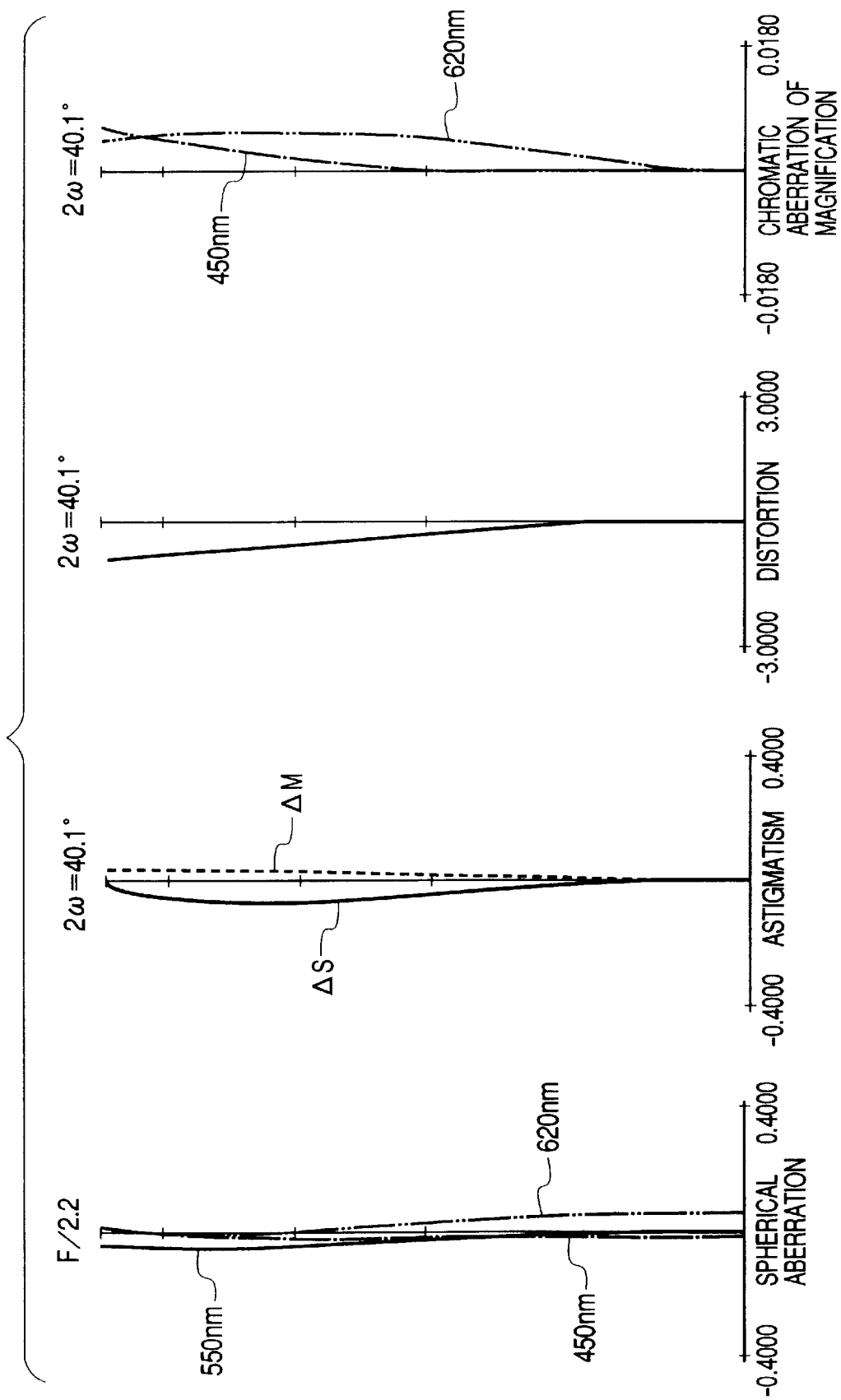

First, FIG. 1 is a cross-sectional view of the retrofocus zoom lens of the first embodiment (at the wideangle extreme), FIGS. 6A and 6B are aberration diagrams thereof, and Table 1 presents numerical data thereof. The first embodiment will be described below.

In the present embodiment, the refracting powers (optical powers) of the respective lens units are negative, positive, positive, negative, positive, and positive in the order named from the enlargement conjugate side. The first lens unit is constructed in a three-lens configuration consisting of a convex lens, a concave lens, and a concave lens from the enlargement conjugate side and the convex lens is disposed at the position closest to the enlargement conjugate side, thereby mainly correcting distortion efficiently. The second negative lens of the first lens unit is made of a glass with the Abbe's number of not less than 80, for example, FK01 or the like. The effects of use of the glass with the Abbe's number of not less than 80 are the capability of well correcting degradation of chromatic aberration (particularly, blue aberration of magnification on the short wavelength side of visible light) due to increase in the refracting powers of the respective units for compactification, and the feasibility of accomplishing higher performance than in the case of the ordinary lens structure.

Since the second lens unit and the third lens unit act as main zooming units and thus have the large refracting powers, a glass material with a high refractive index is also suitable for their convex lenses in order to design the projection lens with small Petzval sum and small aberration variations of spherical aberration etc. during zooming. Particularly, as to the Petzval sum, if a response is required at high spatial frequencies in the case of the large aperture lens as in the present invention, the diameter of a permissible circle of confusion (blur) will become smaller, so as to make the depth of focus shallow. Therefore, it is important to correct the Petzval sum to a small level, because the resolution sense is quickly degraded by large curvature of field and astigmatism at intermediate image heights or the like.

From the aspect of chromatic blur, an appropriate material of the convex lenses is a dense lanthanum-based flint glass with anomalous dispersion or the like in order to well correct the chromatic aberration of magnification in the wide band of visible light as well.

Concerning these second and third lens units, magnifications in the entire zooming region are inverse reduction magnifications. The stop is in the third lens unit and moves together with the third lens unit during zooming, thereby suppressing off-axial aberration variations during zooming.

The fourth lens unit functions to correct movement of the focal plane during zooming. In the present embodiment the fourth lens unit is composed of one biconcave lens and in the entire zooming region the magnification of the fourth lens unit is one or higher. The fourth lens unit moves toward the enlargement conjugate side as the second and third lens units do.

In the fifth lens unit the lens closest to the enlargement conjugate side is provided with a strong negative refracting power. This strong negative refracting power acts so as to decrease the Petzval sum efficiently. Further, it permits the position of the principal plane to be located on the liquid crystal display side, so that it is advantageous in terms of ensuring the good telecentricity as to the pupil and the sufficient back focus.

Second Embodiment

Figure 2:
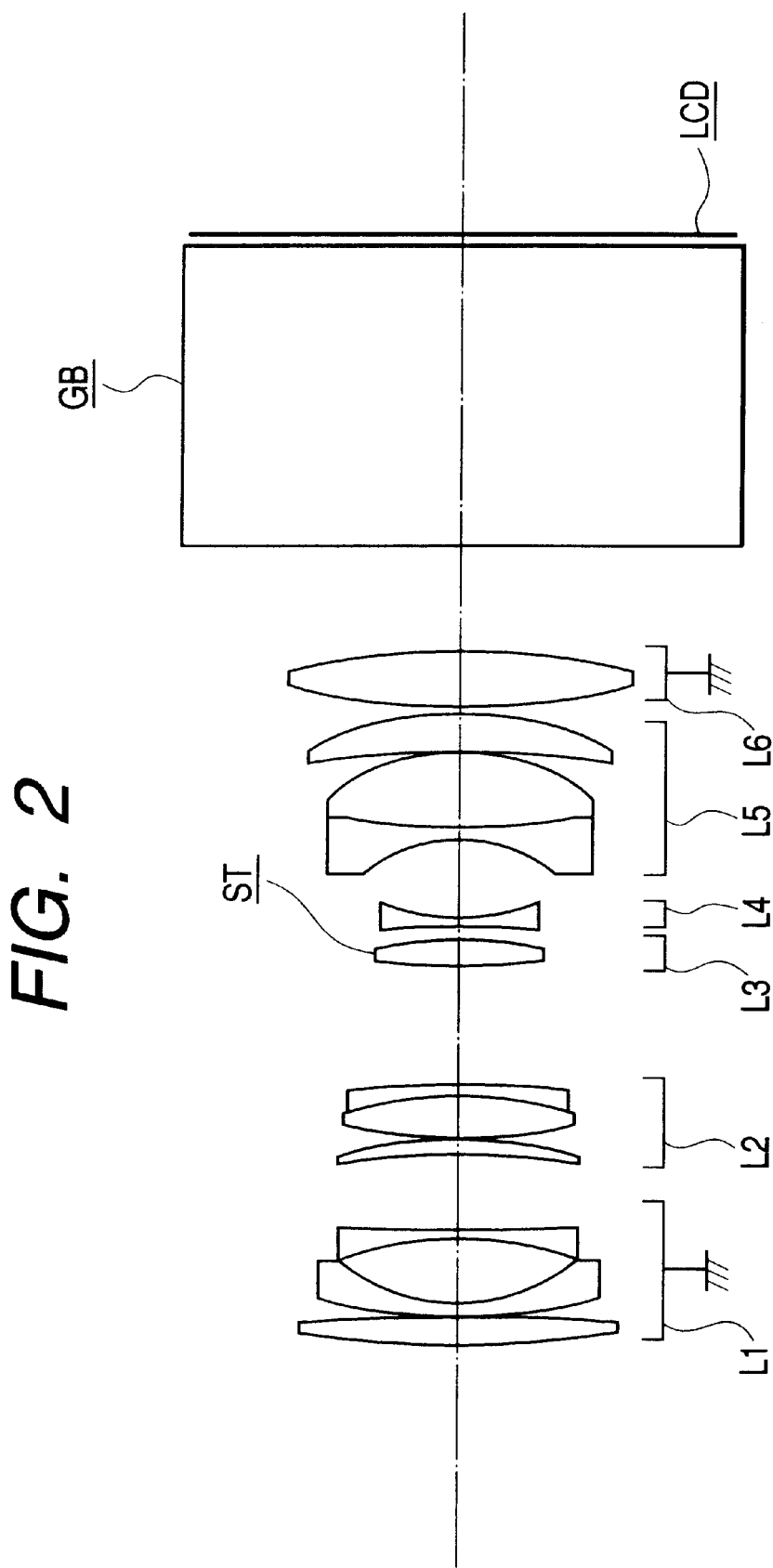
FIG. 2 is a cross-sectional view of the projection optical system in the second embodiment of the present invention.

Next, FIG. 2 is a cross-sectional view of the retrofocus zoom lens of the second embodiment (at the wideangle extreme), FIGS. 7A and 7B are aberration diagrams thereof, and Table 2 presents numerical data thereof. The second embodiment will be described below.

In the present embodiment, the refracting powers of the respective lens units are negative, positive, positive, negative, negative, and positive in the order named from the enlargement conjugate side. In the present embodiment the refracting power of the fifth lens unit is negative.

The reason for this is as follows. In the present embodiment, the refracting powers, magnifications, and so on of the zooming units are large in order to set the total length and diameter of the projection lens in a compact level and, particularly, the spherical aberration caused by the convex lens of the third lens unit needs to be corrected by a strong concave lens disposed on the enlargement conjugate side in the fifth lens unit. Therefore, the fifth lens unit has the negative refracting power.

Since the structure except for the above is the same as in Embodiment 1, the detailed description thereof is omitted herein.

Third Embodiment

Figure 3:
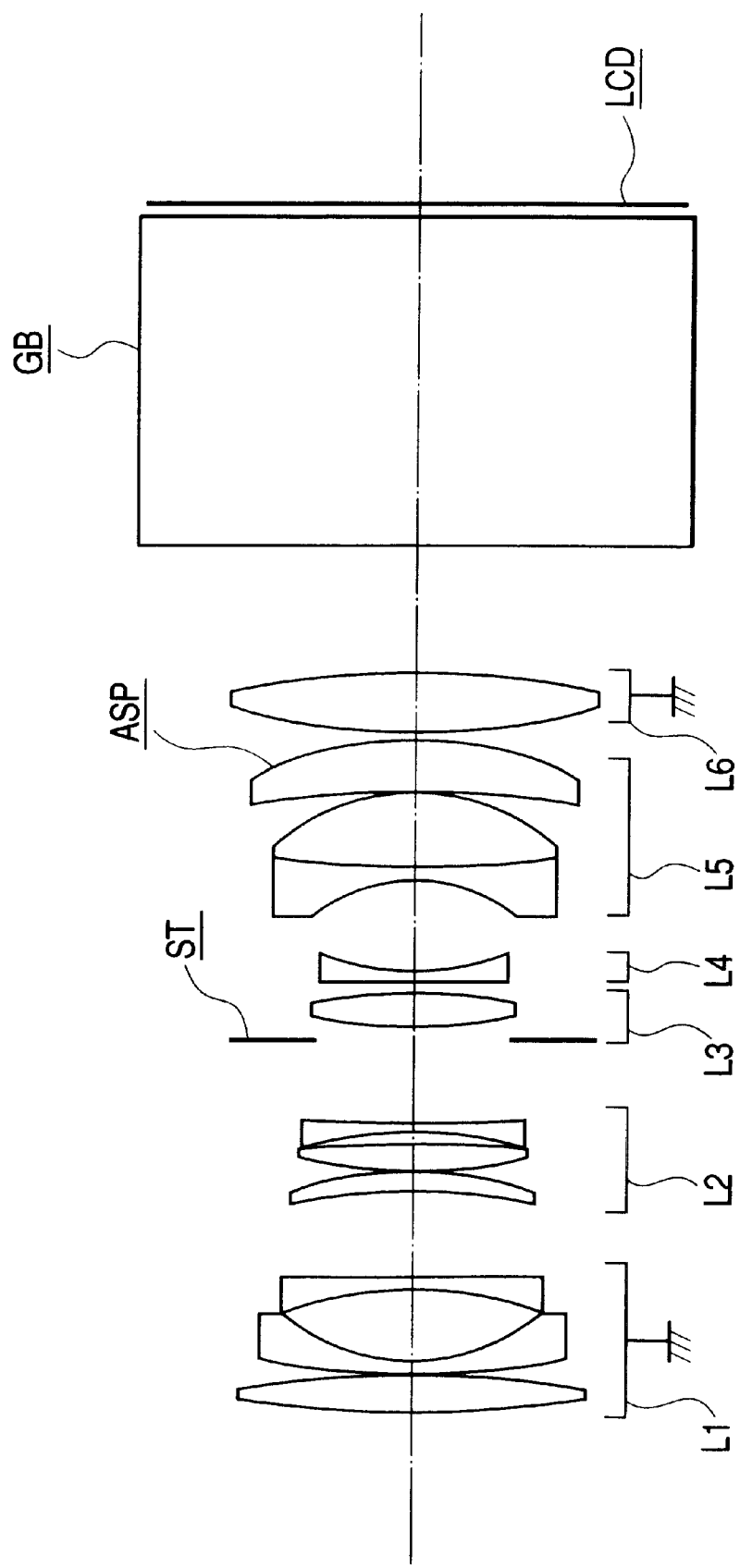
FIG. 3 is a cross-sectional view of the projection optical system in the third embodiment of the present invention.

FIG. 3 is a cross-sectional view of the retrofocus zoom lens of the third embodiment (at the wideangle extreme), FIGS. 8A and 8B are aberration diagrams thereof, and Table 3 presents the numerical data thereof. The third embodiment will be described below.

In the present embodiment, the refracting powers of the respective lens units are negative, positive, positive, negative, positive, and positive in the order named from the enlargement conjugate side. The present embodiment is an example using the glass with the Abbe's number of not less than 80, similar to Embodiment 1, and employing an aspherical lens as one convex lens (the eleventh lens from the enlargement conjugate side) in the fifth lens unit. In the present embodiment the aspherical lens is of the glass mold type, but the aspherical lens does not always have to be limited to it. For example, the aspherical lens may be an aspherical lens of either of the replica and plastic types. When the aspherical surface is placed at the position far from the stop in this way, it functions to mainly correct such aberration as curvature of field and the like well.

The position for placement of the aspherical lens does not always have to be in the fifth lens unit in particular, but it is desirable to select the location of the aspherical lens so as to meet the purpose of correction of aberration among the first to sixth lens units.

When compared with Embodiment 1, the present embodiment can further decrease the total length and achieve superior characteristics as to the spherical aberration and the like.

Since the structure except for the above is the same as in Embodiment 1, the detailed description thereof is omitted herein.

Fourth Embodiment

Figure 4:
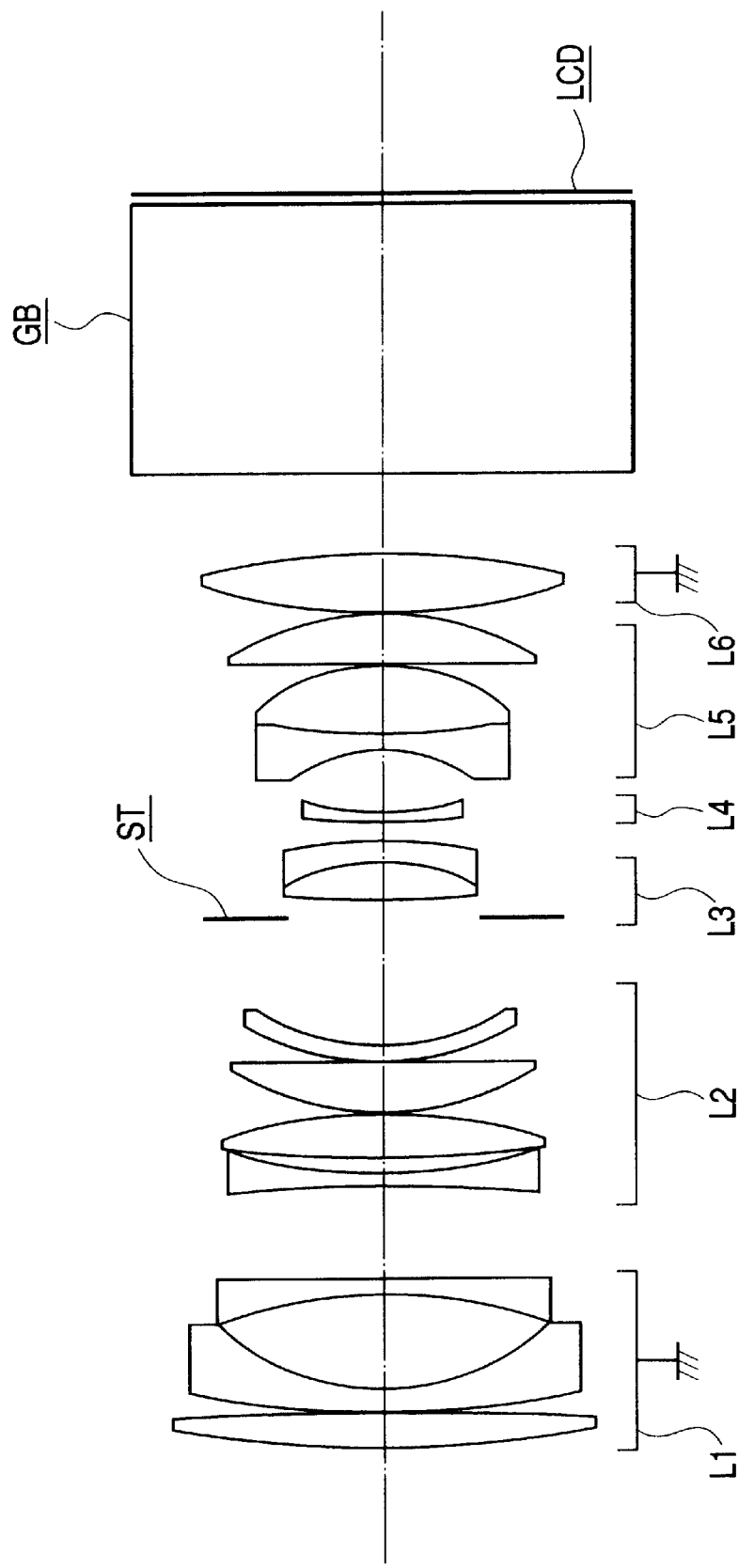
FIG. 4 is a cross-sectional view of the projection optical system in the fourth embodiment of the present invention.
Figure 9B:
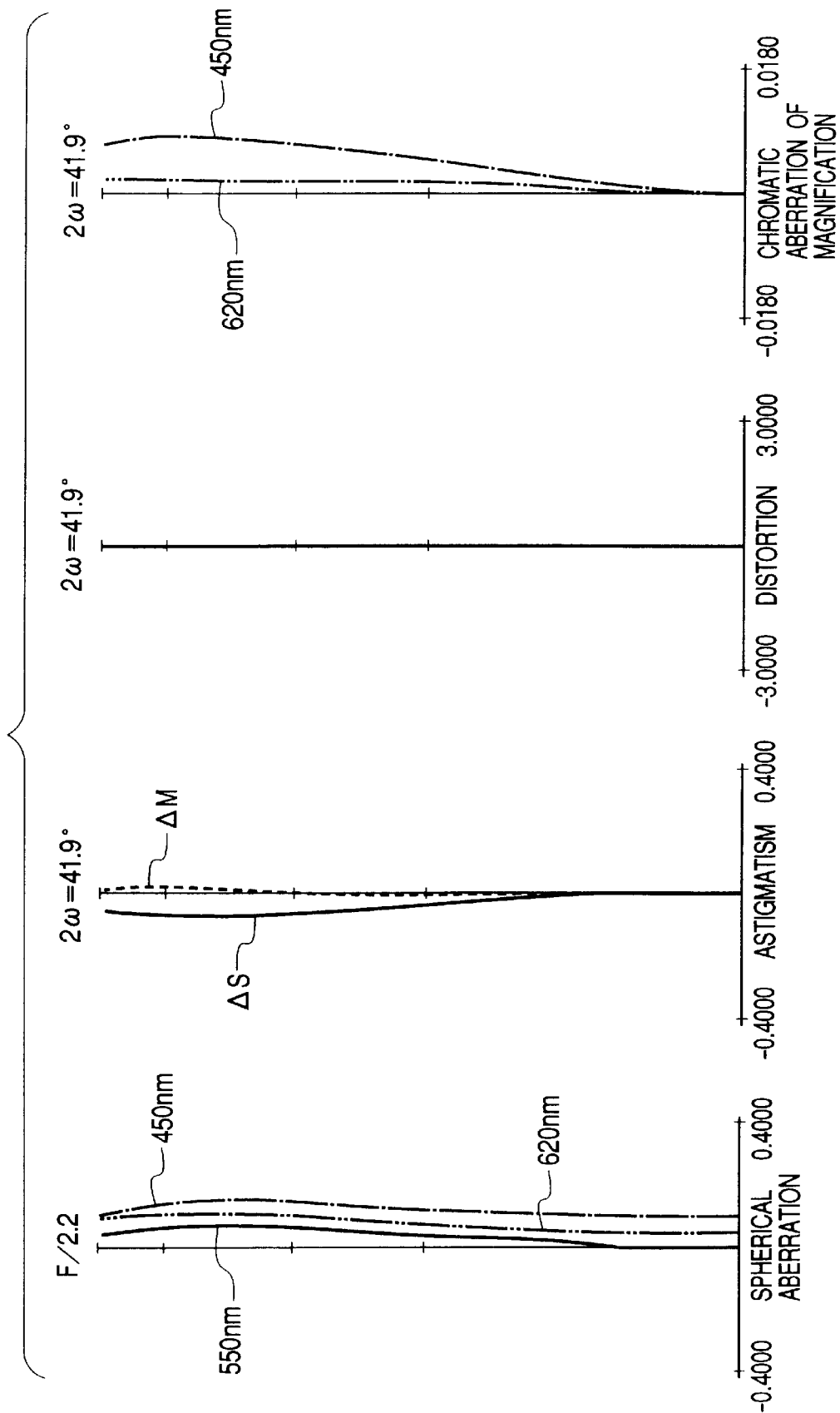

FIG. 4 is a cross-sectional view of the retrofocus zoom lens of the fourth embodiment (at the wideangle extreme), FIGS. 9A and 9B are aberration diagrams thereof, and Table 4 presents the numerical data thereof. The fourth embodiment will be described below.

In the present embodiment, the refracting powers of the respective lens units are negative, positive, positive, negative, positive, and positive in the order named from the enlargement conjugate side. The present embodiment is an example of a large aperture with the wideangle-extreme F-value of about 1.8. Since variations of various aberrations during zooming become larger with increase in the aperture, the lens configuration also becomes complicated as shown in the cross-sectional view of FIG. 4.

In the second lens unit a concave lens is disposed at the position closest to the enlargement conjugate side, thereby suppressing inclination of the image plane or the like during zooming, and a weak negative lens of concave meniscus shape is disposed at the position closest to the reduction conjugate side, thereby effectively removing coma.

The third lens unit includes an additional concave lens for correction, thereby suppressing the aberration variations during zooming.

Since the structure except for the above is the same as in Embodiment 1, the detailed description thereof is omitted herein.

Fifth Embodiment

Figure 5:
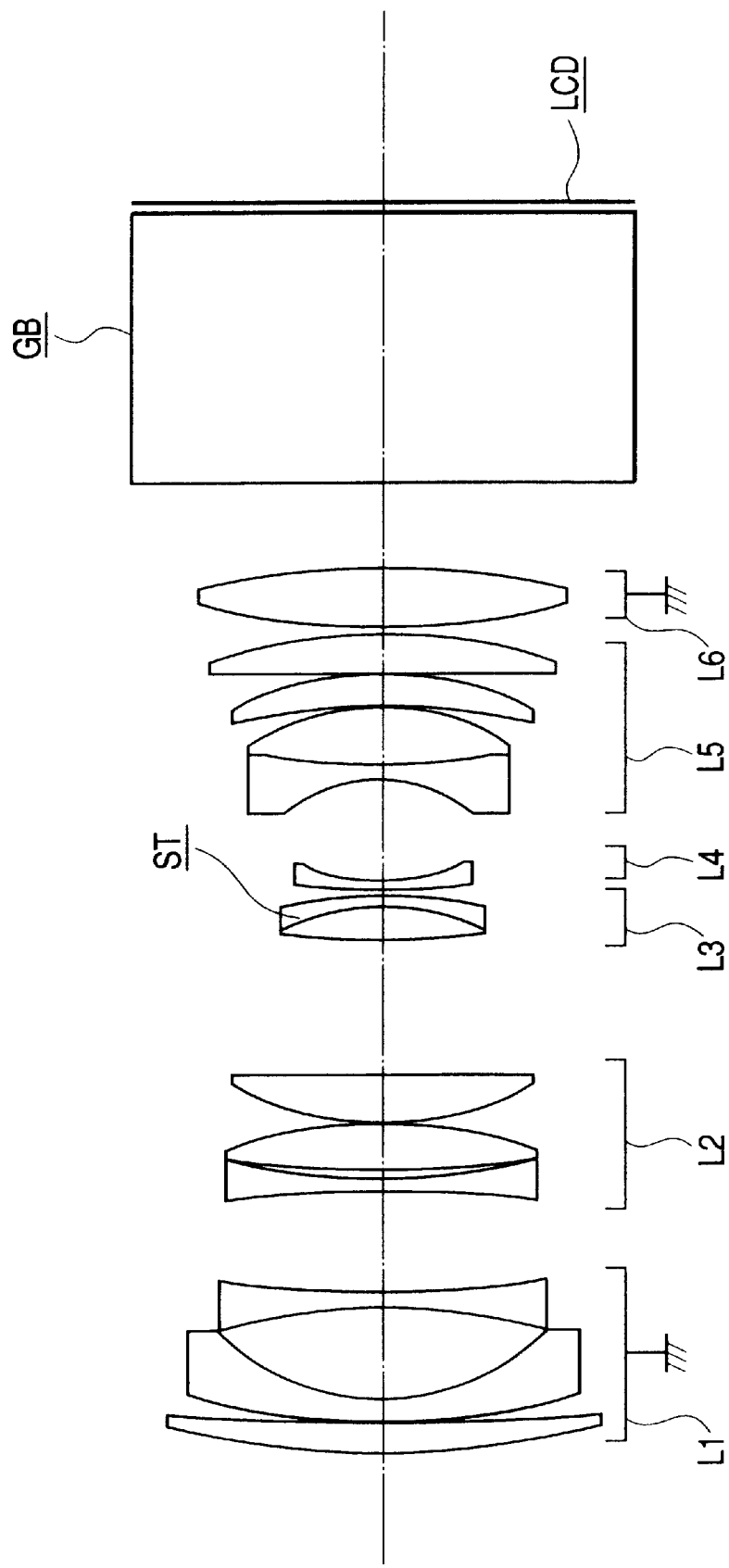
FIG. 5 is a cross-sectional view of the projection optical system in the fifth embodiment of the present invention.
Figure 10A:
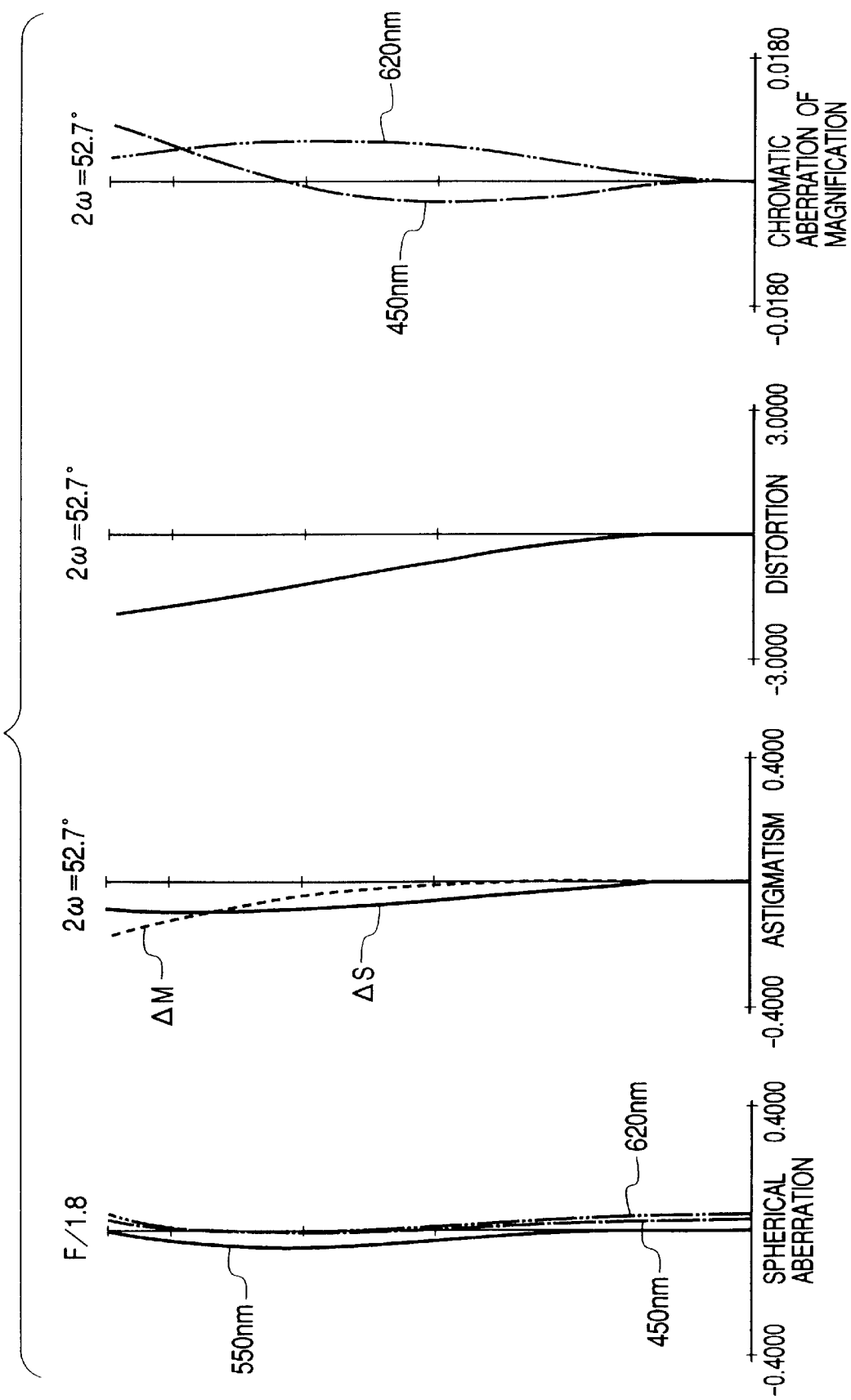
Figure 10B:
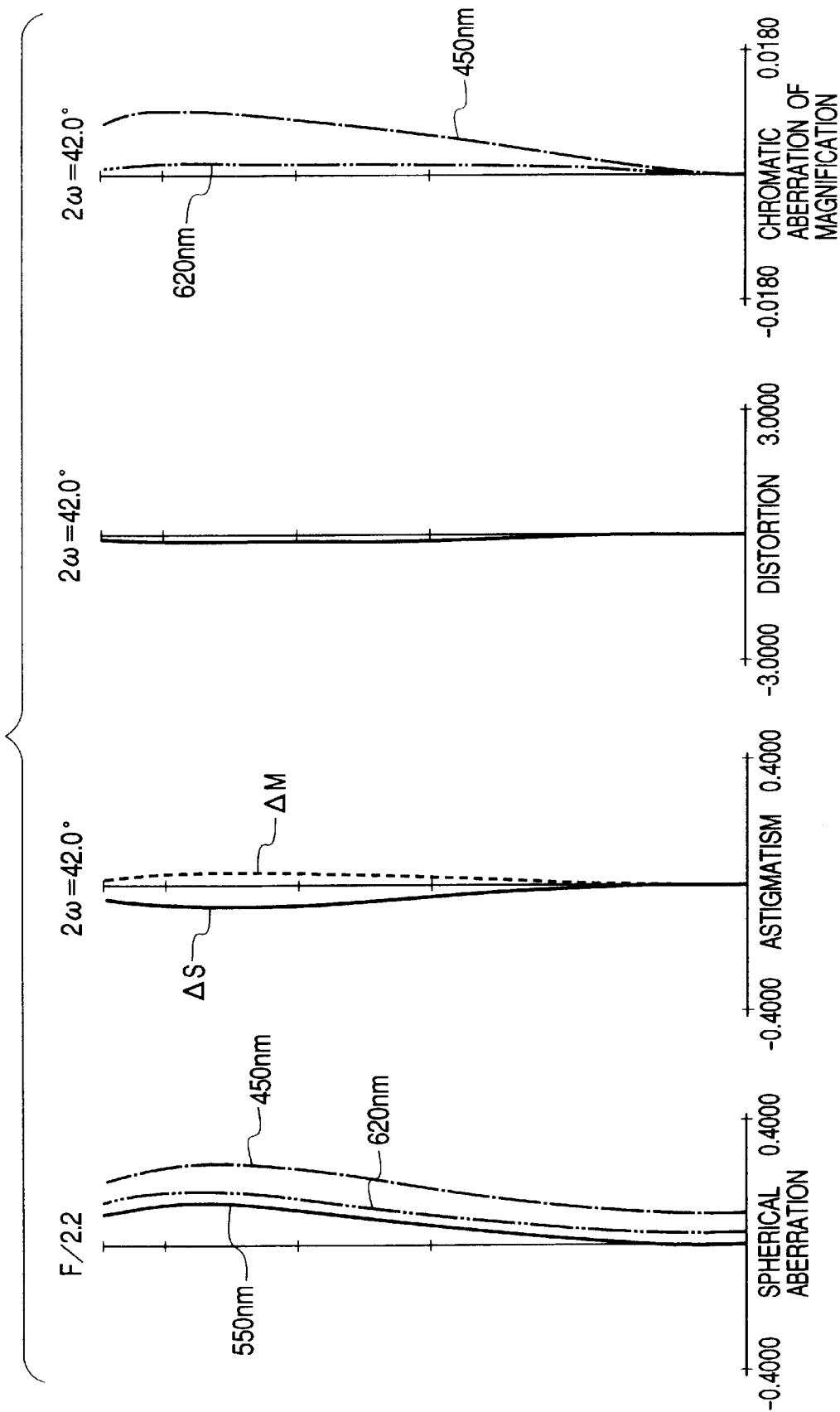

FIG. 5 is a cross-sectional view of the retrofocus zoom lens of the fifth embodiment (at the wideangle extreme), FIGS. 10A and 10B are aberration diagrams thereof, and Table 5 presents the numerical data thereof. The fifth embodiment will be described below.

In the present embodiment, the refracting powers of the respective lens units are negative, positive, positive, negative, positive, and positive in the order named from the enlargement conjugate side. The present embodiment is also an example with the wideangle-extreme F-value of 1.8, but it is different from the fourth embodiment in that the fifth lens unit is provided with an additional convex lens to share the refracting power of the fifth lens unit, instead of the concave lens on the reduction conjugate side in the second lens unit.

Since the structure except for the above is the same as in Embodiment 4, the detailed description thereof is omitted herein.

The above described Embodiments 1 to 5. The following will describe Embodiment 6 and Embodiments thereafter. The optical systems of the present invention are not limited to the projection optical systems used in the liquid crystal projectors and the like, but a variety of other embodiments can be considered. Now let us explain common features to the embodiments wherein the optical system of the present invention is applied to the projection optical system, as to Embodiments 6 to 13.

Each of the zoom lenses (optical systems) in the embodiments is composed of six lens units, a first lens unit (first optical component) L1 of a negative refracting power, a second lens unit (second optical component) L2 of a positive refracting power, a third lens unit (third optical component) L3 of a positive refracting power, a fourth lens unit (fourth optical component) L4 of a negative refracting power, a fifth lens unit (fifth optical component) L5 of a positive or negative refracting power, and a sixth lens unit (sixth optical component) L6 of a positive refracting power in the order named from the enlargement conjugate side (the screen side in the case of a projection optical system of a projector or the object side in the case of a photographic optical system of a camera) to the reduction conjugate side (the image forming element side in the case of the projection optical system of the projector or the image side in the photographic optical system of the camera), as illustrated in FIGS. 11 to 18. Each of the lens units (optical components) is comprised of only a lens or lenses in the embodiments, but the present invention also embraces configurations including other optical elements such as mirrors or the like, without having to be limited to the lenses.

The first lens unit is constructed in a configuration consisting of a biconvex lens, a negative meniscus lens being convex on the enlargement conjugate side, a biconcave lens, and a positive meniscus lens being convex on the enlargement conjugate side, or in a configuration consisting of a biconvex lens, a negative meniscus lens being convex on the enlargement conjugate side, and a negative lens with a strong power on the enlargement conjugate side, in the order named from the enlargement conjugate side. The reason why the positive lenses are disposed on the enlargement conjugate side and on the reduction conjugate side in the first lens unit is that distortion is mainly corrected by the positive lens on the enlargement conjugate side and chromatic aberration is corrected by the positive lens on the reduction conjugate side. The correction of distortion becomes easier at higher heights of off-axial principal rays, because the rays corresponding to the respective image heights pass at different positions. Concerning the correction of the chromatic aberration, particularly, concerning the correction of the chromatic aberration of magnification, it is preferable to effect the chromatic aberration correction at low heights of off-axial principal rays, because the higher-order chromatic aberrations of magnification appear small. The negative lenses are desirably constructed in the above-stated shape in order to disperse negative refracting powers of the respective surfaces and reduce higher-order distortion and coma, and astigmatism.

The second lens unit is composed of a biconvex lens and a negative meniscus lens being convex on the reduction conjugate side, in the order named from the enlargement conjugate side. The lens surface closest to the reduction conjugate side in the second unit corrects the distortion caused by the negative lenses of the first unit and an air lens in the second lens unit corrects large astigmatism caused by the reduction-conjugate-side lens surface of the positive lens closest to the enlargement conjugate side in the first unit.

The third lens unit is composed of one biconvex lens having a strong power on the enlargement conjugate side. In the biconvex lens of the third lens unit, the power of the lens surface on the enlargement conjugate side is stronger than the power of the lens surface on the reduction conjugate side, whereby the biconvex lens can approximately equalize the angles of incidence to and emergence from each lens surface in rays around the pupil at the on-axis image height and is shaped so as to minimize occurrence of spherical aberration due to the third unit.

The fourth lens unit is composed of one negative lens having a strong power on the reduction conjugate side. The fourth lens unit is formed in the above shape in order to decrease the spherical aberration caused by the fourth unit.

The fifth lens unit is composed of a biconcave lens having a strong power on the enlargement conjugate side, a positive lens having a strong power on the reduction conjugate side, and a positive lens having a strong power on the reduction conjugate side, in the order named from the enlargement conjugate side, and the biconcave lens and the positive lens on the enlargement conjugate side are joined to each other. The reason why the negative lens is disposed on the enlargement conjugate side in the fifth lens unit is that the negative lens functions to diverge the rays to ensure the long back focus and the chromatic aberration correction is made at low heights of off-axial principal rays to decrease occurrence of higher-order chromatic aberrations of magnification. The two positive lenses have the shape in which the lens surface on the reduction conjugate side has the stronger power than the lens surface on the other side, in order to disperse refraction of on-axis and off-axis rays.

The sixth lens unit is composed of one positive lens having a strong power on the enlargement conjugate side. Because of the provision of the strong power on the enlargement conjugate side, the distance between the combined principal plane of the first lens unit to the fifth lens unit and each actual ray-refracting point of the sixth lens unit can be made larger with distance from the optical axis, whereby the composite refracting power can be made weaker with decrease in distance of optical path to the marginal edge, thereby decreasing pincushion type distortion on the screen side.

The reason why the unit configuration of the lens units is such that the negative lens unit is placed closest to the enlargement conjugate side and the positive lens unit closest to the reduction conjugate side, is that a focal length shorter than the back focus is realized at the wideangle extreme by the retrofocus configuration as a whole in order to obtain a large projected image at a short projection distance. The positive lens unit on the reduction conjugate side is necessary for making the system telecentric to the conjugate plane on the reduction side. The second, third, fourth, and fifth lens units have a positive refracting power as a whole in the combination of the second, third, fourth, and fifth lens units and move from the reduction conjugate side to the enlargement conjugate side during the zooming from the wideangle extreme to the telephoto extreme, while varying spacings between the lens units, so as to minimize each aberration at each focal length position.

Figure 43:
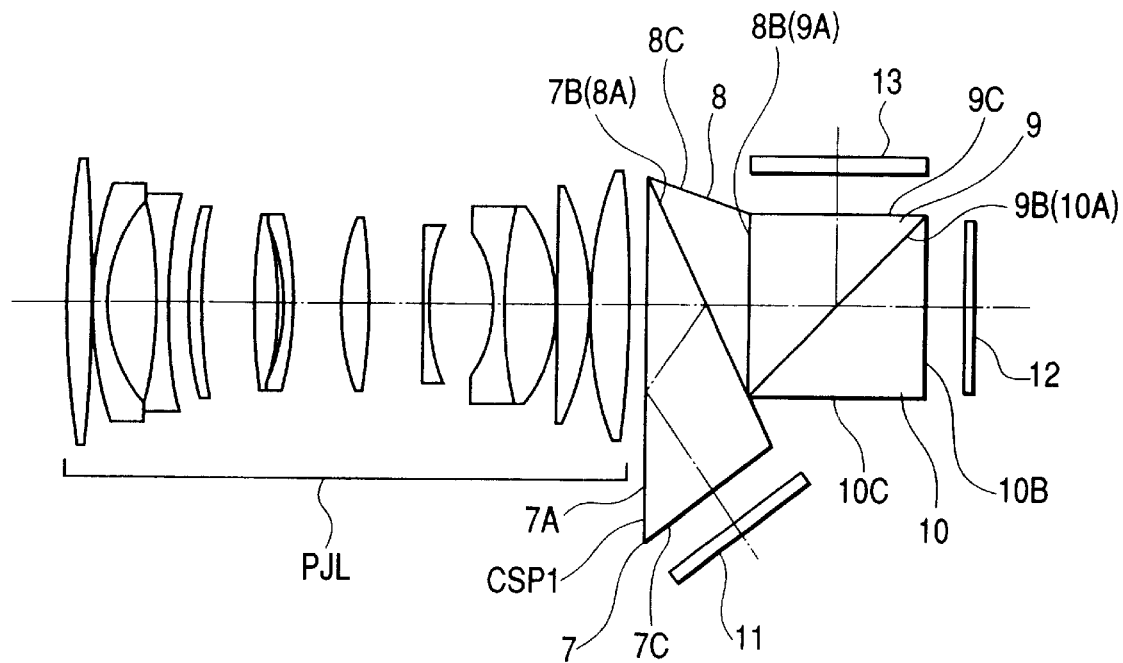
FIG. 43 is a cross-sectional view of the zoom lens and color combining prism in Embodiment 6 of the present invention.

Two types of color combining (color synthesis or composition) prisms are assumed in the embodiments. The first type is the color combining prism illustrated in FIG. 43. This prism is composed of four prism blocks, a dichroic mirror layer for reflecting a first color beam is formed on a 7B surface of a prism block 7, and a dichroic mirror layer for reflecting a second color beam is formed on a 9B surface of a prism block 9. The dichroic mirror layer for the first color beam and the dichroic mirror layer for the second color beam are designed to reflect respective light beams of different wavelength regions and color composition of three colors can be implemented as a whole. Image forming elements 11, 12, 13 form respective images corresponding to the three primary colors. When compared with the conventional color separation prism consisting of three prism blocks, used in video cameras and the like using three CCDs, the prism part between the two dichroic mirror layers is composed of two prism blocks, so as to realize reduction of path length of prism. When compared with the conventional cross dichroic prism, the prism of this type incorporates the two types of dichroic mirror layers not intersecting with each other, whereby the accuracy can be made lower for angles of the prism blocks constituting the color combining prism and whereby the joint accuracy can also be set lower for the work of joining the prism blocks. Thus it is feasible to realize the projection optical system capable of being constructed at very low manufacturing cost.

Figure 44:
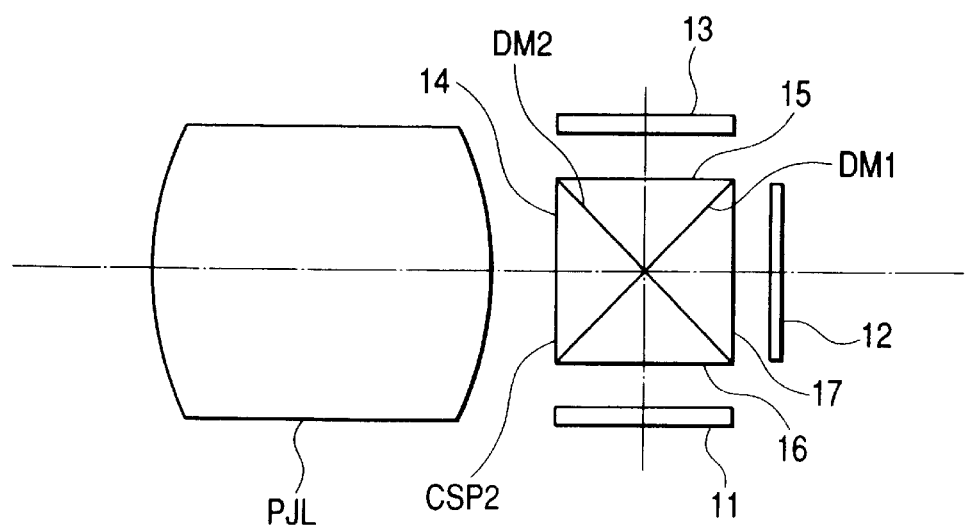
FIG. 44 is a cross-sectional view of the cross dichroic prism combined with the projection lens of the present invention.

The second type is the cross dichroic prism CSP2 of FIG. 44, which is composed of four prism blocks 14, 15, 16, 17 and in which two types of dichroic mirror layers DM1, DM2 intersect with each other. Therefore, it has the advantage of achieving the shortest prism path length as a color combining prism. For this reason, the back focus of the projection lens PJL can be short, thus presenting the advantage of facilitating the design of the projection lens PJL.

Condition equations will be described below. Condition (4) is a condition for defining the total focal length of the zoom lens at the wideangle extreme and the focal length of the second lens unit. In the range below the lower limit of Condition (4), the positive power of the second lens unit becomes weak, so as to diverge the off-axial rays on the enlargement conjugate side of the second lens unit, and thus the effective diameter of the first lens unit is increased, which is not preferred. In the range over the upper limit of Condition (4), the positive power of the second lens unit is too strong, the composite principal point of the second lens unit and the lens units thereafter moves toward the enlargement conjugate side, and the first lens unit needs to be shifted to the enlargement conjugate side in order to realize the short focal length in the overall system. Thus the total lens length becomes large and it is thus not preferred.

Condition (5) is a condition for defining the total focal length of the zoom lens at the wideangle extreme and the focal length of the first lens unit. In the range below the lower limit of Condition (5), the negative power of the first lens unit is too strong and the curvature of field becomes over, which is not preferred. In the range over the upper limit of Condition (5), the negative power of the first lens unit is too weak, it becomes difficult to realize the short focal length in the overall system, and the projection distance becomes large for obtaining a large screen image, which is not preferred.

Condition (6) is a condition for defining the total focal length of the zoom lens at the wideangle extreme and the focal length of the third lens unit. In the range below the lower limit of Condition (6), the positive power of the third lens unit becomes weak, so as to diverge the off-axial rays on the enlargement conjugate side of the third lens unit, and the effective diameter of the first lens unit is increased thereby, which is not preferred. In the range over the upper limit of Condition (6), the positive power of the third lens unit becomes too strong and large spherical aberration appears in the third lens unit, which is not preferable.

Condition (7) is a condition for defining the total focal length of the zoom lens at the wideangle extreme and the focal length of the fourth lens unit. In the range below the lower limit of Condition (7), the negative power of the fourth lens unit becomes too strong, and the curvature of field becomes over, which is not preferable. In the range over the upper limit of Condition (7), the negative power of the fourth lens unit becomes too weak, so that the fourth lens unit fails to adequately diverge the on-axial marginal rays. The back focus is not sufficient in that case, which is not preferable.

Condition (8) is a condition for defining the total focal length of the zoom lens at the wideangle extreme and the focal length of the fifth lens unit. In the range below the lower limit of Condition (8), the negative power of the fifth lens unit becomes strong and the telecentricity to the image plane on the reduction conjugate side becomes deteriorated, which is not preferable. In the range over the upper limit of Condition (8), the positive power of the fifth lens unit becomes too strong and the back focus is not sufficient, which is not preferable.

Condition (9) is a condition for defining the total focal length of the zoom lens at the wideangle extreme and the focal length of the sixth lens unit. In the range below the lower limit of Condition (9), the positive power of the sixth lens unit becomes weak and the telecentricity to the image plane on the reduction conjugate side becomes deteriorated, which is not preferable. In the range over the upper limit of Condition (9), the positive power of the fifth lens unit becomes too strong, the telecentricity to the image plane on the reduction conjugate side becomes deteriorated, and the back focus is not sufficient, which is not preferable.

Condition (10) is a condition for defining a ratio of the back focus on the reduction conjugate side when the conjugate point on the enlargement conjugate side is at infinity to the left of the plane of the drawing, to the total focal length of the zoom lens at the wideangle extreme. The back focus indicates a reduced value from the prism to air. In the range below the lower limit of Condition (10), the space for placement of the color combining prism is not sufficient, which is not preferable.

Condition (11) is a condition for defining a ratio of a moving distance of the second lens unit to a moving distance of the third lens unit during the zooming from the wideangle extreme to the telephoto extreme. In the range below the lower limit of Condition (11), the moving distance of the second lens unit to the enlargement conjugate side becomes smaller during the zooming from the wideangle extreme to the telephoto extreme, so as to decrease the moving distance of the composite principal point of the second lens unit and the lens units thereafter, so that the zoom ratio cannot be set large, which is not preferable. In the range over the upper limit of Condition (11), the moving distance of the second lens unit is too large, and the total lens length becomes large, which is not preferable.

Condition (12) is a condition for defining a ratio of a moving distance of the fourth lens unit to a moving distance of the third lens unit during the zooming from the wideangle extreme to the telephoto extreme. In the range below the lower limit of Condition (12), the moving distance of the fourth lens unit to the enlargement conjugate side becomes smaller during the zooming from the wideangle extreme to the telephoto extreme, thus the moving distance of the fifth lens unit cannot be set large, and the zoom ratio cannot be set large, which is not preferable. In the range over the upper limit of Condition (12), the moving distance of the fourth lens unit is too large, and the total lens length becomes large, which is not preferable.

Condition (13) is a condition for defining a ratio of a moving distance of the fifth lens unit to a moving distance of the third lens unit during the zooming from the wideangle extreme to the telephoto extreme. In the range below the lower limit of Condition (13), the moving distance of the fifth lens unit to the enlargement conjugate side becomes smaller during the zooming from the wideangle extreme to the telephoto extreme, so as to decrease the moving distance of the composite principal point of the second lens unit and the lens units thereafter, so that the zoom ratio cannot be set large, which is not preferable. In the range over the upper limit of Condition (13), the moving distance of the fifth lens unit is too large, and the total lens length becomes large, which is not preferable.

Condition (14) is a condition for defining an absolute value of a ratio of the focal length of the entire system at the wideangle extreme to the position of the reduction-side pupil to the conjugate point at the wideangle extreme. In the region above the upper limit of Condition (14), the telecentricity is deteriorated to the image forming elements such as the liquid crystal panels or the like. When the image forming elements are the liquid crystal panels whose contrast varies according to angles of incidence of light, contrast unevenness appears in the display screen with deterioration of telecentricity. Since angles of incidence to the dichroic mirror layers of the color combining prism differ between rays from the central area and rays from the peripheral area of the image forming elements, there occurs a shift of cutoff wavelength of light, so as to cause chromatic blur.

Condition (15) is a condition for defining the back focus on the reduction conjugate side where the conjugate point on the enlargement conjugate side at the wideangle extreme of the zoom lens is at infinity to the left on the plane of the drawing, and an air-reduced path length of the color combining prism. This condition is met by Embodiments 9 to 13. In the range below the lower limit of Condition (15), the distance is insufficient between the color combining prism and the image forming elements such as the liquid crystal panels or the like, it thus becomes difficult to place the polarizers on the exit side, and it becomes difficult to adequately cool the liquid crystal panels and the exit-side polarizers, which is not preferable. In the range over the upper limit of Condition (15), the distance between the color combining prism and the image forming elements such as the liquid crystal panels or the like, and the spacing between the color combining prism and the projection lens become larger than necessary, so as to increase the total lens length, which is not preferable.

More preferably, the optical system satisfies Eq. (16), whereby the optical characteristics are further improved. This Eq. (16) is satisfied by the sixth to the eighth embodiments using the color combining prism CSP1 consisting of the four prism blocks illustrated in FIG. 43.

Now the sixth to thirteenth embodiments will be described below. The symbols in the embodiments are defined as follows: ri is a radius of curvature of the ith lens surface from the enlargement conjugate side, di a surface spacing between the ith lens surface and the (i+1)th lens surface from the enlargement conjugate side, ni an index of refraction at the d-line of the ith lens from the enlargement conjugate side, and vi an Abbe's number of the ith lens surface from the enlargement conjugate side. Further, CSP represents a dummy glass corresponding to the color combining prism and FP the focal plane on which an image forming element such as a liquid crystal panel is to be placed. In the aberration diagrams, e indicates e-line, F F-line, C C-line, g g-line, M the meridional surface, and S the sagittal surface, and the aberration diagrams of the chromatic aberration of magnification show aberrations based on the e-line.

Sixth Embodiment

Figure 19:
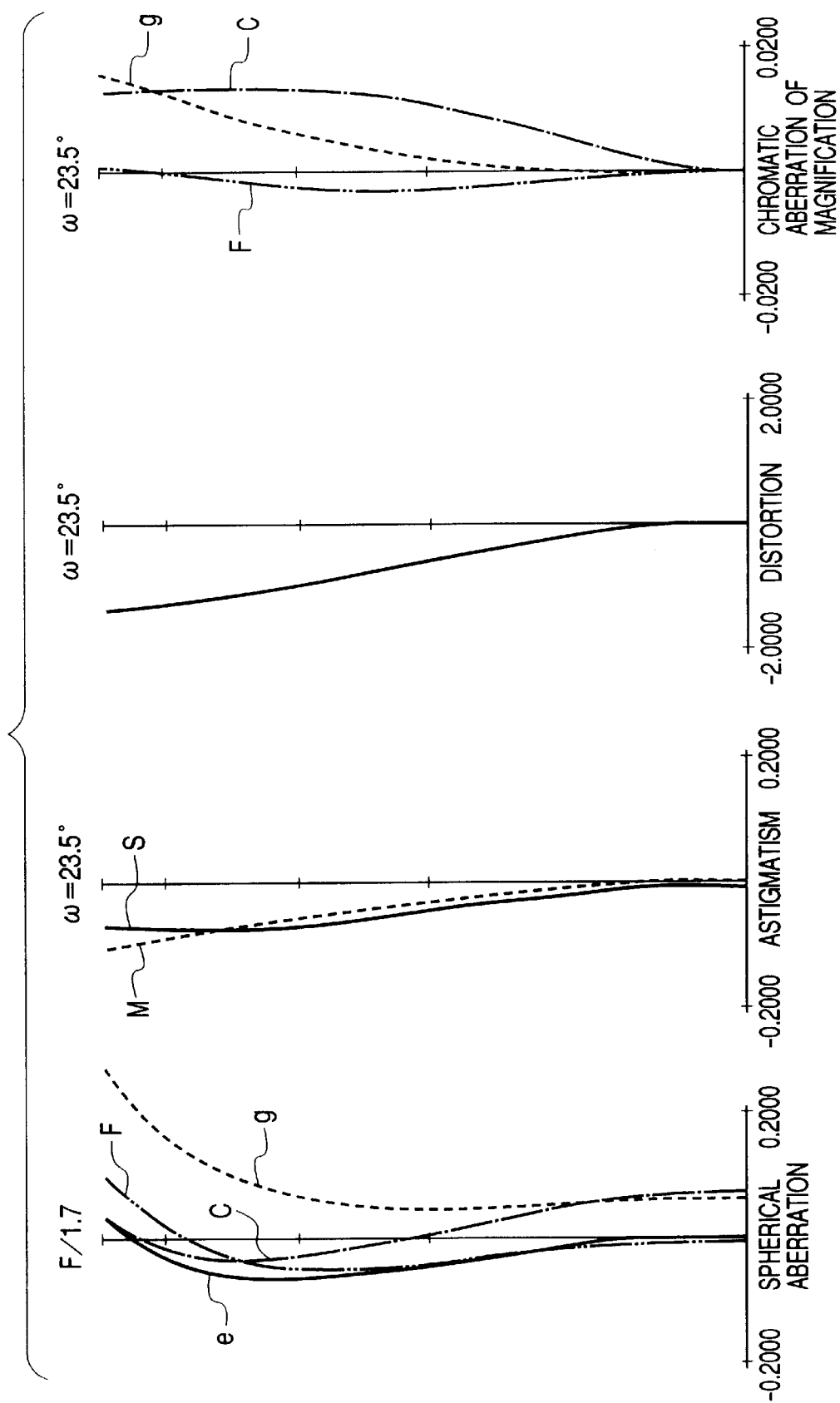
FIG. 19 is aberration diagrams at the wideangle extreme of the zoom lens in Embodiment 6 of the present invention.
Figure 20:
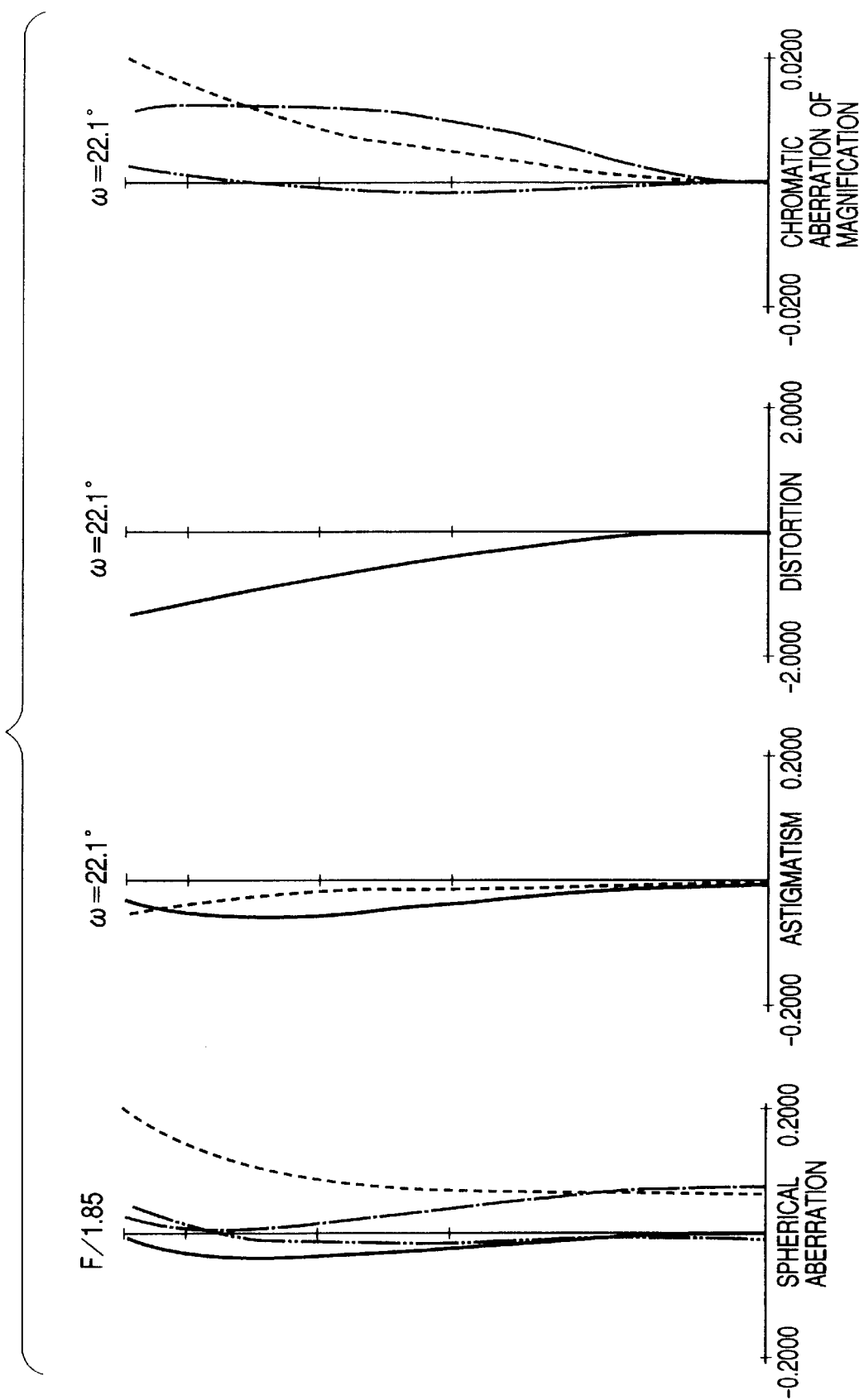
FIG. 20 is aberration diagrams at an intermediate position of the zoom lens in Embodiment 6 of the present invention.
Figure 21:
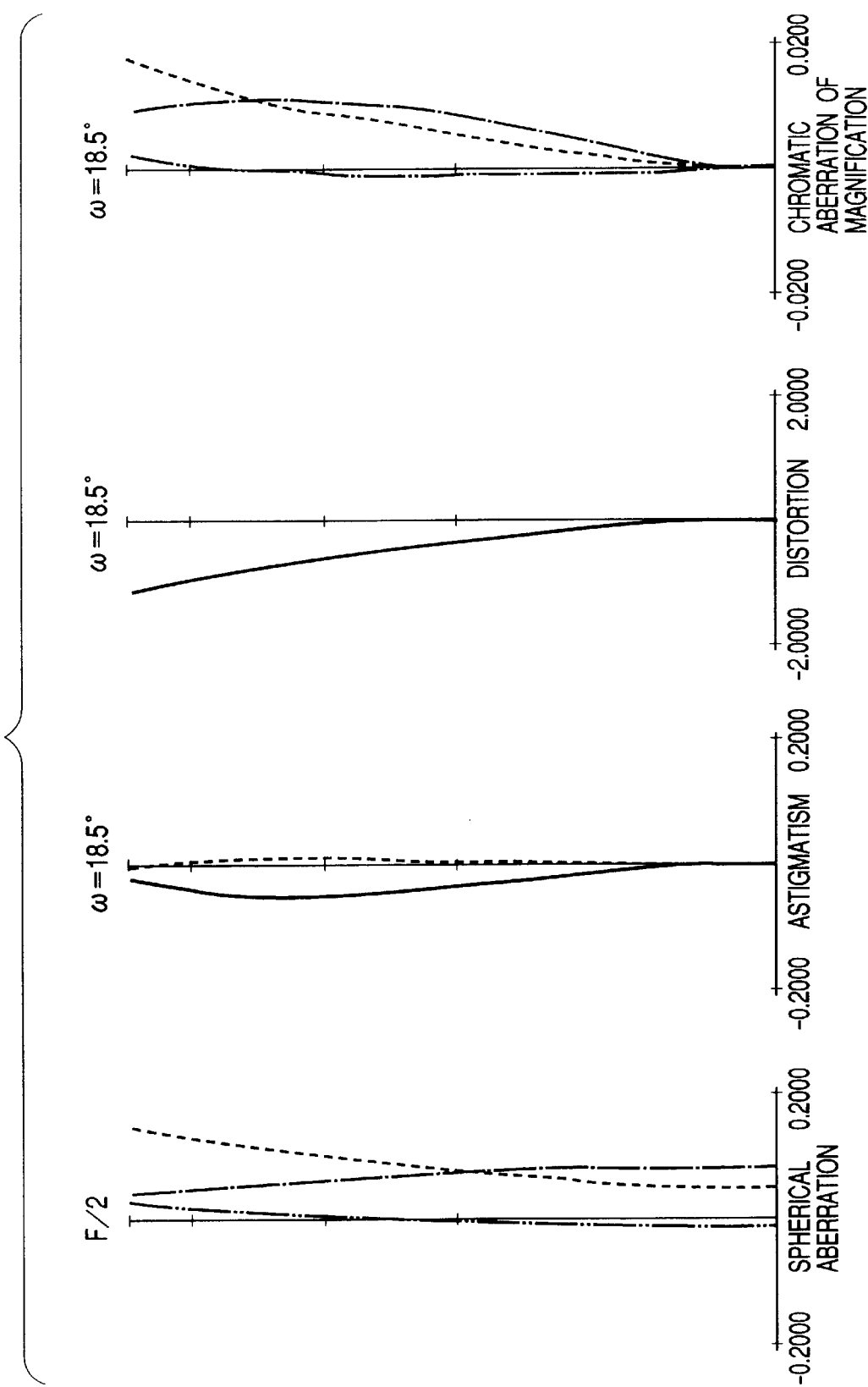
FIG. 21 is aberration diagrams at the telephoto extreme of the zoom lens in Embodiment 6 of the present invention.

FIG. 11 is a cross-sectional view of the lens of the sixth embodiment according to the present invention, FIGS. 19, 20, and 21 are aberration diagrams at the wideangle extreme, at the middle position, and at the telephoto extreme of the zoom lens of the sixth embodiment, and Numerical Example 6 presents designed values of the sixth embodiment. The design example of FIG. 11 is the projection lens for projection of 0.7-inch (effective display range of 14.336 mm×10.752 mm) liquid crystal panel. The projection size is 100 inches at the distance of 4 m at the wideangle extreme. The design example of FIG. 11 is the projection lens designed for the color combining prism (CSP1) consisting of the four prism blocks illustrated in FIG. 43.

The F-number is 1.7 at the wideangle extreme and 2 at the telephoto extreme. Thus the projection lens is an extremely bright lens. The zoom ratio is 1.3.

Seventh Embodiment

Figure 12:
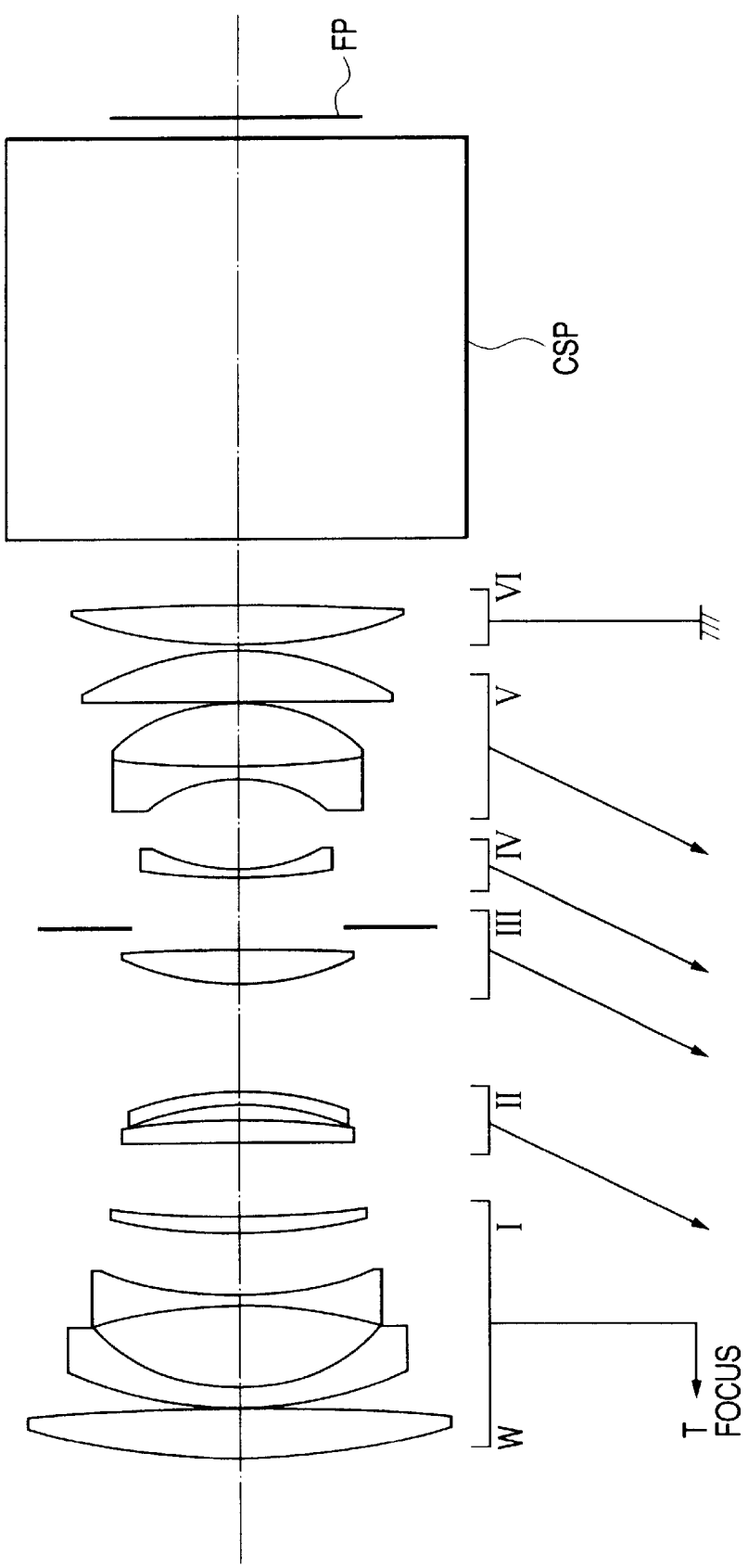
FIG. 12 is a cross-sectional view of the zoom lens in Embodiment 7 of the present invention.
Figure 22:
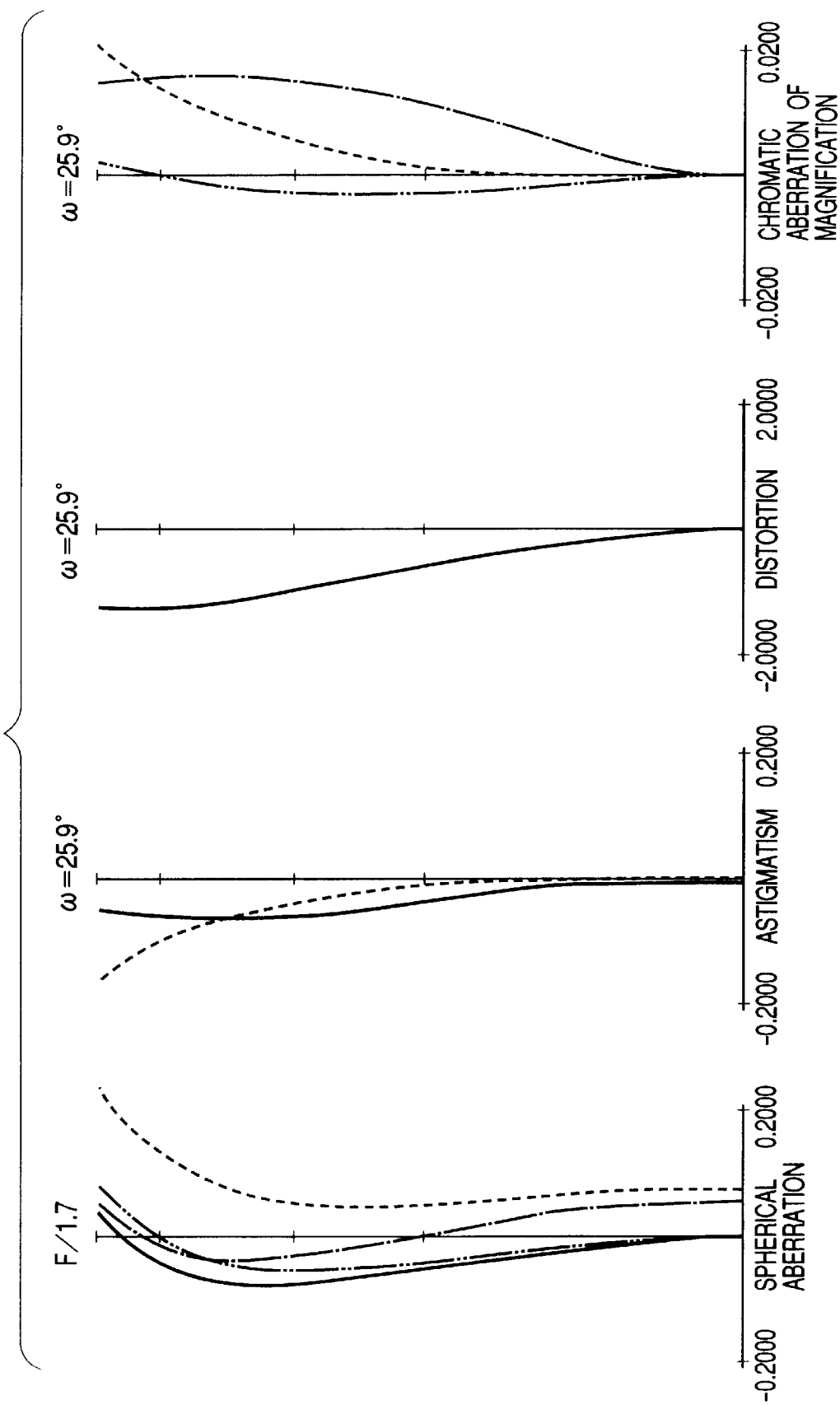
FIG. 22 is aberration diagrams at the wideangle extreme of the zoom lens in Embodiment 7 of the present invention.
Figure 23:
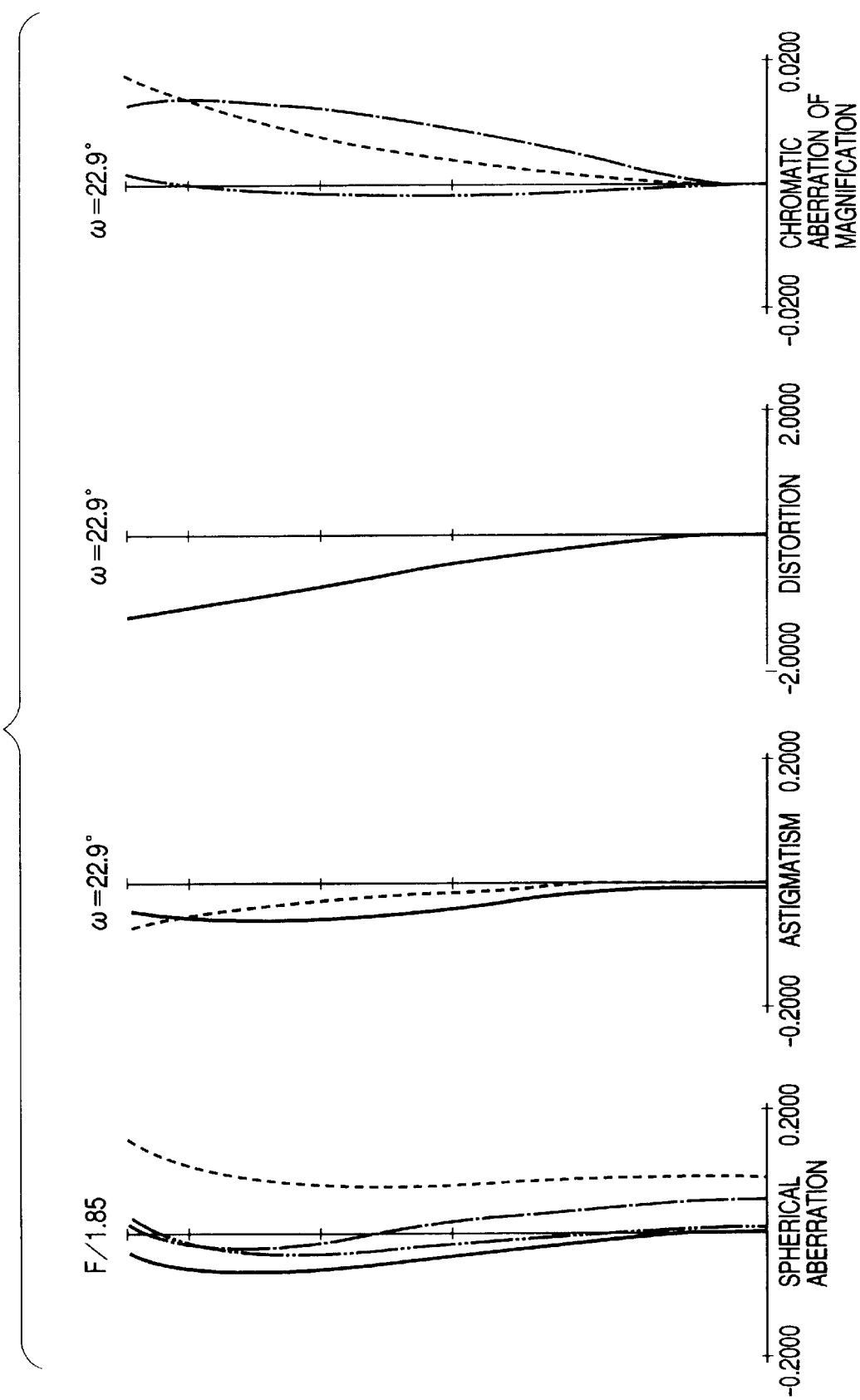
FIG. 23 is aberration diagrams at an intermediate position of the zoom lens in Embodiment 7 of the present invention.
Figure 24:
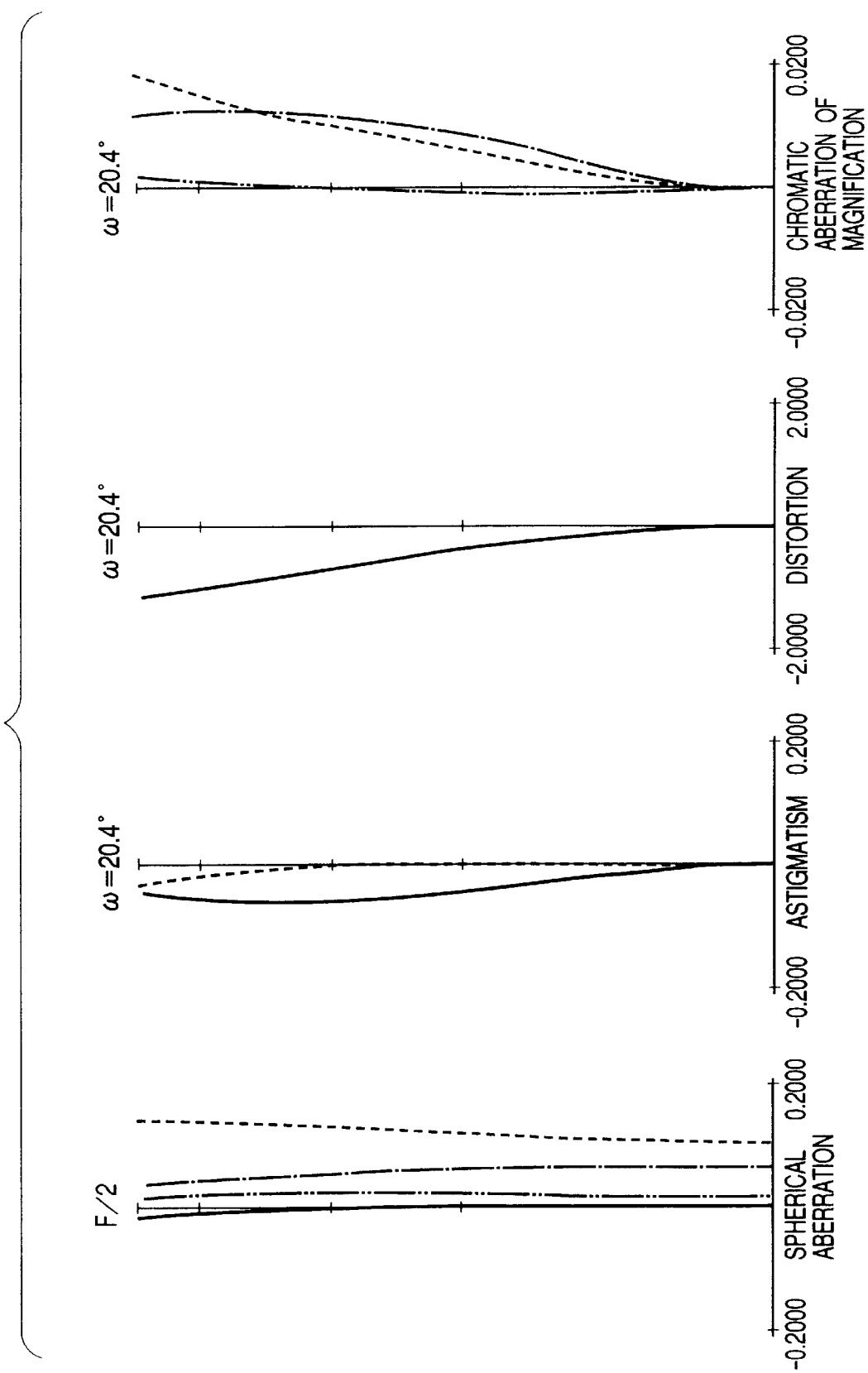
FIG. 24 is aberration diagrams at the telephoto extreme of the zoom lens in Embodiment 7 of the present invention.

FIG. 12 is a cross-sectional view of the lens of the seventh embodiment according to the present invention, FIGS. 22, 23, and 24 are aberration diagrams at the wideangle extreme, at the middle position, and at the telephoto extreme of the zoom lens of the seventh embodiment, and Numerical Example 7 presents designed values of the seventh embodiment. The design example of FIG. 12 is also the projection lens for projection of 0.7-inch (effective display range of 14.336 mm×10.752 mm) liquid crystal panel. The projection size is 100 inches at the distance of 3.6 m at the wideangle extreme.

The F-number is 1.7 at the wideangle extreme and 2 at the telephoto extreme. Thus the projection lens is an extremely bright lens. The zoom ratio is 1.3. The design example of FIG. 12 is also the projection lens designed for the color combining prism CSP1 consisting of the four prism blocks illustrated in FIG. 43. The structure is almost similar to the embodiment of FIG. 11, but the focal length range is shifted to the shorter focus side, whereby a larger screen image can be obtained at the same projection distance, as compared with the embodiment of FIG. 11. For achievement of wider angle, the total lens length and the front-lens effective diameter are slightly larger than those in Embodiment 6.

Eighth Embodiment

Figure 13:
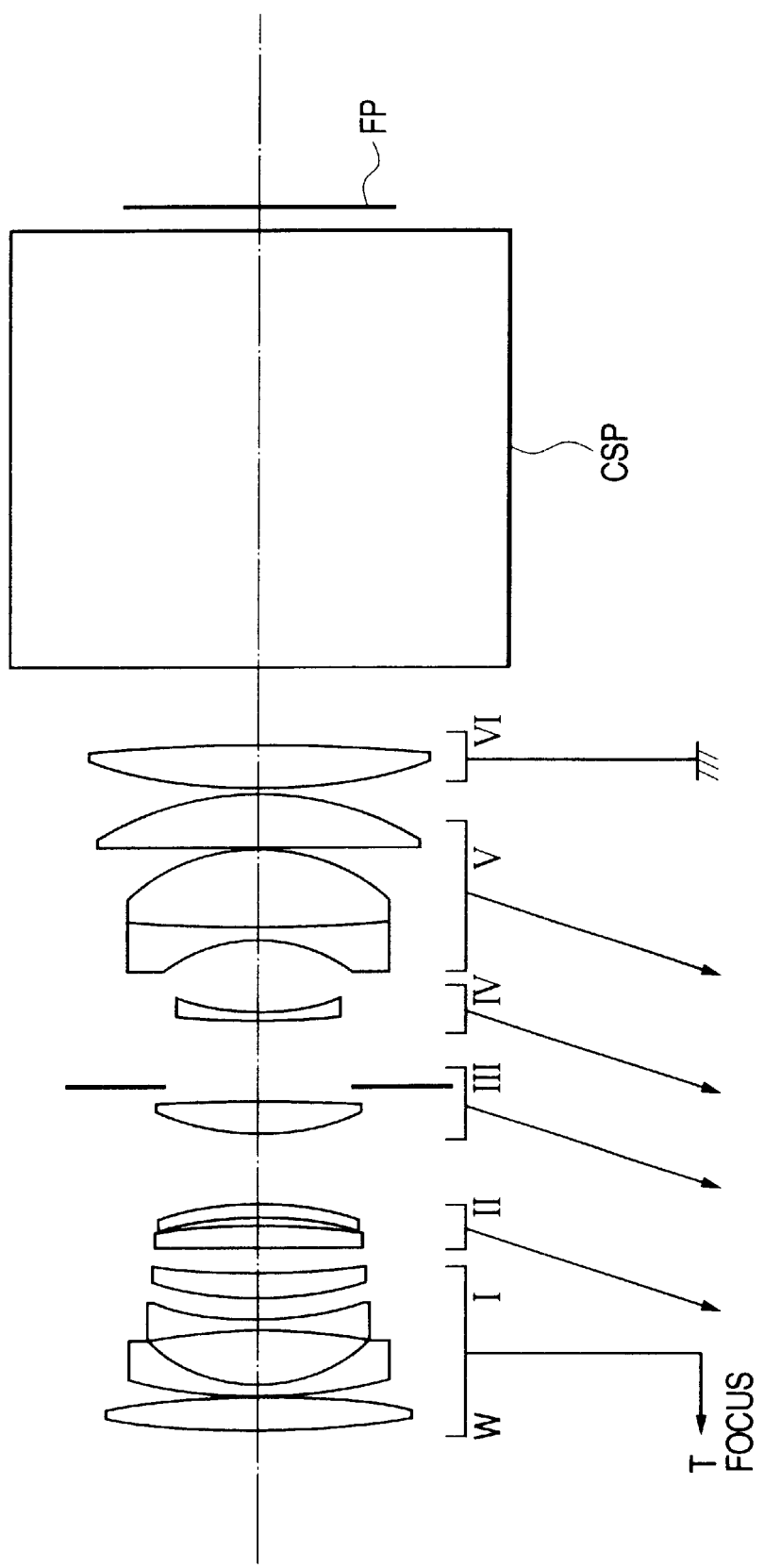
FIG. 13 is a cross-sectional view of the zoom lens in Embodiment 8 of the present invention.
Figure 25:
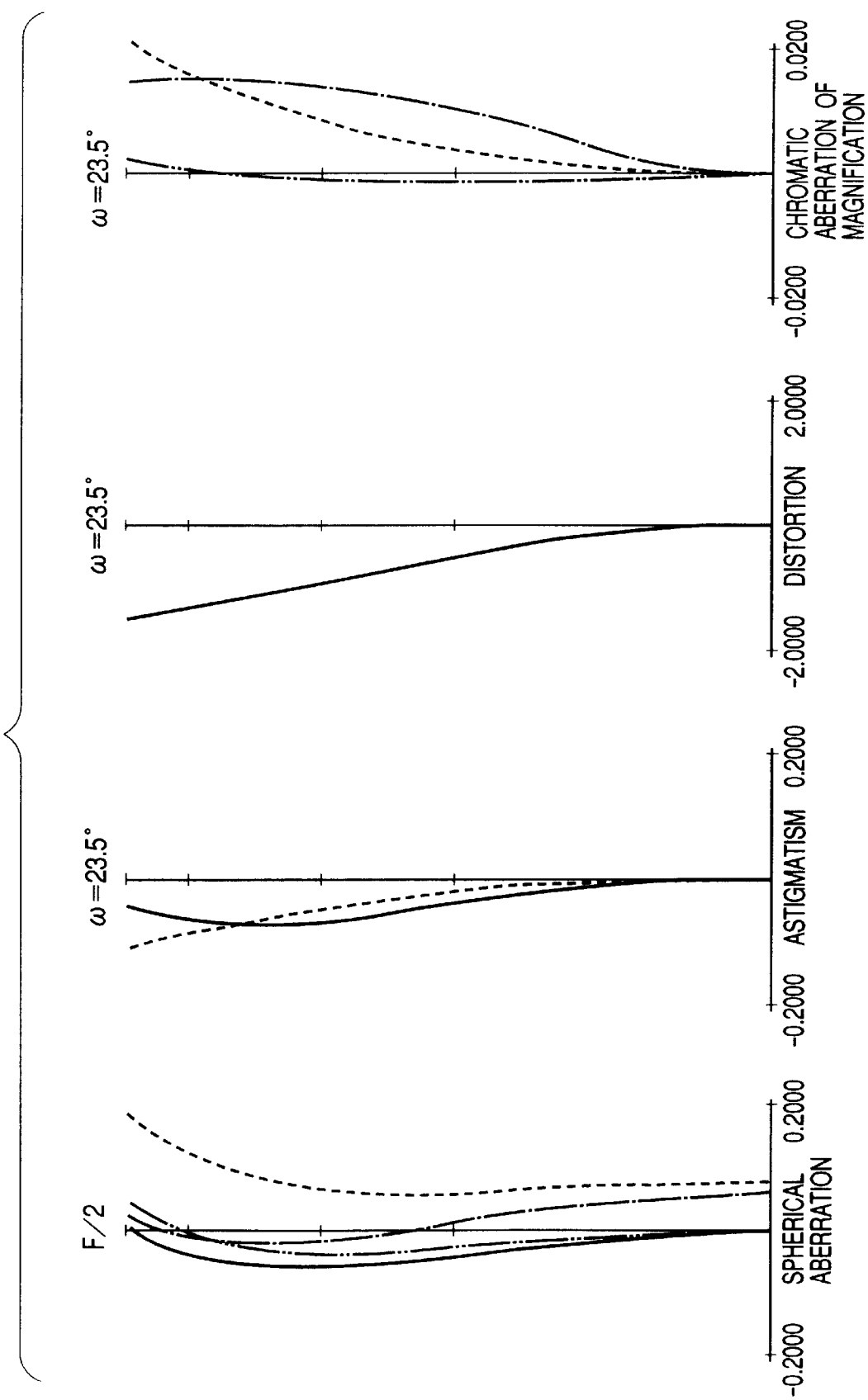
FIG. 25 is aberration diagrams at the wideangle extreme of the zoom lens in Embodiment 8 of the present invention.
Figure 26:
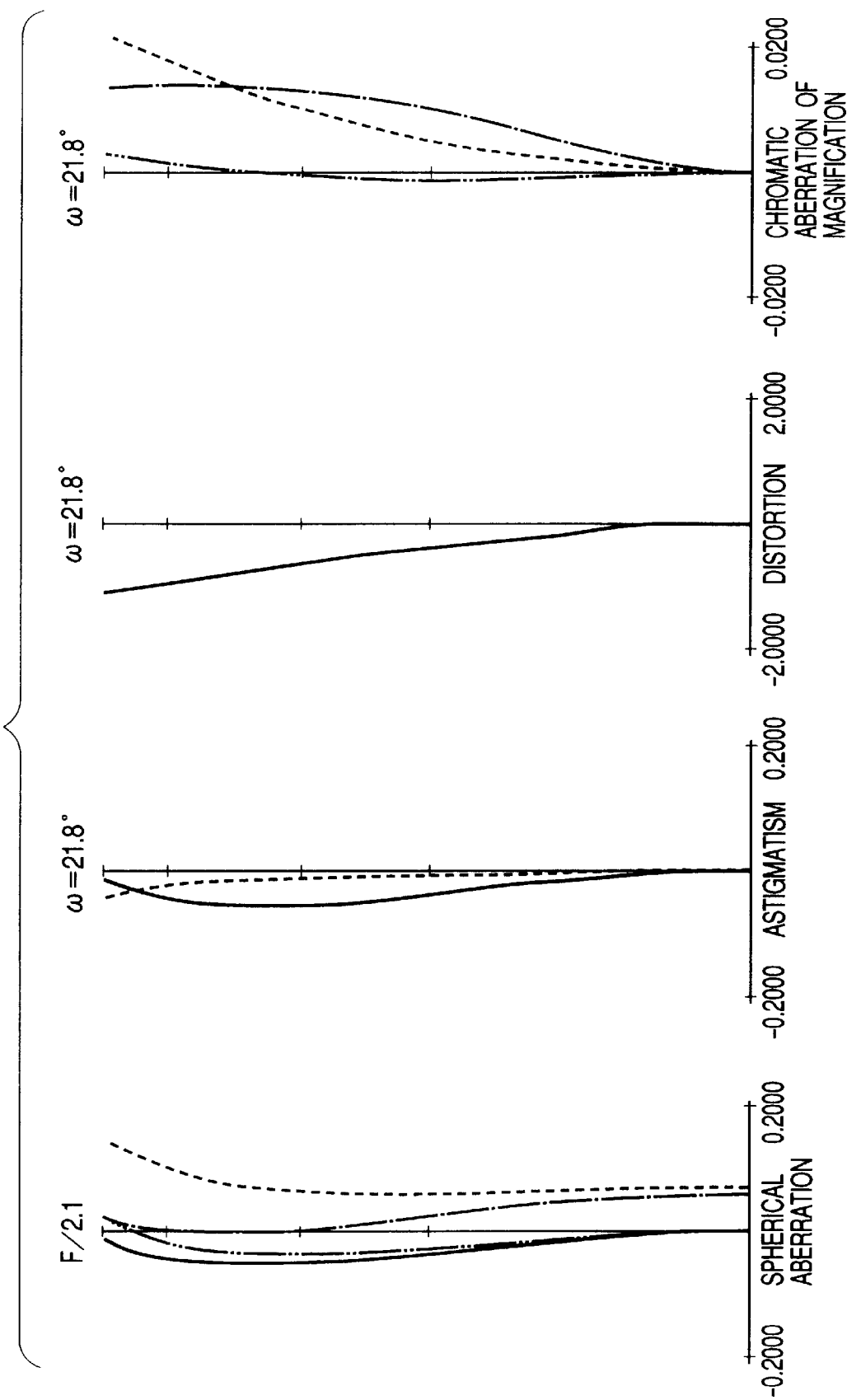
FIG. 26 is aberration diagrams at an intermediate position of the zoom lens in Embodiment 8 of the present invention.
Figure 27:
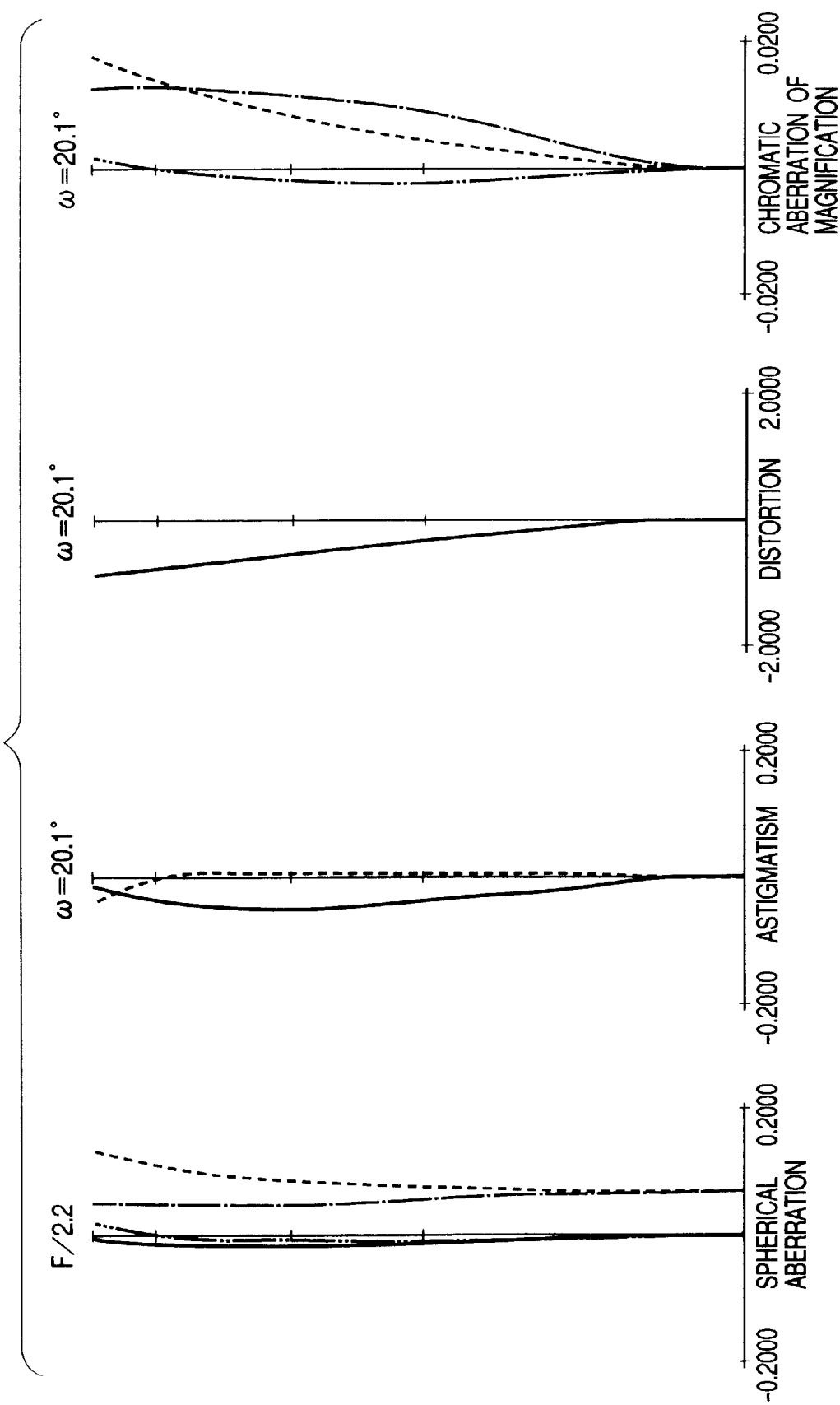
FIG. 27 is aberration diagrams at the telephoto extreme of the zoom lens in Embodiment 8 of the present invention.

FIG. 13 is a cross-sectional view of the lens of the eighth embodiment according to the present invention, FIGS. 25, 26, and 27 are aberration diagrams at the wideangle extreme, at the middle position, and at the telephoto extreme of the zoom lens of the eighth embodiment, and Numerical Example 8 presents designed values of the eighth embodiment. The design example of FIG. 13 is also the projection lens for projection of 0.7-inch (effective display range of 14.336 mm×10.752 mm) liquid crystal panel. The projection size is 100 inches at the distance of 4 m at the wideangle extreme.

The F-number is 2 at the wideangle extreme and 2.2 at the telephoto extreme. Thus the projection lens is a bright lens. The zoom ratio is 1.2. The design example of FIG. 13 is also the projection lens designed for the color combining prism CSP1 consisting of the four prism blocks illustrated in FIG. 43. The structure is almost similar to that in the embodiment of FIG. 11, but this lens is the design example of smaller size by shifting the F-number at the wideangle extreme from F1.7 to darker F2 and lowering the spec of the zoom ratio from 1.3 down to 1.2. The total lens length of Embodiment 8 (the distance from the vertex of the lens surface closest to the enlargement conjugate side to the conjugate point on the reduction conjugate side) is very small, 116.487 mm, as compared with the total lens length of Embodiment 6 of 131.7 mm and the total lens length of Embodiment 7 of 139.813 mm.

Ninth Embodiment

Figure 14:
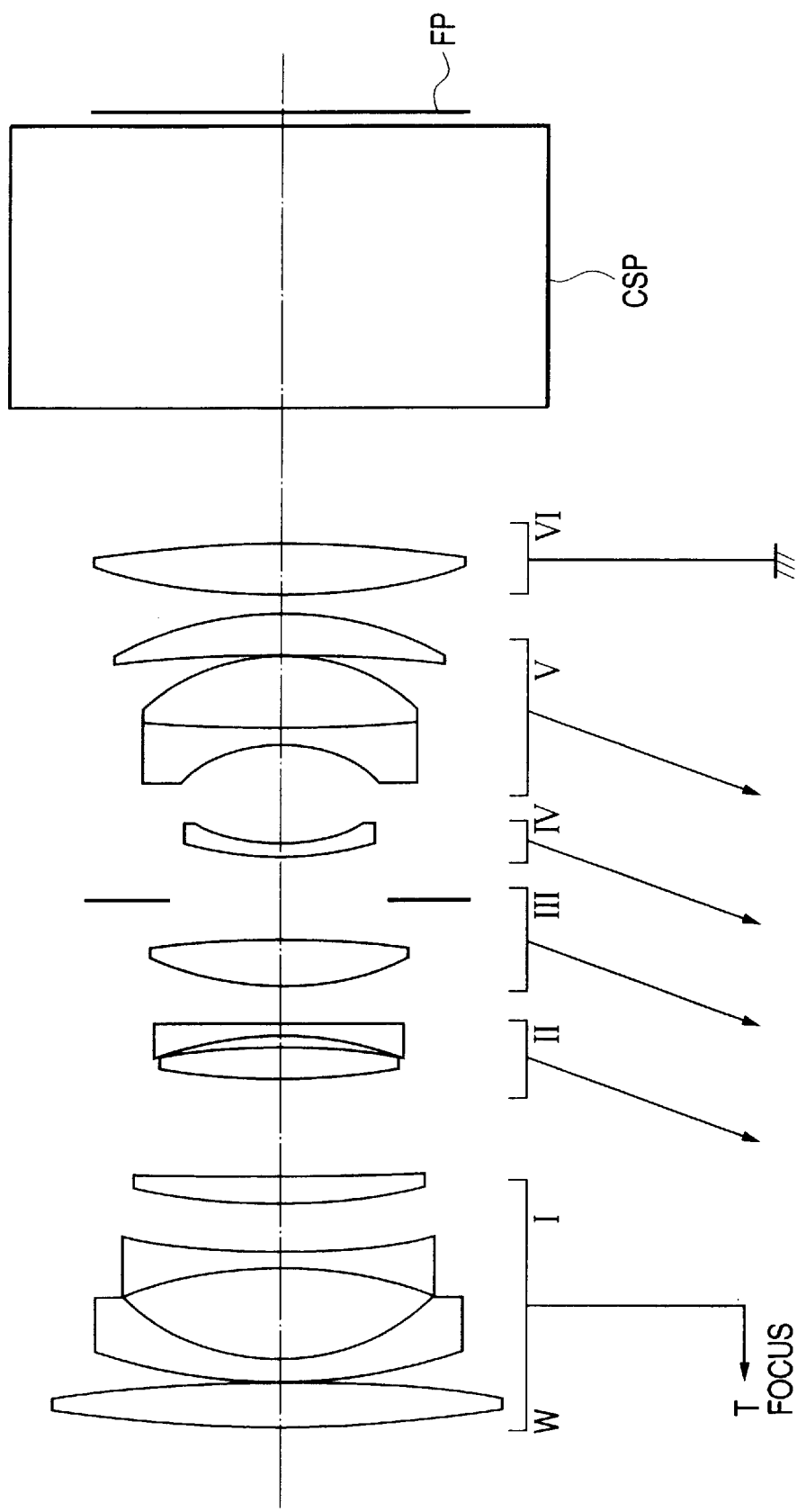
FIG. 14 is a cross-sectional view of the zoom lens in Embodiment 9 of the present invention.
Figure 28:
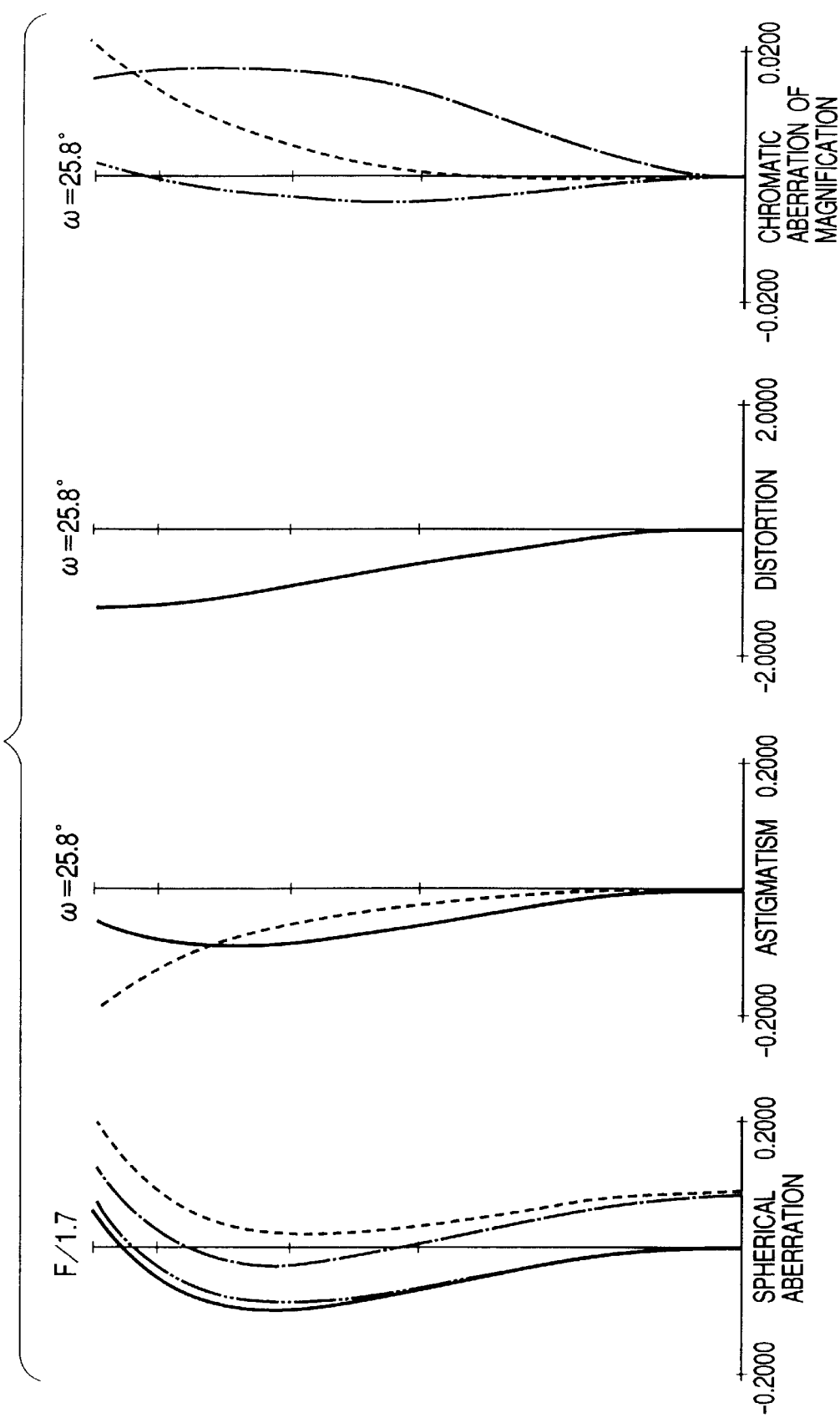
FIG. 28 is aberration diagrams at the wideangle extreme of the zoom lens in Embodiment 9 of the present invention.
Figure 29:
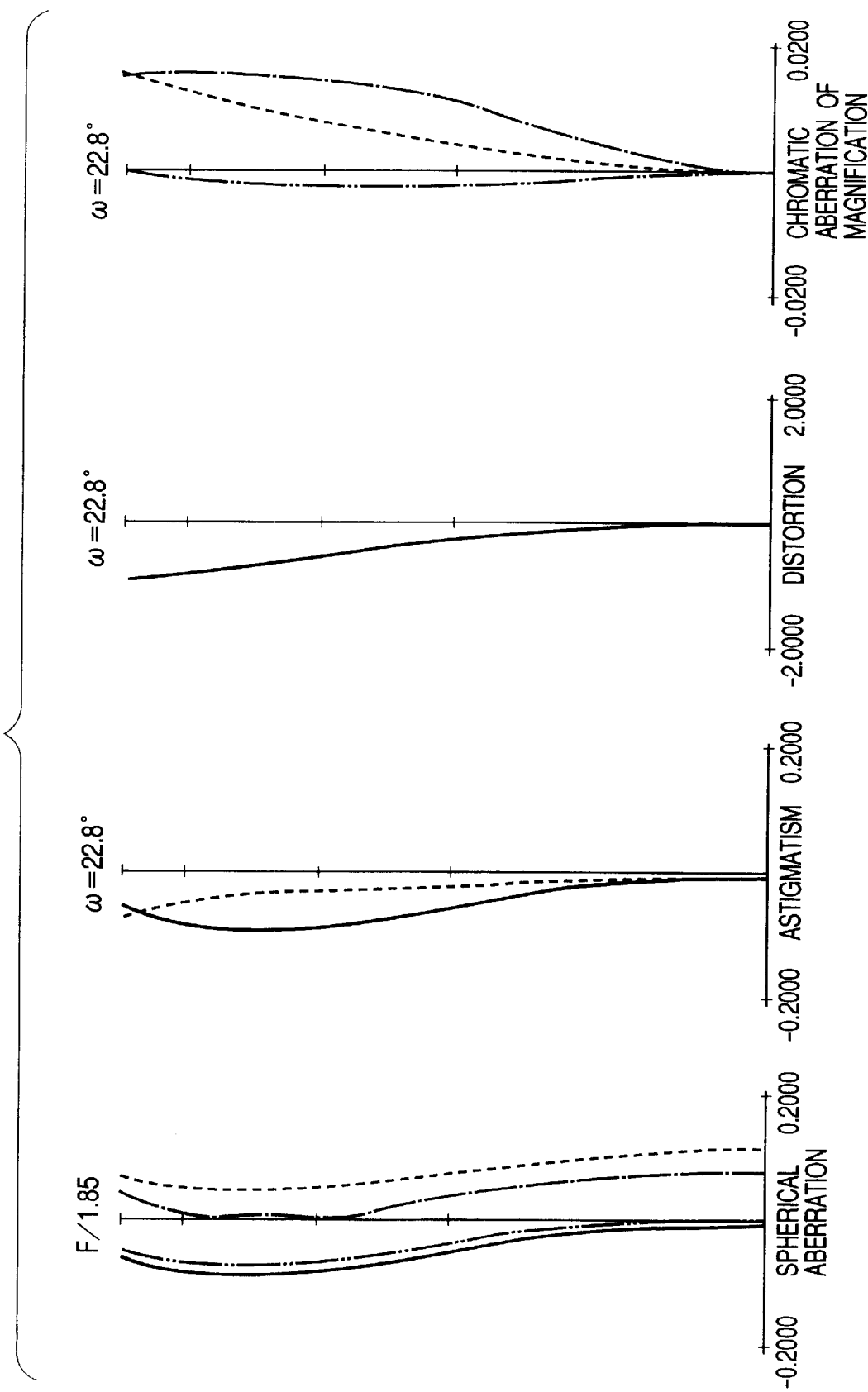
FIG. 29 is aberration diagrams at an intermediate position of the zoom lens in Embodiment 9 of the present invention.
Figure 30:
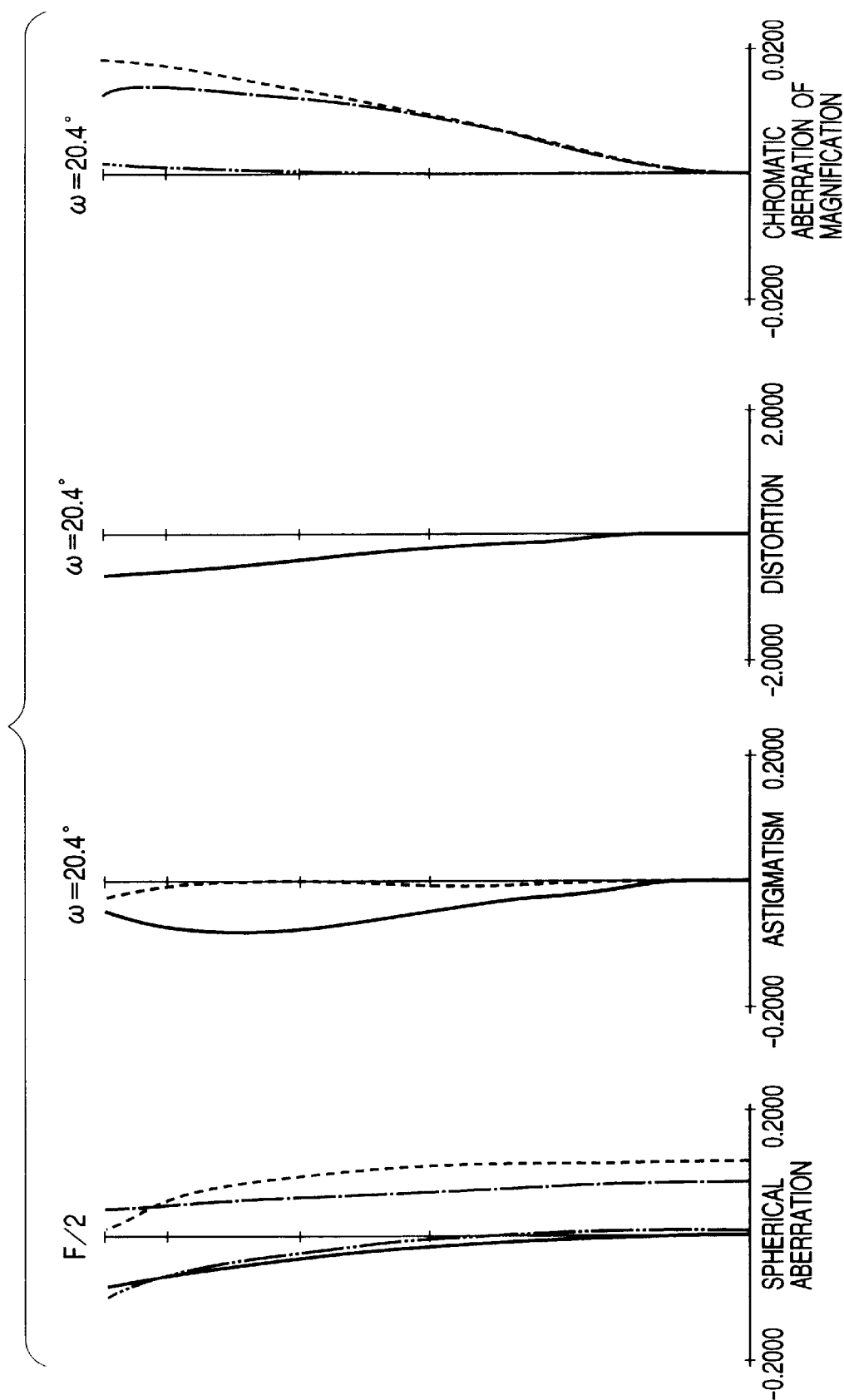
FIG. 30 is aberration diagrams at the telephoto extreme of the zoom lens in Embodiment 9 of the present invention.

FIG. 14 is a cross-sectional view of the lens of the ninth embodiment according to the present invention, FIGS. 28, 29, and 30 are aberration diagrams at the wideangle extreme, at the middle position, and at the telephoto extreme of the zoom lens of the ninth embodiment, and Numerical Example 9 presents designed values of the ninth embodiment. The design example of FIG. 14 is the projection lens for projection of 0.9-inch (effective display range of 18.432 mm×13.824 mm) liquid crystal panel. The projection size is 100 inches at the distance of 3.6 m at the wideangle extreme.

The F-number is 1.7 at the wideangle extreme and 2 at the telephoto extreme. Thus the projection lens is an extremely bright lens. The zoom ratio is 1.3. The design example of FIG. 14 is the projection lens designed for the cross dichroic prism CSP2 illustrated in FIG. 44. The lens configuration is similar to those in the embodiments of FIGS. 11 to 13, but the total lens length is extremely small in view of the panel size, because the ratio of the back focus to the focal length at the wideangle extreme is smaller than those in Embodiments 6 to 8.

Tenth Embodiment

Figure 15:
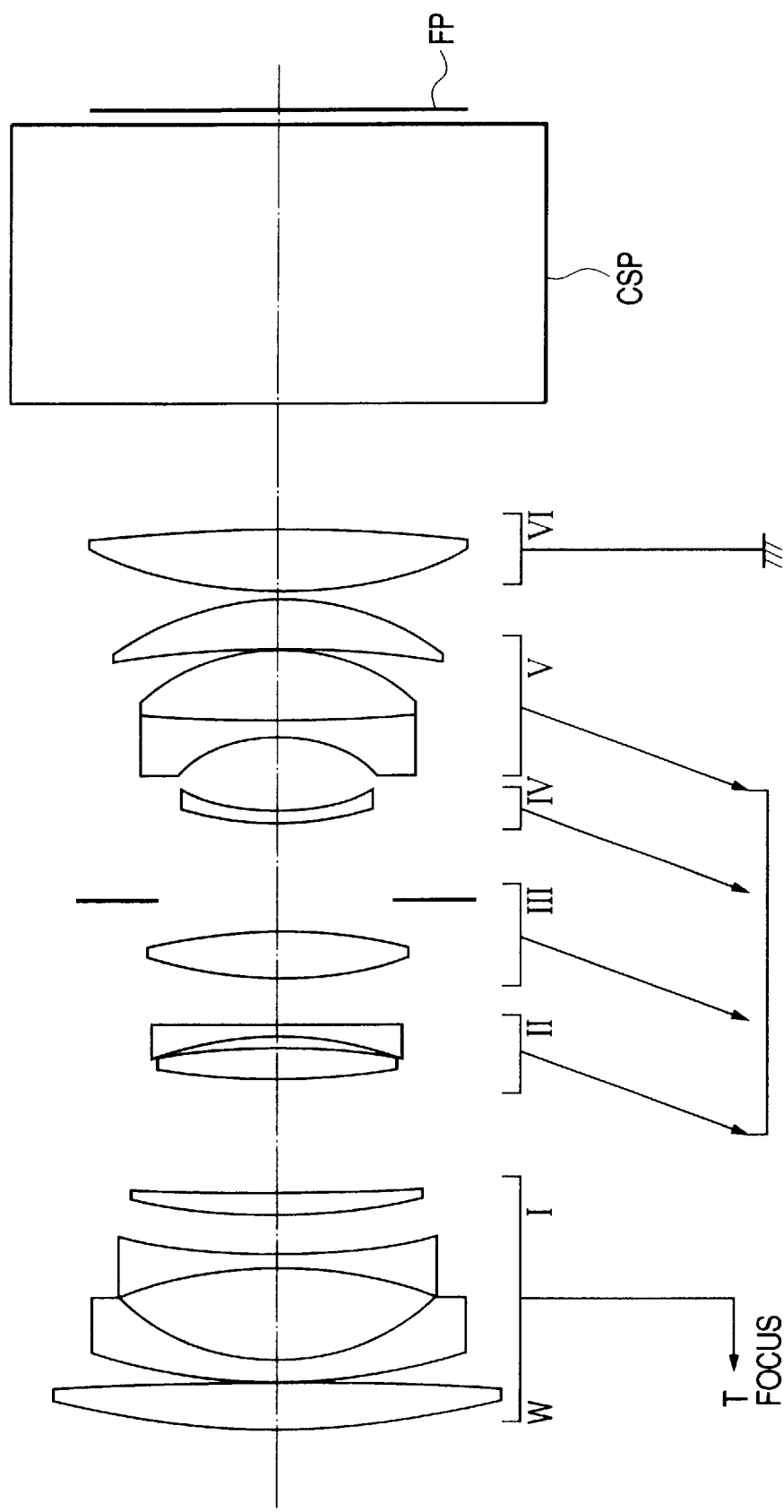
FIG. 15 is a cross-sectional view of the zoom lens in Embodiment 10 of the present invention.
Figure 31:
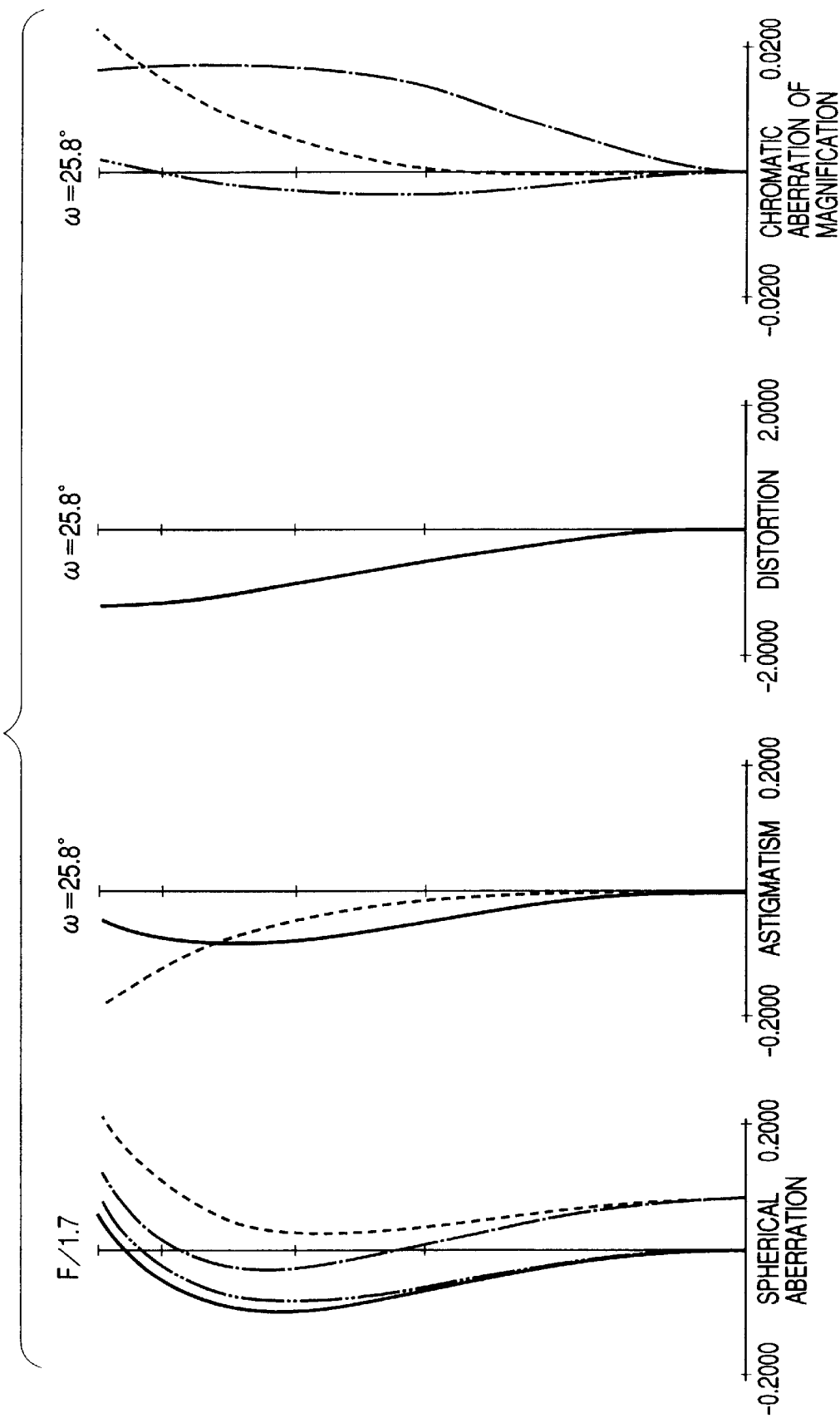
FIG. 31 is aberration diagrams at the wideangle extreme of the zoom lens in Embodiment 10 of the present invention.
Figure 32:
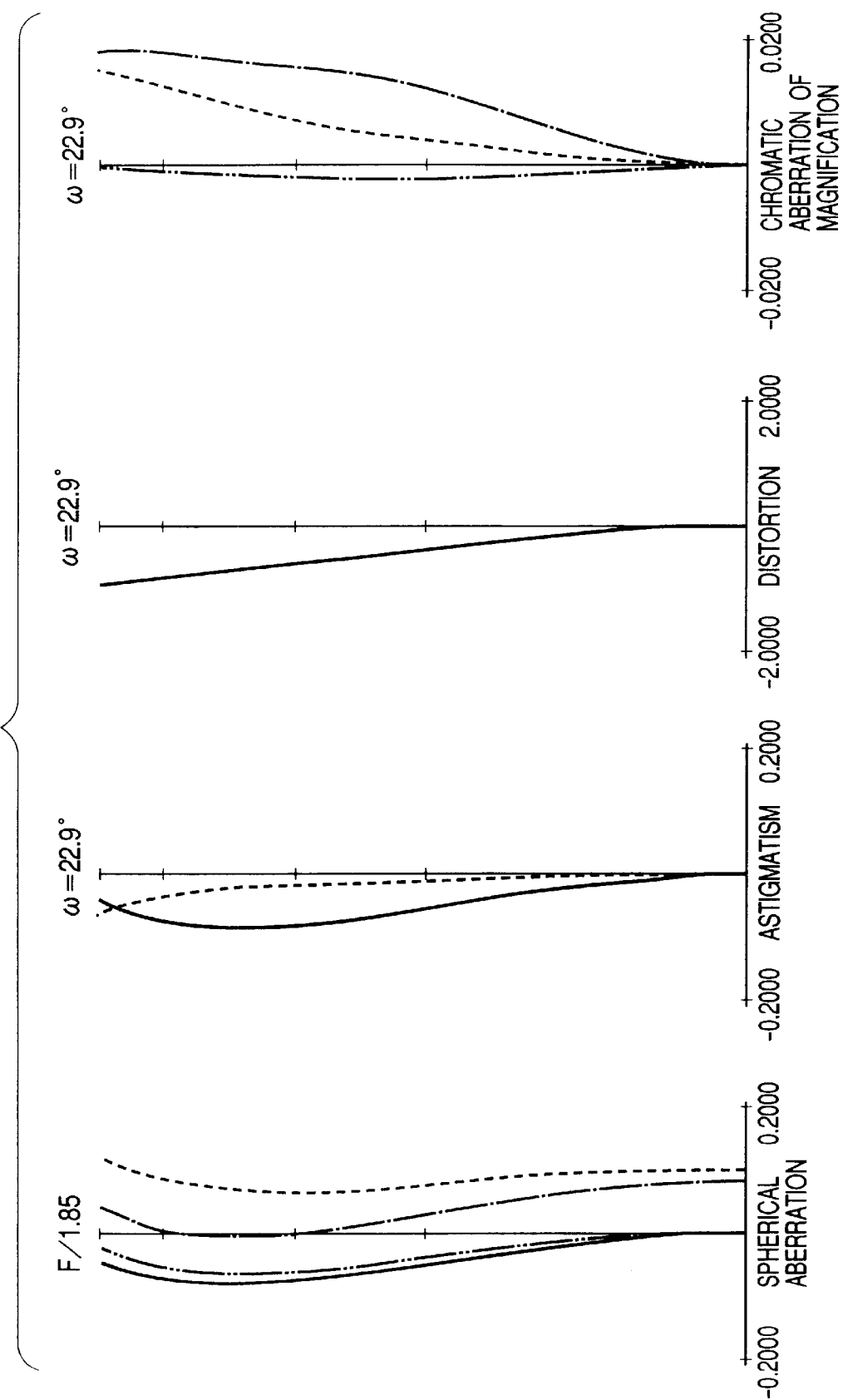
FIG. 32 is aberration diagrams at an intermediate position of the zoom lens in Embodiment 10 of the present invention.
Figure 33:
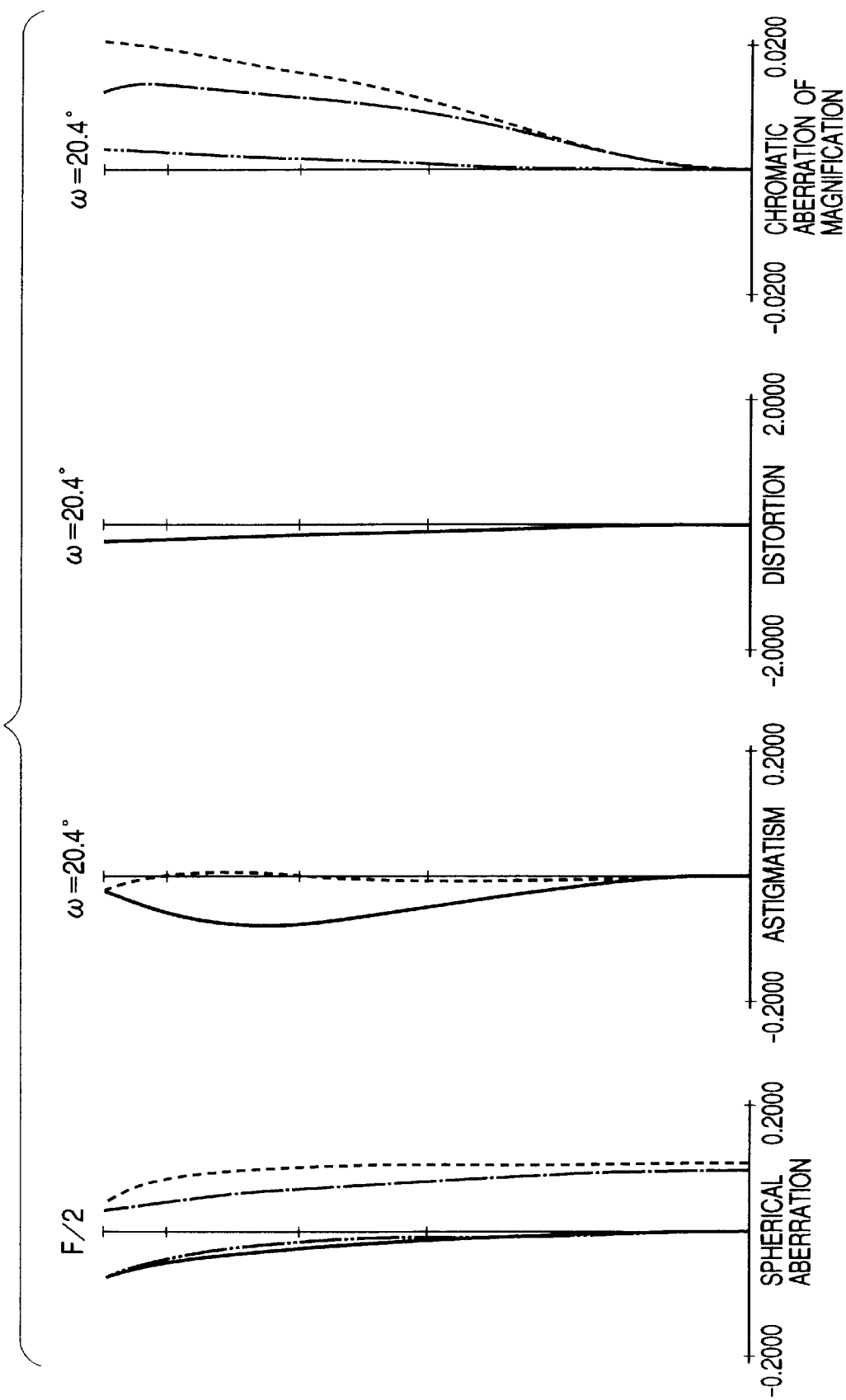
FIG. 33 is aberration diagrams at the telephoto extreme of the zoom lens in Embodiment 10 of the present invention.

FIG. 15 is a cross-sectional view of the lens of the tenth embodiment according to the present invention, FIGS. 31, 32, and 33 are aberration diagrams at the wideangle extreme, at the middle position, and at the telephoto extreme of the zoom lens of the tenth embodiment, and Numerical Example 10 presents designed values of the tenth embodiment. The design example of FIG. 15 is also the projection lens for projection of 0.9-inch (effective display range of 18.432 mm×13.824 mm) liquid crystal panel. The projection size is 100 inches at the distance of 3.6 m at the wideangle extreme.

The F-number is 1.7 at the wideangle extreme and 2 at the telephoto extreme. Thus the projection lens is an extremely bright lens. The zoom ratio is 1.3. The design example of FIG. 15 is also the projection lens designed for the cross dichroic prism CSP2 illustrated in FIG. 44. The lens configuration is almost similar to that in the embodiment of FIG. 14, but the second lens unit II and the fifth lens unit V are integrally moved during the zooming, whereby the number of cam grooves in the unrepresented lens barrel can be reduced by one, thus realizing cost reduction.

Eleventh Embodiment

Figure 16:
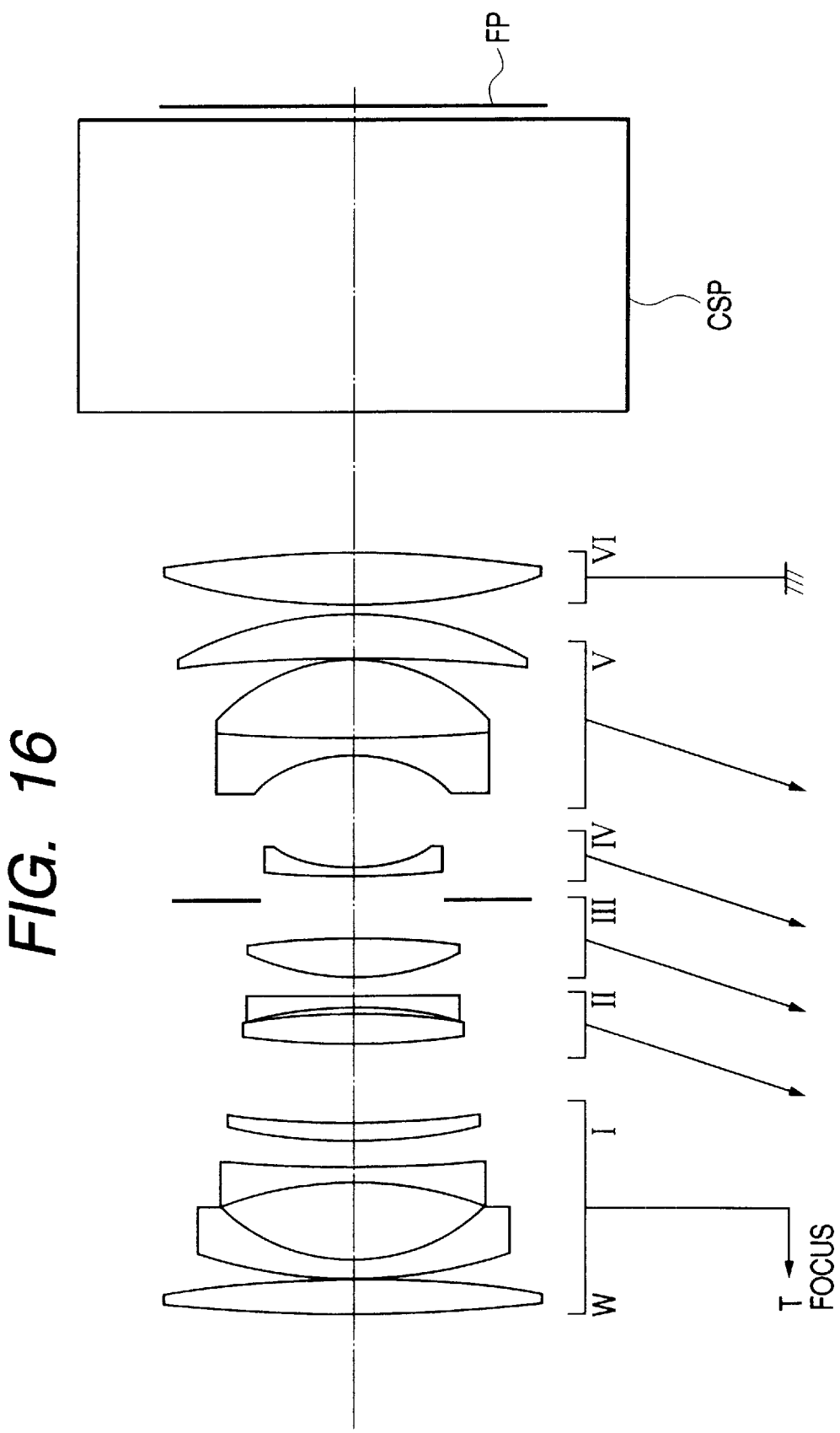
FIG. 16 is a cross-sectional view of the zoom lens in Embodiment 11 of the present invention.
Figure 34:
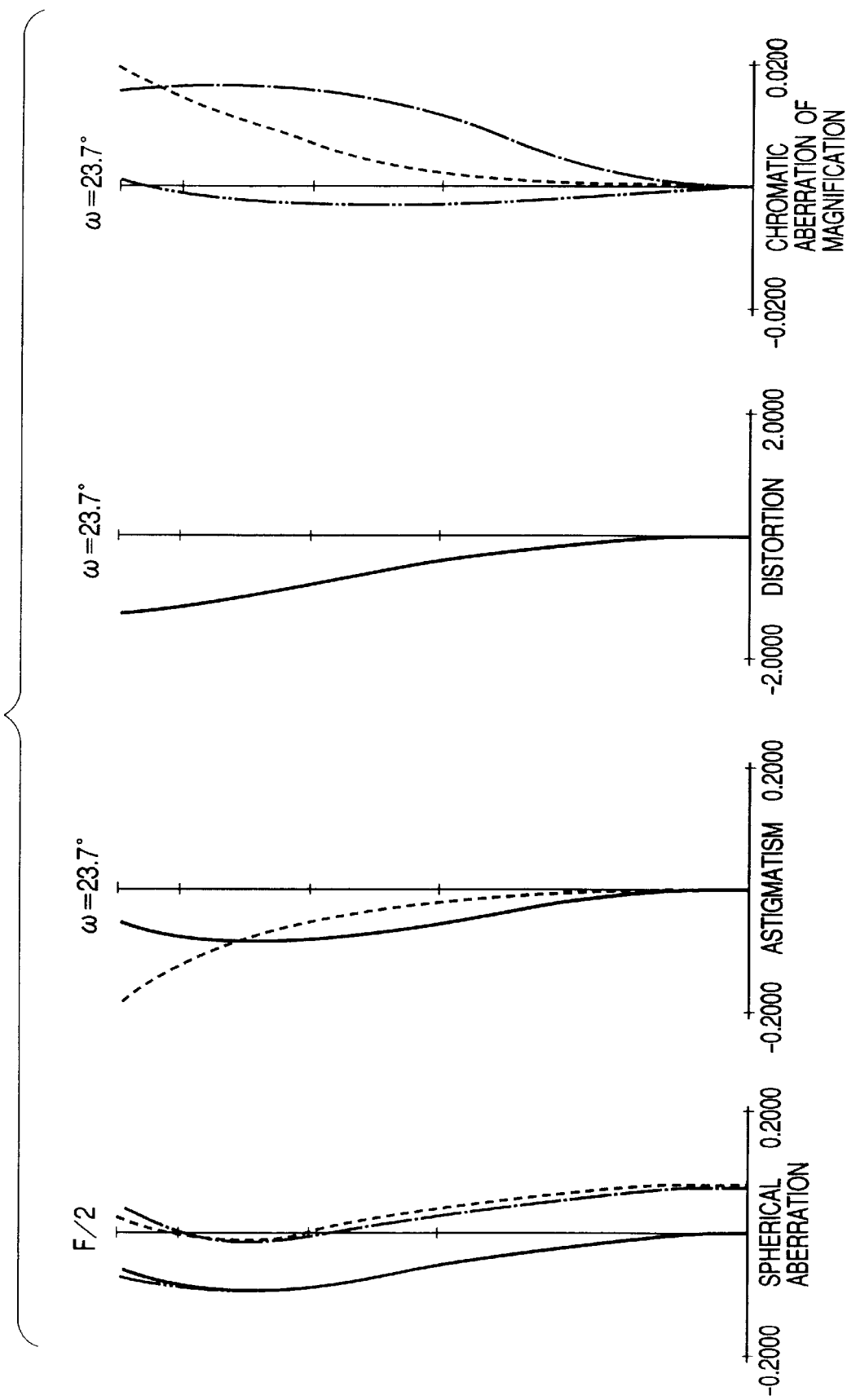
FIG. 34 is aberration diagrams at the wideangle extreme of the zoom lens in Embodiment 11 of the present invention.
Figure 35:
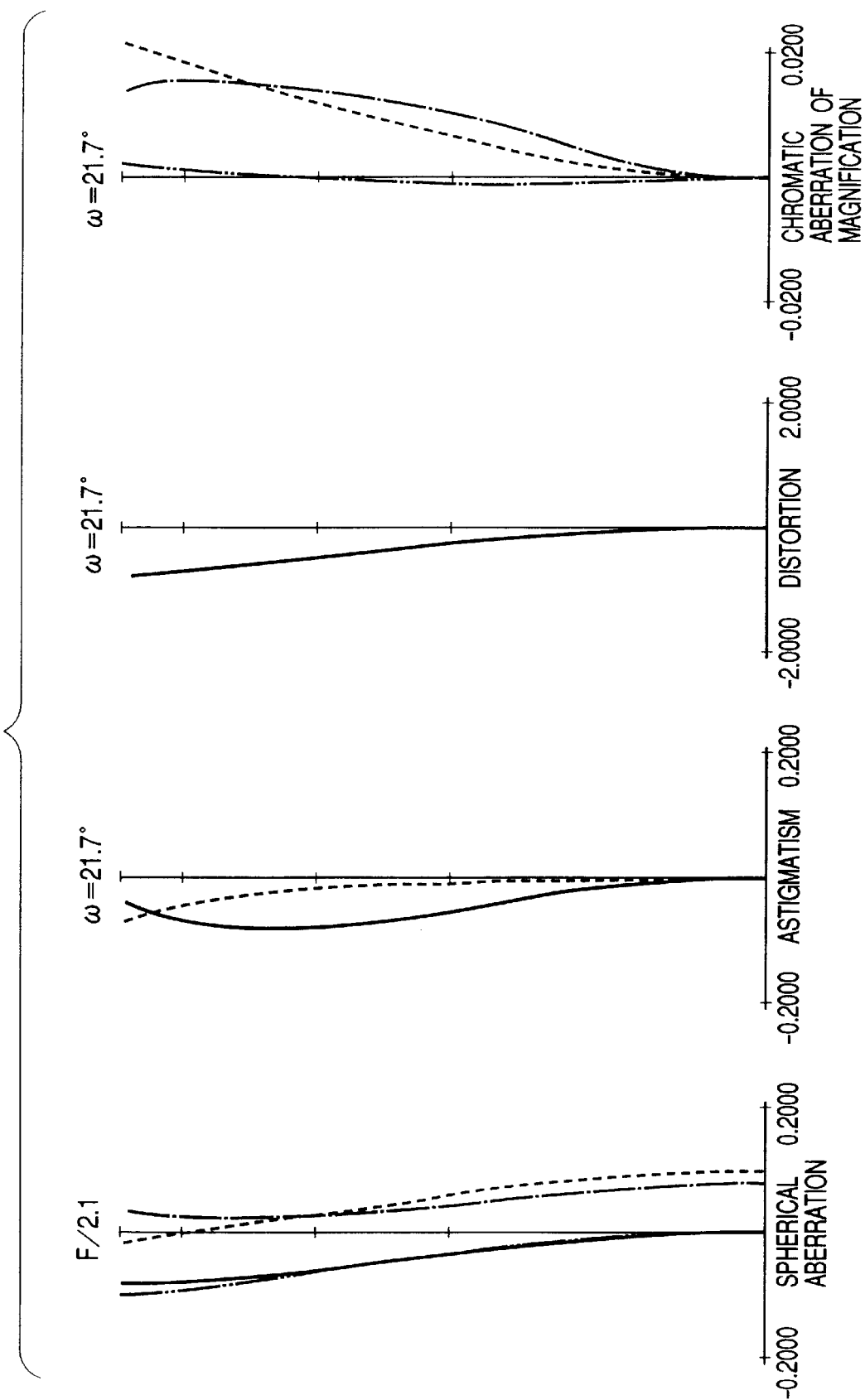
FIG. 35 is aberration diagrams at an intermediate position of the zoom lens in Embodiment 11 of the present invention.
Figure 36:
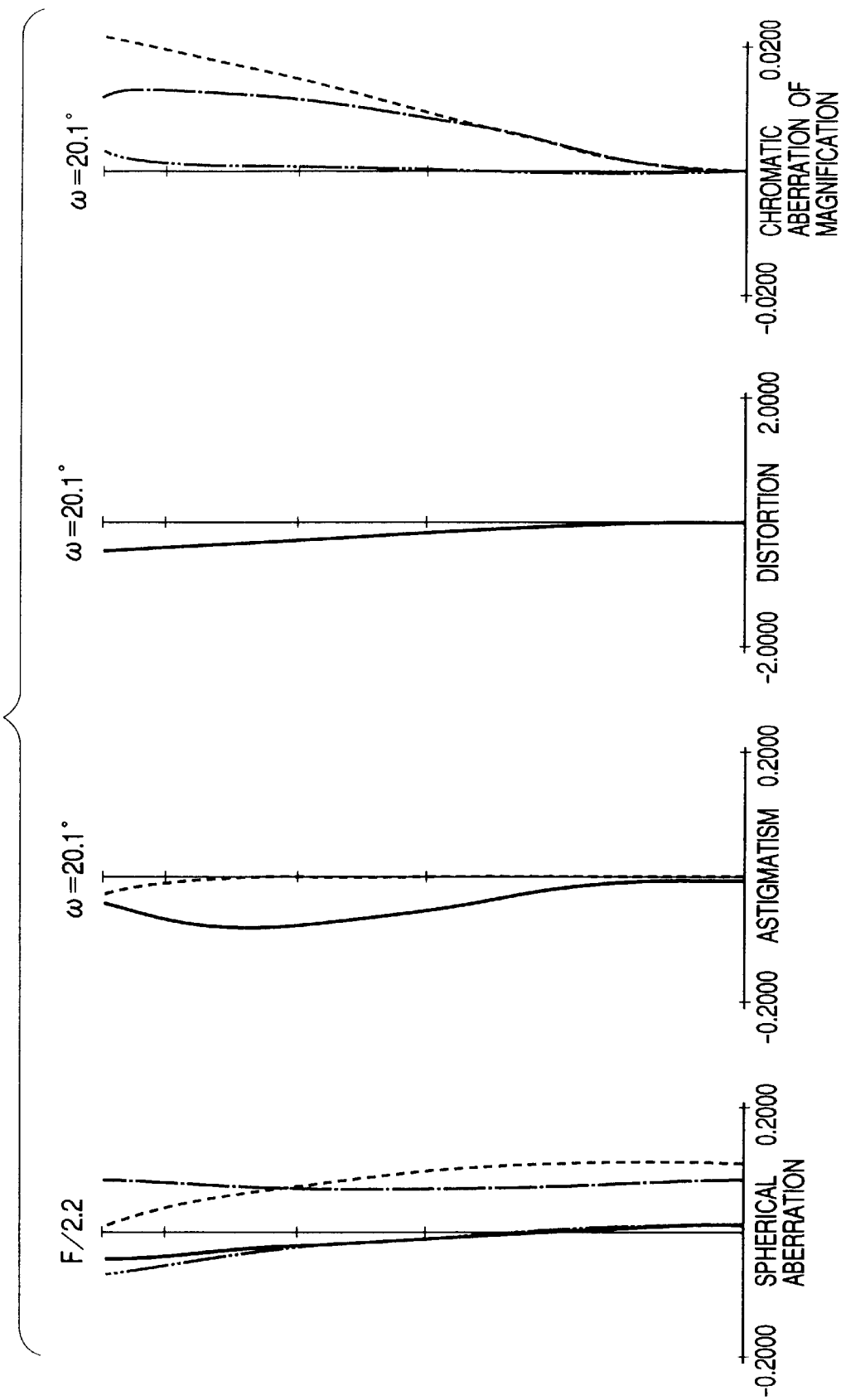
FIG. 36 is aberration diagrams at the telephoto extreme of the zoom lens in Embodiment 11 of the present invention.

FIG. 16 is a cross-sectional view of the lens of the eleventh embodiment according to the present invention, FIGS. 34, 35, and 36 are aberration diagrams at the wideangle extreme, at the middle position, and at the telephoto extreme of the zoom lens of the eleventh embodiment, and Numerical Example 11 presents designed values of the eleventh embodiment. The design example of FIG. 16 is also the projection lens for projection of 0.9-inch (effective display range of 18.432 mm×13.824 mm) liquid crystal panel. The projection size is 100 inches at the distance of 4 m at the wideangle extreme.

The F-number is 2 at the wideangle extreme and 2.2 at the telephoto extreme. Thus the projection lens is a bright lens. The zoom ratio is 1.2. The design example of FIG. 16 is also the projection lens designed for the cross dichroic prism CSP2 illustrated in FIG. 44. This embodiment realizes downsizing by increasing the projection distance at the wideangle extreme for the projection size of 100 inches and lowering the spec of the F-number at the wideangle extreme from F1.7 to darker F2, as compared with Embodiments 9 and 10. In Embodiment 11 the total lens length is reduced to 131.619 mm, as compared with the total lens length of Embodiment 9 of 149.611 mm and the total lens length of Embodiment 10 of 151.595 mm.

Twelfth Embodiment

Figure 17:
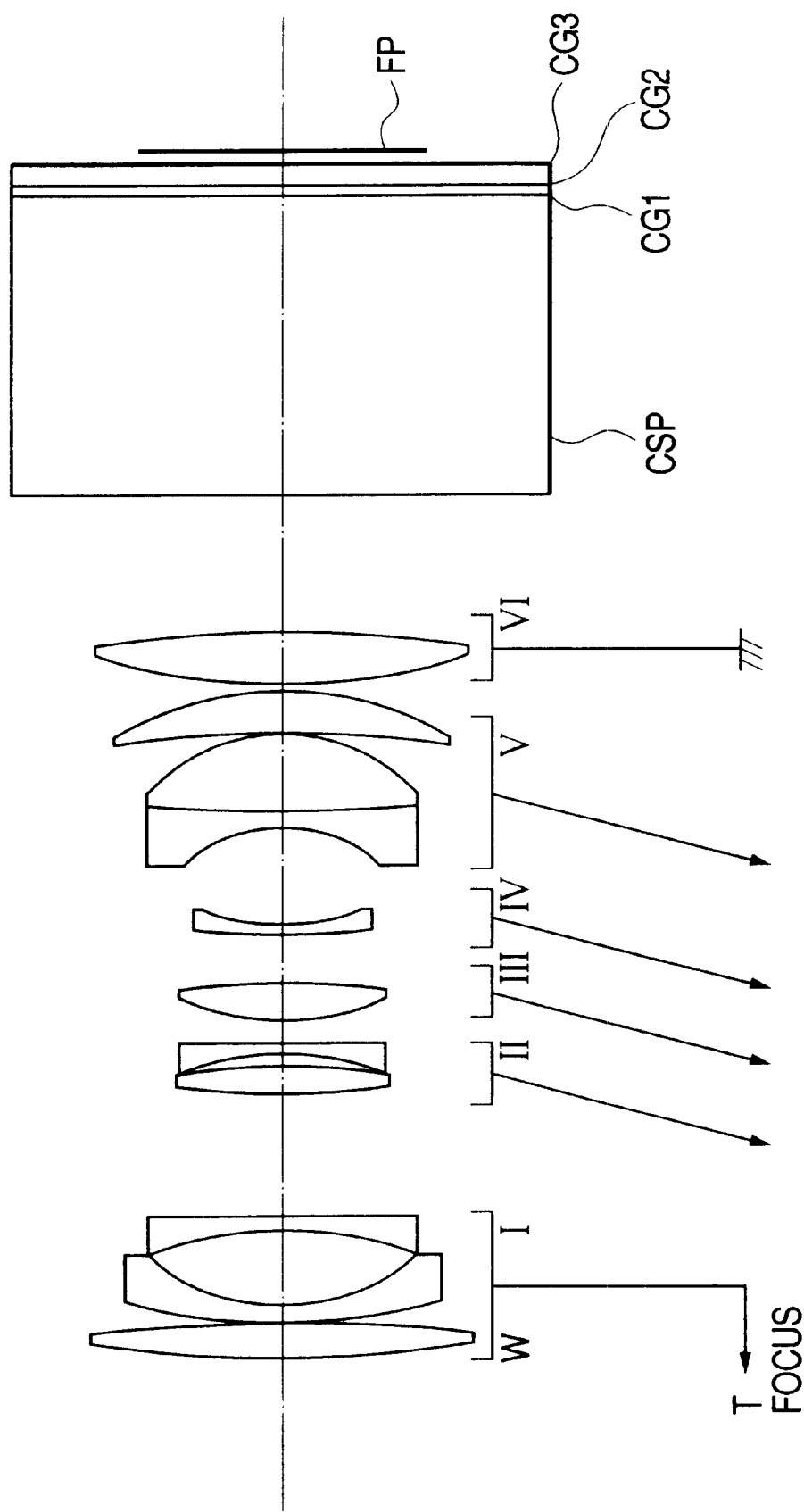
FIG. 17 is a cross-sectional view of the zoom lens in Embodiment 12 of the present invention.
Figure 37:
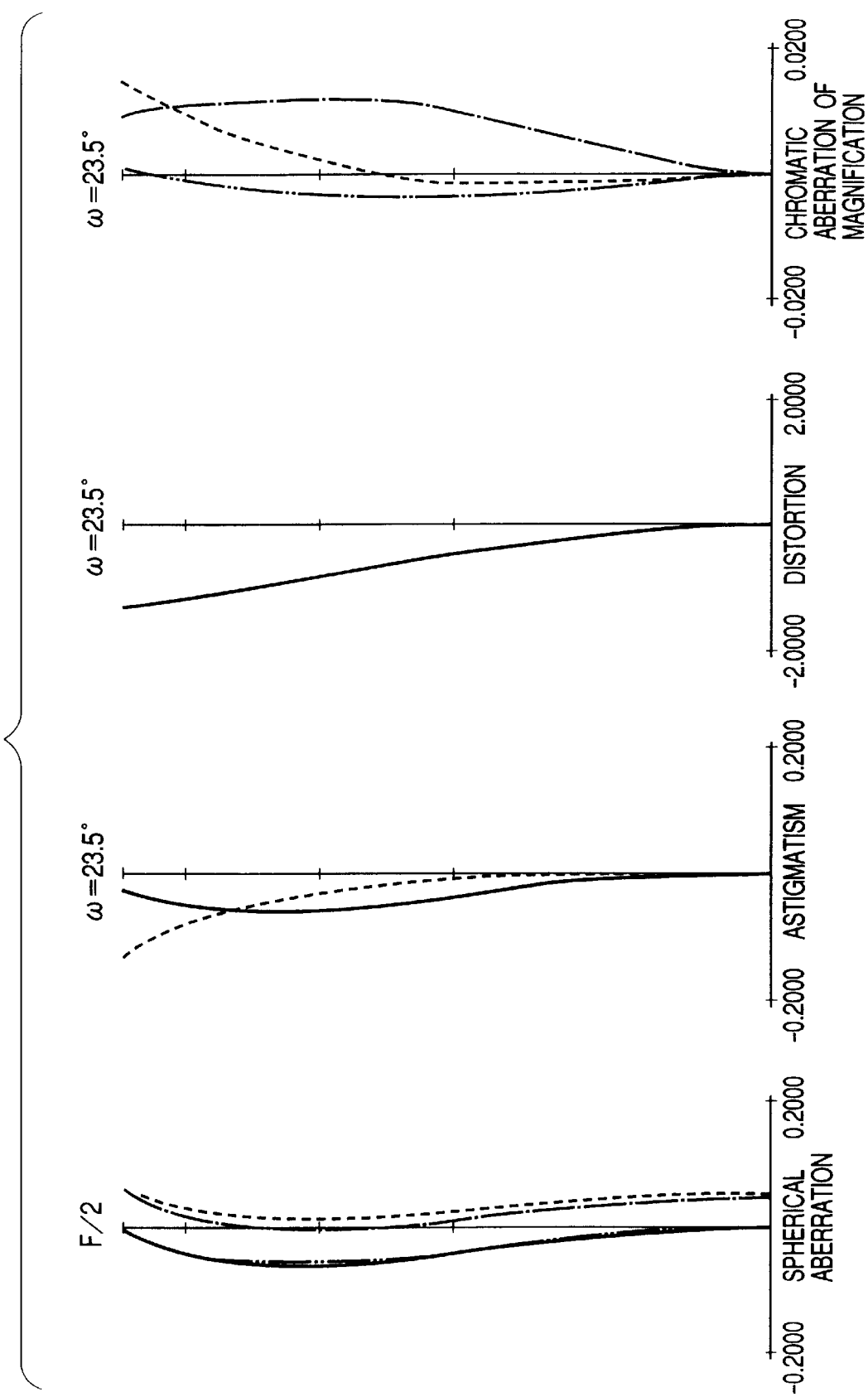
FIG. 37 is aberration diagrams at the wideangle extreme of the zoom lens in Embodiment 12 of the present invention.
Figure 38:
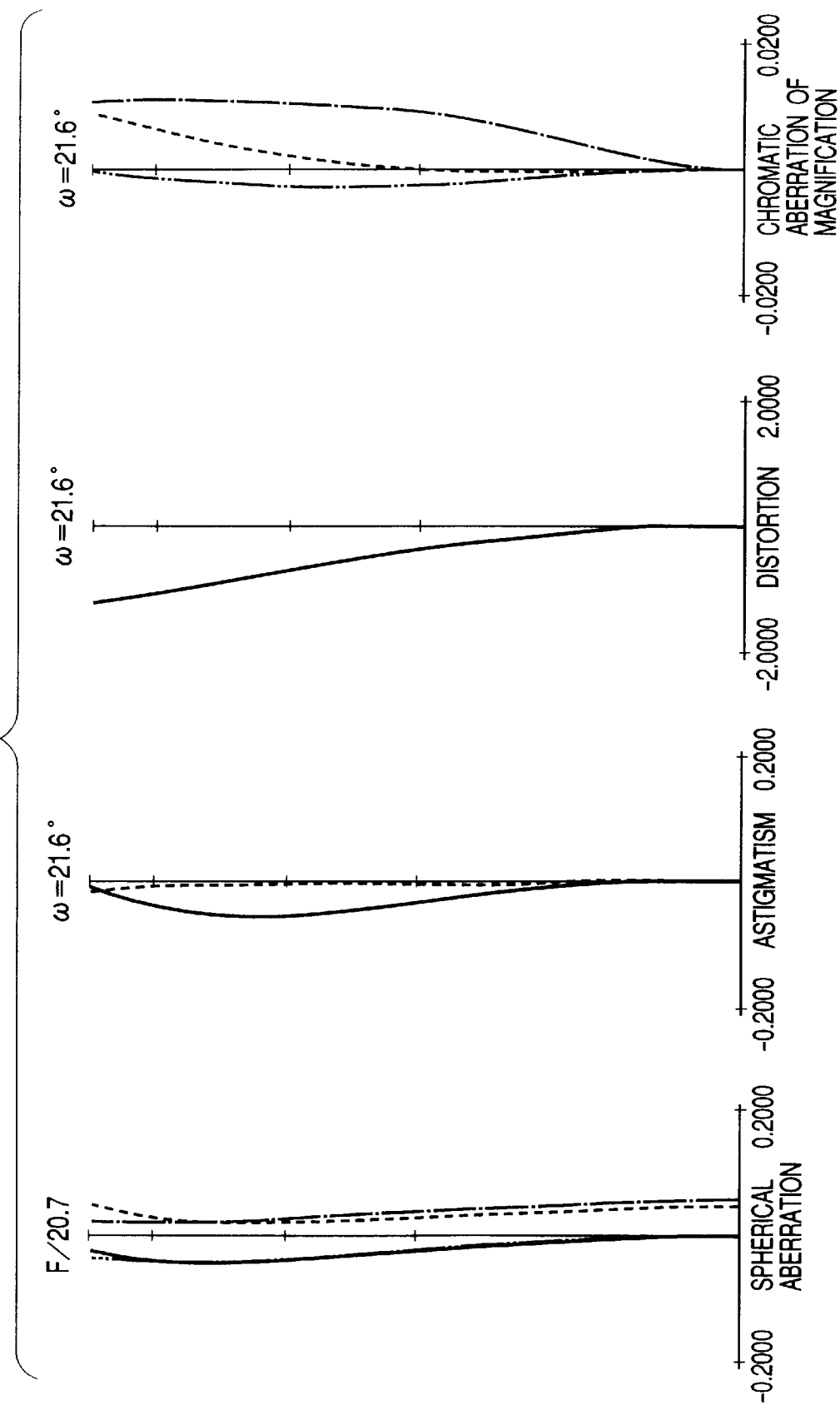
FIG. 38 is aberration diagrams at an intermediate position of the zoom lens in Embodiment 12 of the present invention.
Figure 39:
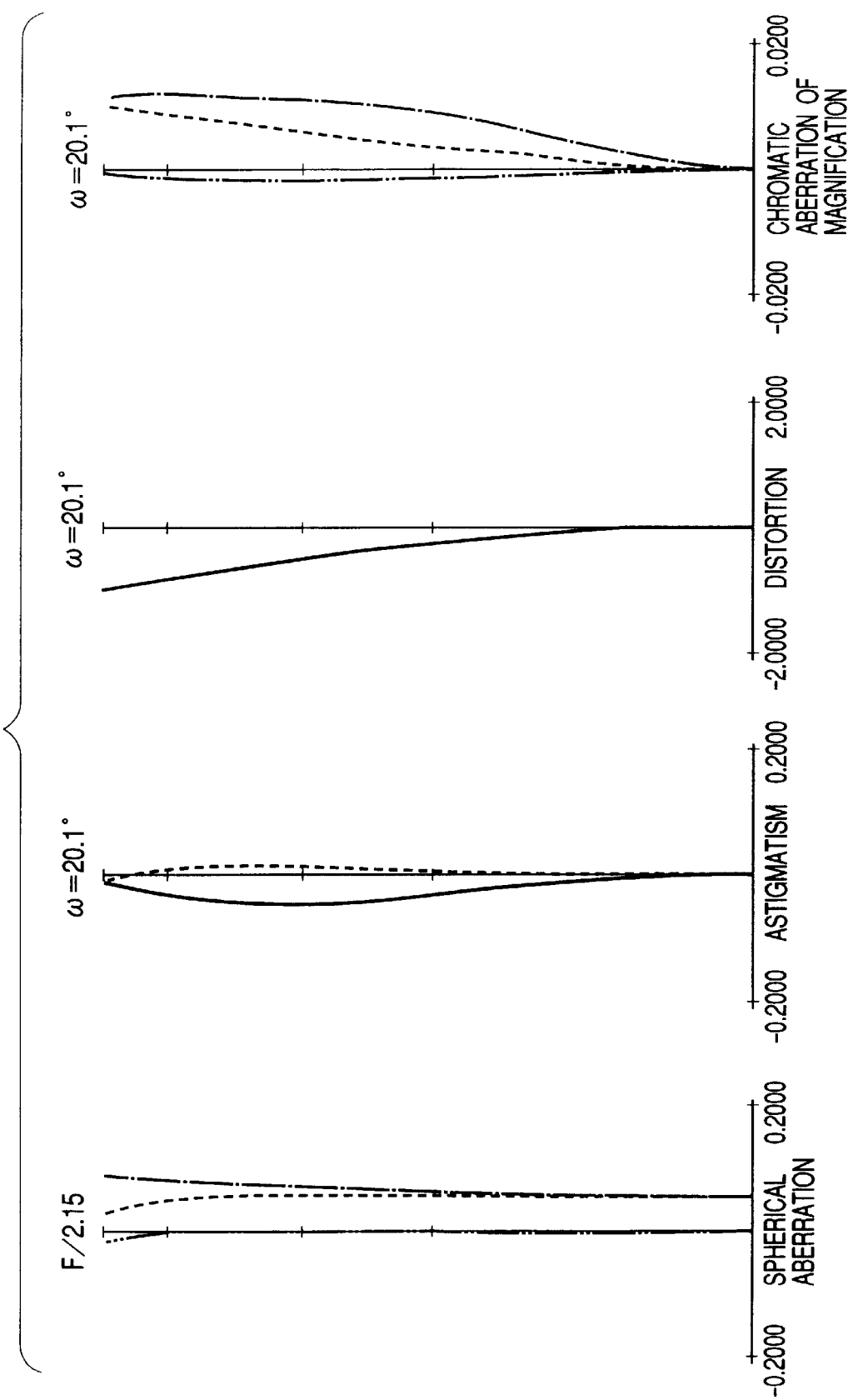
FIG. 39 is aberration diagrams at the telephoto extreme of the zoom lens in Embodiment 12 of the present invention.

FIG. 17 is a cross-sectional view of the lens of the twelfth embodiment according to the present invention, FIGS. 37, 38, and 39 are aberration diagrams at the wideangle extreme, at the middle position, and at the telephoto extreme of the zoom lens of the twelfth embodiment, and Numerical Example 12 presents designed values of the twelfth embodiment.

The design example of FIG. 17 is the projection lens for projection of 0.7-inch (the effective display range of 14.336×10.752 mm) liquid crystal panel. The projection size is 100 inches at the distance of 4 m at the wideangle extreme.

The design example of FIG. 17 is also the projection lens designed for the cross dichroic prism CSP2 as illustrated in FIG. 44.

The F-number is 2 at the wideangle extreme and 2.15 at the telephoto extreme. Thus the projection lens is a bright lens. The zoom ratio is 1.2. The lens configuration is different in the structure of the first lens unit from Embodiments 6 to 11, specifically, in that the first lens unit is composed of a biconvex lens, a negative meniscus lens being convex on the enlargement conjugate side, and a negative lens having a strong power on the enlargement conjugate side in the order named from the enlargement conjugate side. When compared with Embodiments 6 to 11, the prism path length is shorter and the specifications of the F-number, projection distance, and zoom ratio are also lowered, whereby the number of lenses in the first unit is decreased by one. The total lens length is 106.559 mm, which is the shortest among the embodiments of the present invention.

Thirteenth Embodiment

Figure 18:
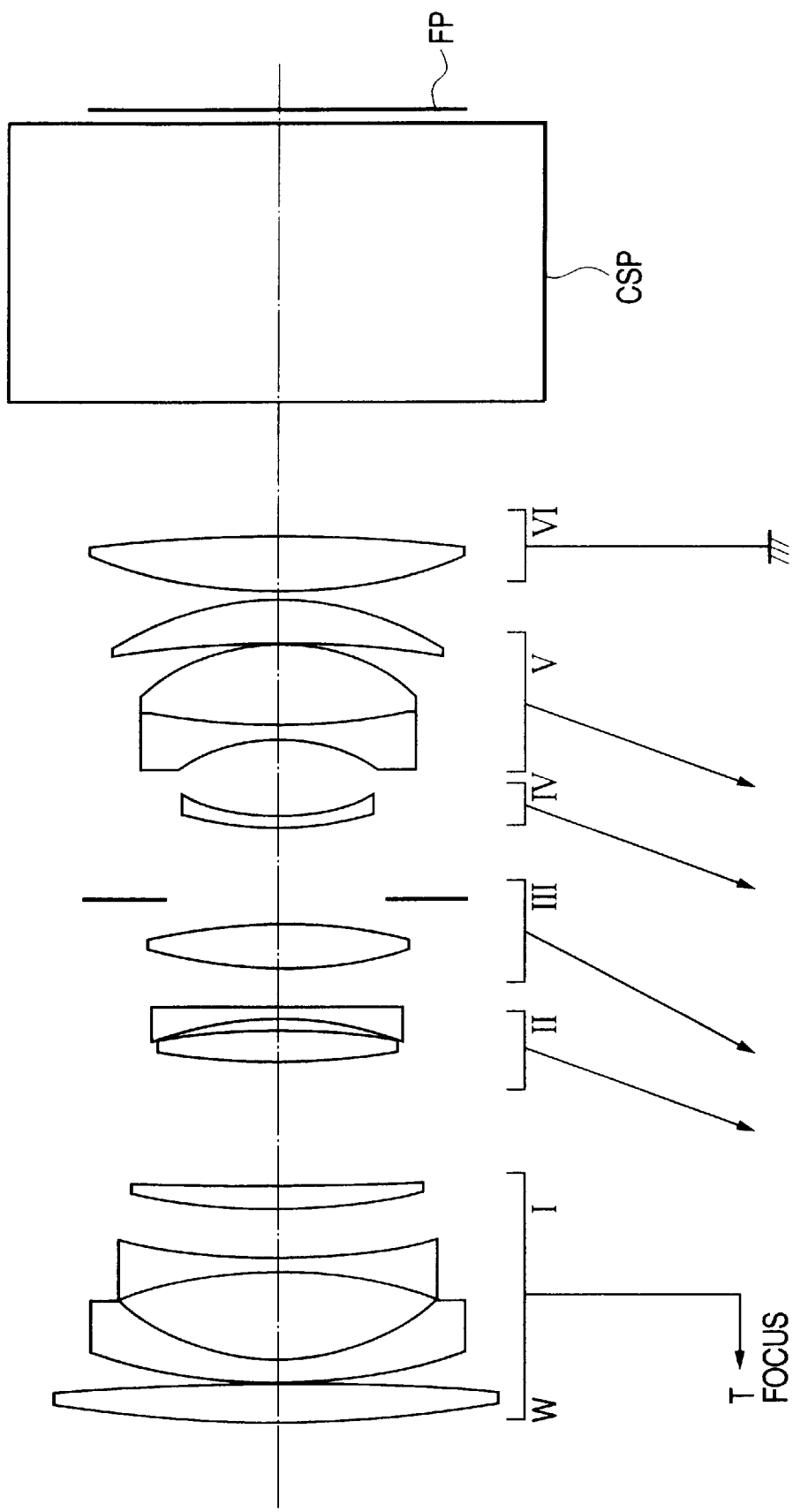
FIG. 18 is a cross-sectional view of the zoom lens in Embodiment 13 of the present invention.
Figure 40:
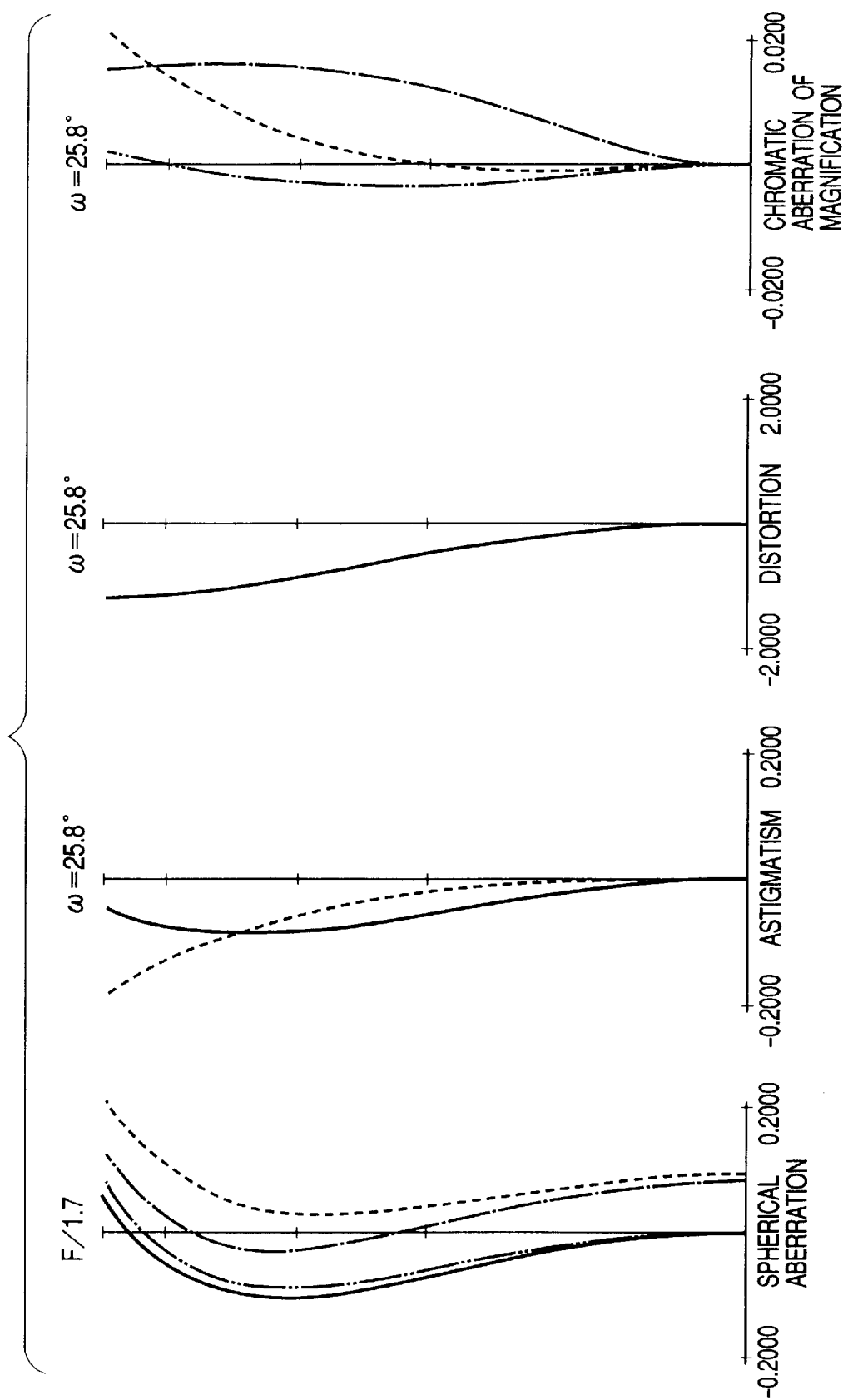
FIG. 40 is aberration diagrams at the wideangle extreme of the zoom lens in Embodiment 13 of the present invention.
Figure 41:
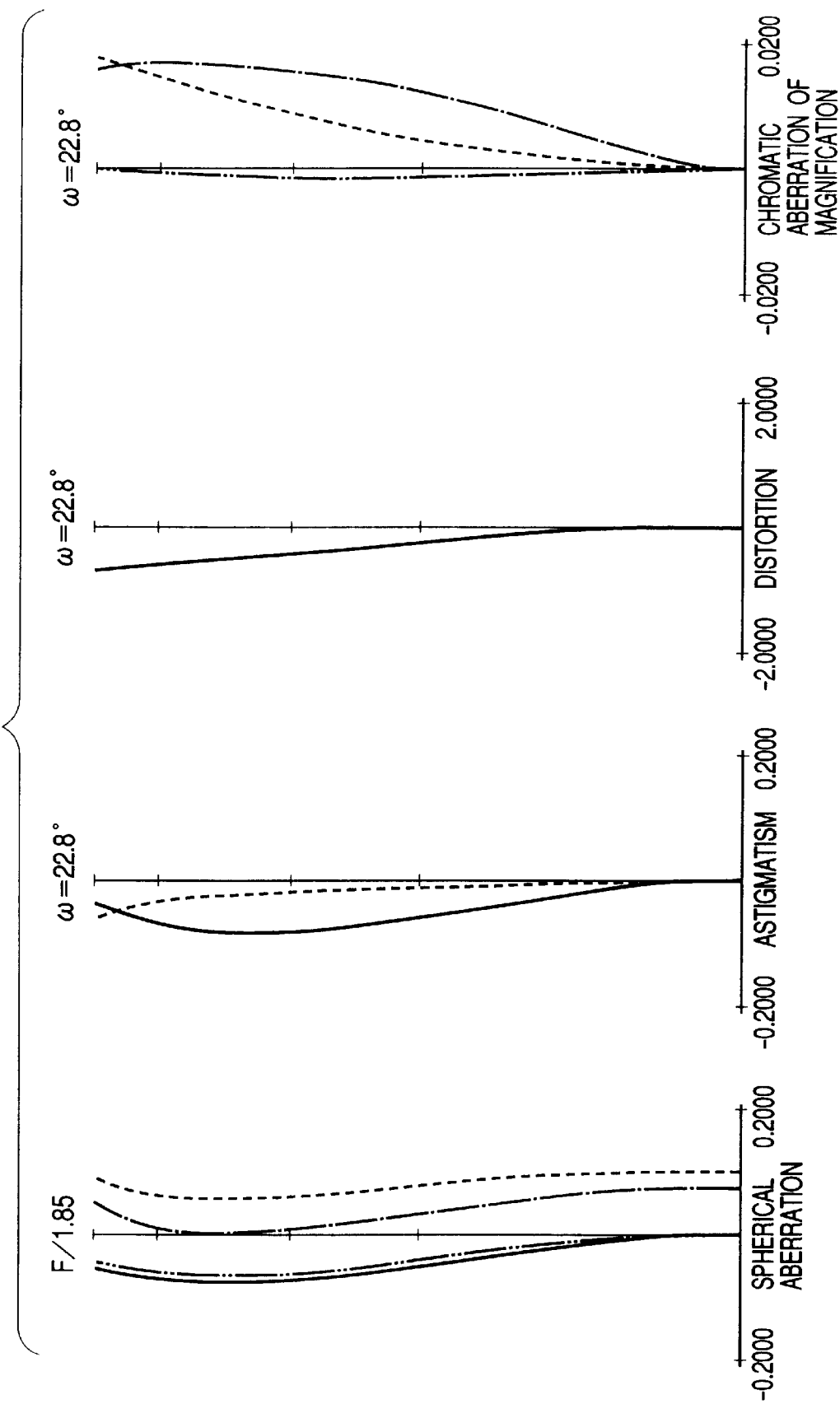
FIG. 41 is aberration diagrams at an intermediate position of the zoom lens in Embodiment 13 of the present invention.
Figure 42:
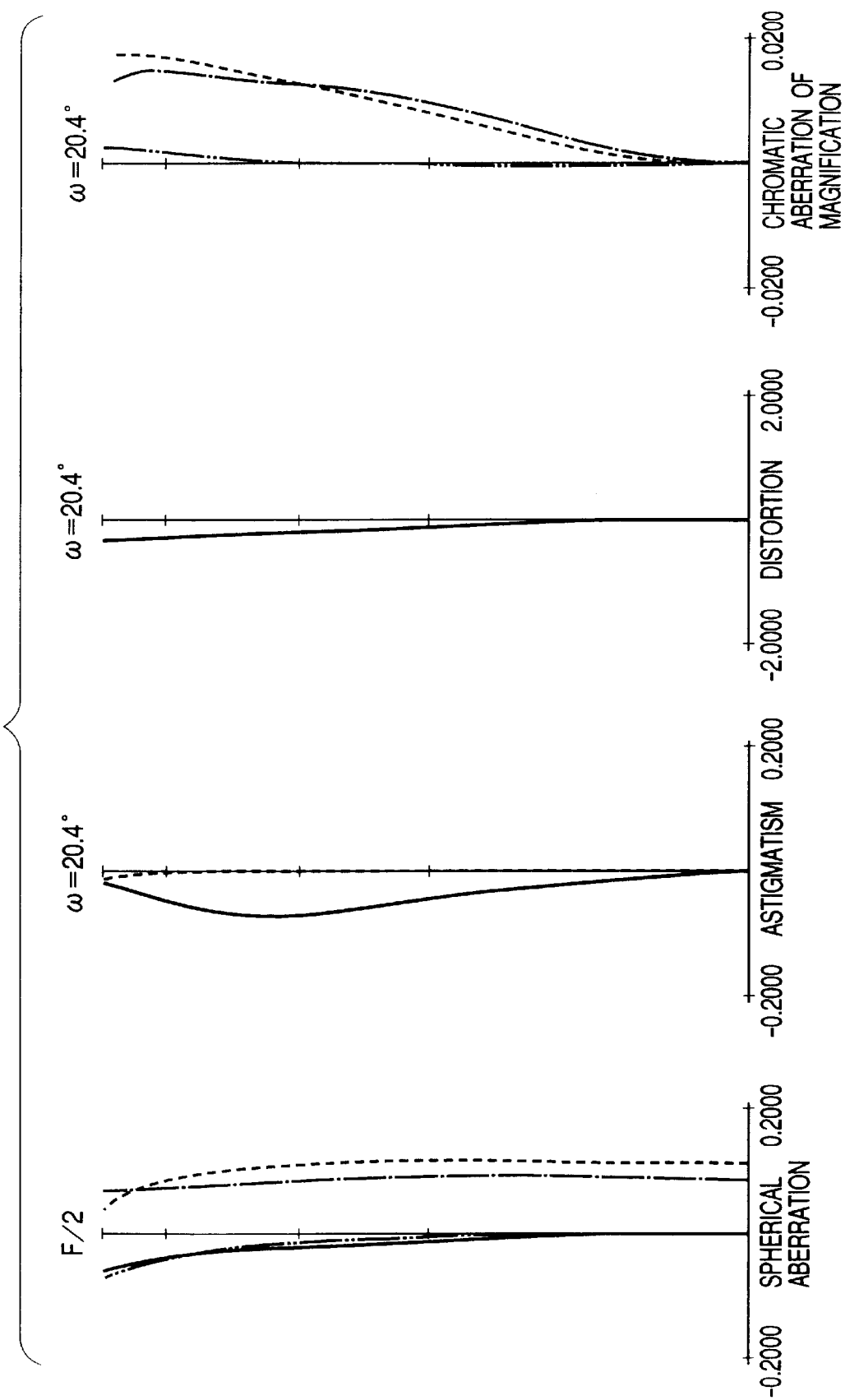
FIG. 42 is aberration diagrams at the telephoto extreme of the zoom lens in Embodiment 13 of the present invention.

FIG. 18 is a cross-sectional view of the lens of the thirteenth embodiment according to the present invention, FIGS. 40, 41, and 42 are aberration diagrams at the wideangle extreme, at the middle position, and at the telephoto extreme of the zoom lens of the thirteenth embodiment, and Numerical Example 13 presents designed values of the thirteenth embodiment. The design example of FIG. 18 is the projection lens for projection of 0.9-inch (the effective display range of 18.432×13.824 mm) liquid crystal panel. The projection size is 100 inches at the distance of 3.6 m at the wideangle extreme.

The F-number is 1.7 at the wideangle extreme and 2 at the telephoto extreme. Thus the projection lens is an extremely bright lens. The zoom ratio is 1.3. The design example of FIG. 18 is the projection lens designed for the cross dichroic prism CSP2 illustrated in FIG. 44. The lens configuration is almost similar to that of Embodiment 9, but is different therefrom in that the fifth lens unit is a weak negative lens unit. The total lens length is 149.804 mm.

The following tables present values of conditions in each of the embodiments. Table 1A provides the values of Conditions (1) to (3) for Embodiments 1 to 5, and Table 2A the values of Conditions (4) to (16) for Embodiments 6 to 13.

TABLE 1A

|  | Embodiment 1 | Embodiment 2 | Embodiment 3 | Embodiment 4 | Embodiment 5 |
|---|---|---|---|---|---|
| Value of Condition (1) $-\beta_{23w}$ | 0.60 | 0.75 | 0.59 | 0.79 | 0.79 |
| Value of Condition (2) $\beta_{4w}$ | 4.10 | 2.55 | 4.10 | 2.34 | 2.60 |
| Value of Condition (3) $f_6/f_w$ | 1.69 | 1.42 | 1.72 | 1.81 | 1.99 |

TABLE 2A

|  | Embodiment 6 | Embodiment 7 | Embodiment 8 | Embodiment 9 | Embodiment 10 | Embodiment 11 | Embodiment 12 | Embodiment 13 |
|---|---|---|---|---|---|---|---|---|
| Value of Condition (4) | 0.272 | 0.207 | 0.309 | 0.215 | 0.147 | 0.358 | 0.235 | 0.185 |
| Value of Condition (5) | −0.596 | −0.553 | −0.705 | −0.520 | −0.527 | −0.569 | −0.534 | −0.454 |
| Value of Condition (6) | 0.722 | 0.670 | 0.781 | 0.754 | 0.755 | 0.935 | 1.024 | 0.634 |
| Value of Condition (7) | −0.516 | −0.409 | −0.390 | −0.407 | −0.316 | −0.660 | −0.627 | −0.294 |
| Value of Condition (8) | 0.202 | 0.163 | 0.198 | 0.073 | 0.054 | 0.076 | 0.050 | −0.003 |
| Value of Condition (9) | 0.495 | 0.428 | 0.473 | 0.530 | 0.529 | 0.604 | 0.606 | 0.468 |
| Value of Condition (10) | 1.223 | 1.375 | 1.237 | 1.106 | 1.117 | 1.009 | 1.104 | 1.097 |
| Value of Condition (11) | 0.498 | 0.533 | 0.265 | 0.764 | 0.689 | 0.884 | 0.879 | 0.792 |
| Value of Condition (12) | 0.716 | 0.765 | 0.699 | 0.760 | 0.635 | 0.788 | 0.747 | 0.746 |
| Value of Condition (13) | 0.810 | 0.796 | 0.807 | 0.747 | 0.689 | 0.779 | 0.833 | 0.741 |
| Value of Condition (14) | 0.142 | 0.125 | 0.141 | 0.120 | 0.116 | 0.140 | 0.141 | 0.126 |

TABLE 2A-continued

| | Embodiment 6 | Embodiment 7 | Embodiment 8 | Embodiment 9 | Embodiment 10 | Embodiment 11 | Embodiment 12 | Embodiment 13 |
|---|---|---|---|---|---|---|---|---|
| Value of Condition (15) | — | — | — | 1.740 | 1.758 | 1.747 | 1.849 | 1.727 |
| Value of Condition (16) | 1.374 | 1.388 | 1.388 | — | — | — | — | — |

The first to thirteenth embodiments described above are the examples adapted for the three panel type structure consisting of three image forming elements (liquid crystal panels, original images), which are often used in the liquid crystal projectors and the like. FIG. 45 is a schematic diagram of a three-panel-type liquid crystal display. In a liquid crystal projector 31 there are three liquid crystal panels 35 (on the reduction conjugate side), a color combining prism 32 combines red, green, and blue images formed by the three panels, and a synthetic image is projected through a zoom lens 33 (optical system) onto a screen 34 (on the enlargement conjugate side). Of course, this is also applicable to the single panel type structure. In the case of the single panel type structure, there is one liquid crystal panel and there is no need for use of the color combining prism. The optical systems of the present invention can also be applied to various image pickup devices such as digital cameras, silver film cameras, video cameras, and so on, as well as the liquid crystal projectors. FIG. 46 is a schematic diagram of an application to a camera, in which an image of an object 39 (on the enlargement conjugate side) is focused through a zoom lens 38 on a photosensitive member 37 (on the reduction conjugate side) such as a film or a CCD or the like in a camera body 36. As described above, the optical systems of the present invention are able to be utilized in the image pickup devices etc., as well as the liquid crystal projectors.

As described above, the present invention is able to realize the compact projection lenses with the extremely bright F-number from 1.7 to 2, with good telecentricity to the liquid crystal panels, with high resolution and low distortion, and with good correction of the chromatic aberration of magnification in the broad band of visible band, for projecting the synthetic color image of the images from the three liquid crystal panels onto the screen.

It is feasible to realize the compact liquid projector that was not realized before, by applying the present invention to the liquid crystal projector using the cross dichroic prism. When the projection lens of the present invention is applied to the color combining prism of the type in which two types of dichroic mirror layers do not intersect with each other, it becomes feasible to control increase of the total lens length due to increase of the prism path length to a small level and to realize the liquid crystal projector that can be constructed extremely easily and at low production cost.

TABLE 1

Numerical Embodiment 1 fno = 1:2.0~2.2    2ω = 47.0°~40.1°

| r 1 = | 154.009 | d 1 = | 3.70 | n 1 = 1.69948 | ν 1 = 55.5 |
| r 2 = | −150.157 | d 2 = | 0.19 | | |
| r 3 = | 88.754 | d 3 = | 1.60 | n 2 = 1.49830 | ν 2 = 81.5 |
| r 4 = | 24.376 | d 4 = | 7.90 | | |
| r 5 = | −39.809 | d 5 = | 1.41 | n 3 = 1.62479 | ν 3 = 53.2 |
| r 6 = | −395.586 | d 6 = | Variable | | |
| r 7 = | −78.550 | d 7 = | 2.03 | n 4 = 1.88761 | ν 4 = 40.8 |
| r 8 = | −44.689 | d 8 = | 0.19 | | |
| r 9 = | 45.662 | d 9 = | 3.88 | n 5 = 1.83876 | ν 5 = 37.2 |
| r10 = | −125.463 | d10 = | 0.91 | | |
| r11 = | −52.983 | d11 = | 1.22 | n 6 = 1.64373 | ν 6 = 34.5 |
| r12 = | 362.465 | d12 = | Variable | | |
| r13 = | 50.177 | d13 = | 4.01 | n 7 = 1.60524 | ν 7 = 60.6 |
| r14 = | −52.478 | d14 = | Variable | | |
| | Stop | | | | |
| r15 = | −685.927 | d15 = | 0.96 | n 8 = 1.60678 | ν 8 = 38.0 |
| r16 = | 26.337 | d16 = | Variable | | |
| r17 = | −17.123 | d17 = | 1.54 | n 9 = 1.70384 | ν 9 = 30.1 |
| r18 = | 156.935 | d18 = | 9.08 | n10 = 1.49830 | ν10 = 81.5 |
| r19 = | −23.029 | d19 = | 0.19 | | |
| r20 = | −138.128 | d20 = | 4.76 | n11 = 1.66120 | ν11 = 50.9 |
| r21 = | −38.693 | d21 = | Variable | | |
| r22 = | 71.912 | d22 = | 6.66 | n12 = 1.72333 | ν12 = 46.0 |
| r23 = | −114.881 | d23 = | 15.36 | | |
| r24 = | ∞ | d24 = | 37.46 | n13 = 1.51805 | ν13 = 64.1 |
| r25 = | ∞ | | | | |

TABLE 1-continued

Numerical Embodiment 1 fno = 1:2.0~2.2    2ω = 47.0°~40.1°

| Variable Distance | Focal Length | | |
|---|---|---|---|
| | 36.82 | 40.48 | 43.79 |
| d 6 | 10.14 | 6.22 | 3.12 |
| d12 | 9.48 | 9.57 | 9.71 |
| d14 | 1.21 | 2.57 | 3.88 |
| d16 | 10.99 | 10.00 | 8.71 |
| d21 | 0.64 | 4.10 | 7.04 |

TABLE 2

Numerical Embodiment 2 fno = 1:2.3~2.6    2ω = 47.1°~40.2°

| r 1 = | 107.035 | d 1 = | 2.70 | n 1 = 1.83876 | ν 1 = 37.2 |
| r 2 = | −1008.216 | d 2 = | 0.15 | | |
| r 3 = | 45.214 | d 3 = | 1.50 | n 2 = 1.48898 | ν 2 = 70.2 |
| r 4 = | 18.609 | d 4 = | 7.56 | | |
| r 5 = | −39.519 | d 5 = | 1.30 | n 3 = 1.66966 | ν 3 = 48.3 |
| r 6 = | 155.163 | d 6 = | Variable | | |
| r 7 = | −115.925 | d 7 = | 1.81 | n 4 = 1.83876 | ν 4 = 37.2 |
| r 8 = | −56.016 | d 8 = | 0.15 | | |
| r 9 = | 40.127 | d 9 = | 4.76 | n 5 = 1.81028 | ν 5 = 40.9 |
| r10 = | −41.022 | d10 = | 0.20 | | |
| r11 = | −38.226 | d11 = | 1.20 | n 6 = 1.85415 | ν 6 = 23.8 |
| r12 = | −146.297 | d12 = | Variable | | |
| r13 = | 64.718 | d13 = | 3.14 | n 7 = 1.59119 | ν 7 = 61.1 |
| r14 = | −44.978 | d14 = | Variable | | |
| | Stop | | | | |
| r15 = | −98.593 | d15 = | 0.85 | n 8 = 1.48898 | ν 8 = 70.2 |
| r16 = | 27.276 | d16 = | Variable | | |
| r17 = | −16.187 | d17 = | 1.54 | n 9 = 1.73365 | ν 9 = 28.5 |
| r18 = | 61.130 | d18 = | 8.63 | n10 = 1.48898 | ν10 = 70.2 |
| r19 = | −22.973 | d19 = | 0.15 | | |
| r20 = | −117.987 | d20 = | 4.20 | n11 = 1.66120 | ν11 = 50.9 |
| r21 = | −37.794 | d21 = | Variable | | |
| r22 = | 66.049 | d22 = | 6.55 | n12 = 1.72350 | ν12 = 43.7 |
| r23 = | −83.790 | d23 = | 12.00 | | |
| r24 = | ∞ | d24 = | 35.00 | n13 = 1.51805 | ν13 = 64.1 |
| r25 = | ∞ | | | | |

| Variable Distance | Focal Length | | |
|---|---|---|---|
| | 36.75 | 40.26 | 43.75 |
| d 6 | 8.58 | 5.82 | 3.41 |
| d12 | 12.92 | 13.68 | 14.40 |
| D14 | 1.38 | 3.08 | 4.90 |
| d16 | 9.40 | 8.47 | 7.48 |
| d21 | 0.60 | 1.84 | 2.69 |

TABLE 3

Numerical Embodiment 3 fno = 1:2.0~2.2    2ω = 47.0°~40.2°

| | | | | | | |
|---|---|---|---|---|---|---|
| r 1 = | 120.353 | d 1 = | 3.73 | n 1 = 1.69948 | ν 1 = 55.5 |
| r 2 = | −169.762 | d 2 = | 0.19 | | |
| r 3 = | 84.551 | d 3 = | 1.60 | n 2 = 1.49830 | ν 2 = 81.5 |
| r 4 = | 23.562 | d 4 = | 7.69 | | |
| r 5 = | −38.624 | d 5 = | 1.34 | n 3 = 1.66120 | ν 3 = 50.9 |
| r 6 = | −423.260 | d 6 = | Variable | | |
| r 7 = | −97.262 | d 7 = | 2.18 | n 4 = 1.77582 | ν 4 = 49.6 |
| r 8 = | −41.993 | d 8 = | 0.19 | | |
| r 9 = | 50.151 | d 9 = | 3.02 | n 5 = 1.83876 | ν 5 = 37.2 |
| r10 = | −192.094 | d10 = | 1.14 | | |
| r11 = | −49.451 | d11 = | 1.22 | n 6 = 1.57795 | ν 6 = 41.5 |
| r12 = | 2571.083 | d12 = | Variable | | |
| r13 = | 46.955 | d13 = | 3.89 | n 7 = 1.69948 | ν 7 = 55.5 |
| r14 = | −61.758 | d14 = | Variable | | |
| | Stop | | | | |
| r15 = | −2083.725 | d15 = | 0.96 | n 8 = 1.60678 | ν 8 = 38.0 |
| r16 = | 24.233 | d16 = | Variable | | |
| r17 = | −17.835 | d17 = | 1.54 | n 9 = 1.70386 | ν 9 = 30.1 |
| r18 = | 138.846 | d18 = | 8.28 | n10 = 1.49830 | ν10 = 81.5 |
| r19 = | −23.768 | d19 = | 0.19 | | |
| r20 = | −132.386 | d20 = | 6.61 | n11 = 1.58522 | ν11 = 59.4 |
| *r21 = | −34.872 | d21 = | Variable | | |
| r22 = | 74.977 | d22 = | 6.06 | n12 = 1.74753 | ν12 = 44.8 |
| r23 = | −122.769 | d23 = | 15.36 | | |
| r24 = | ∞ | d24 = | 37.47 | n13 = 1.51805 | ν13 = 64.1 |
| r25 = | ∞ | | | | |

| Variable | Focal Length | | |
|---|---|---|---|
| Distance | 36.76 | 40.25 | 43.75 |
| d 6 | 9.95 | 6.33 | 3.19 |
| d12 | 9.51 | 9.47 | 9.41 |
| d14 | 1.29 | 2.48 | 3.72 |
| d16 | 10.93 | 10.10 | 8.95 |
| d21 | 0.64 | 3.95 | 7.06 |

* Twenty-first surface (r21): aspherical surface
$^r$−3.43720D + 01 $^k$1.02205D + 00 $^B$3.71292D − 06 $^C$−1.07669D − 09
$^D$2.74411D − 11 $^E$−5.70083D − 14

TABLE 4

Numerical Embodiment 4 fno = 1:2.3~2.6    2ω = 47.1°~40.2°

| | | | | | | |
|---|---|---|---|---|---|---|
| r 1 = | 125.378 | d 1 = | 4.15 | n 1 = 1.83876 | ν 1 = 37.2 |
| r 2 = | −953.454 | d 2 = | 0.15 | | |
| r 3 = | 158.633 | d 3 = | 2.33 | n 2 = 1.60524 | ν 2 = 60.6 |
| r 4 = | 27.610 | d 4 = | 11.03 | | |
| r 5 = | −49.632 | d 5 = | 1.94 | n 3 = 1.60524 | ν 3 = 60.6 |
| r 6 = | −4927.091 | d 6 = | Variable | | |
| r 7 = | −211.295 | d 7 = | 1.68 | n 4 = 1.81185 | ν 4 = 25.4 |
| r 8 = | 65.824 | d 8 = | 1.99 | | |
| r 9 = | 180.771 | d 9 = | 5.34 | n 5 = 1.81028 | ν 5 = 40.9 |
| r10 = | −55.791 | d10 = | 0.34 | | |
| r11 = | 34.522 | d11 = | 6.26 | n 6 = 1.80354 | ν 6 = 42.2 |
| r12 = | 1696.707 | d12 = | 0.13 | | |
| r13 = | 35.302 | d13 = | 1.68 | n 7 = 1.51805 | ν 7 = 64.1 |
| r14 = | 28.480 | d14 = | Variable | | |
| r15 = | ∞ | d15 = | 2.12 | | |
| | Stop | | | | |
| r16 = | 215.496 | d16 = | 4.71 | n 8 = 1.69948 | ν 8 = 55.5 |
| r17 = | −21.146 | d17 = | 2.35 | n 9 = 1.83876 | ν 9 = 37.2 |
| r18 = | −57.864 | d18 = | Variable | | |
| r19 = | 111.531 | d19 = | 1.07 | n10 = 1.60856 | ν10 = 43.7 |
| r20 = | 27.862 | d20 = | Variable | | |
| r21 = | −16.509 | d21 = | 2.01 | n11 = 1.70386 | ν11 = 30.1 |
| r22 = | 70.750 | d22 = | 7.55 | n12 = 1.48898 | ν12 = 70.2 |
| r23 = | −24.602 | d23 = | 0.13 | | |
| r24 = | −16229.500 | d24 = | 5.96 | n13 = 1.66120 | ν13 = 50.9 |
| r25 = | −37.888 | d25 = | Variable | | |
| r26 = | 78.180 | d26 = | 6.93 | n14 = 1.72350 | ν14 = 43.7 |
| r27 = | −88.910 | d27 = | 10.07 | | |

TABLE 4-continued

Numerical Embodiment 4 fno = 1:2.3~2.6    2ω = 47.1°~40.2°

| | | | | | | |
|---|---|---|---|---|---|---|
| r28 = | ∞ | d28 = | 32.40 | n15 = 1.51805 | ν15 = 64.1 |
| r29 = | ∞ | | | | |

| Variable | Focal Length | | |
|---|---|---|---|
| Distance | 32.36 | 37.05 | 41.75 |
| d 6 | 11.50 | 6.13 | 1.87 |
| d14 | 15.26 | 14.27 | 13.08 |
| d18 | 2.28 | 5.88 | 9.73 |
| d20 | 8.08 | 7.29 | 6.81 |
| d25 | 0.47 | 4.01 | 6.11 |

TABLE 5

Numerical Embodiment 5 fno = 1:1.8~2.2    2ω = 52.7°~42.0°

| | | | | | | |
|---|---|---|---|---|---|---|
| r 1 = | 94.378 | d 1 = | 4.04 | n 1 = 1.83876 | ν 1 = 37.2 |
| r 2 = | 457.323 | d 2 = | 0.15 | | |
| r 3 = | 98.832 | d 3 = | 2.33 | n 2 = 1.56583 | ν 2 = 60.7 |
| r 4 = | 25.566 | d 4 = | 10.89 | | |
| r 5 = | −62.973 | d 5 = | 1.94 | n 3 = 1.60524 | ν 3 = 60.6 |
| r 6 = | 105.324 | d 6 = | Variable | | |
| r 7 = | −198.885 | d 7 = | 1.48 | n 4 = 1.81185 | ν 4 = 25.4 |
| r 8 = | 81.038 | d 8 = | 1.20 | | |
| r 9 = | 169.640 | d 9 = | 5.47 | n 5 = 1.77582 | ν 5 = 49.6 |
| r10 = | −54.097 | d10 = | 0.13 | | |
| r11 = | 36.866 | d11 = | 5.63 | n 6 = 1.83876 | ν 6 = 37.2 |
| r12 = | 1985.139 | d12 = | Variable | | |
| r13 = | 203.213 | d13 = | 4.22 | n 7 = 1.64233 | ν 7 = 44.9 |
| r14 = | −26.570 | d14 = | 1.07 | n 8 = 1.81185 | ν 8 = 25.4 |
| | Stop | | | | |
| r15 = | −60.508 | d15 = | 0.22 | | |
| r16 = | ∞ | d16 = | variable | | |
| r17 = | 179.976 | d17 = | 1.07 | n 9 = 1.57365 | ν 9 = 53.0 |
| r18 = | 26.880 | d18 = | variable | | |
| r19 = | −16.756 | d19 = | 1.48 | n10 = 1.70386 | ν10 = 30.1 |
| r20 = | 61.279 | d20 = | 7.24 | n11 = 1.48898 | ν11 = 70.2 |
| r21 = | −28.139 | d21 = | 0.13 | | |
| r22 = | −85.699 | d22 = | 3.63 | n12 = 1.66120 | ν12 = 50.9 |
| r23 = | −39.813 | d23 = | 0.13 | | |
| r24 = | 498.715 | d24 = | 5.19 | n13 = 1.66120 | ν13 = 50.9 |
| r25 = | −58.433 | d25 = | variable | | |
| r26 = | 99.377 | d26 = | 7.06 | n14 = 1.66966 | ν14 = 48.3 |
| r27 = | −73.631 | d27 = | 10.07 | | |
| r28 = | ∞ | d28 = | 32.40 | n15 = 1.51805 | ν15 = 64.1 |
| r29 = | ∞ | | | | |

| Variable | Focal Length | | |
|---|---|---|---|
| Distance | 32.33 | 37.02 | 41.71 |
| d 6 | 12.42 | 7.43 | 3.50 |
| d12 | 16.50 | 15.66 | 14.46 |
| d16 | 0.43 | 3.76 | 7.42 |
| d18 | 11.93 | 10.84 | 10.14 |
| d25 | 0.47 | 4.08 | 6.25 |

TABLE 6

Numerical Embodiment 6 f = 28.72134    fno = 1:1.7~2    2ω = 47°~37°

| | | | | | | |
|---|---|---|---|---|---|---|
| r 1 = | 103.443 | d 1 = | 3.95 | n 1 = 1.65844 | ν 1 = 50.9 |
| r 2 = | −198.670 | d 2 = | 0.20 | | |
| r 3 = | 56.005 | d 3 = | 1.60 | n 2 = 1.60311 | ν 2 = 60.6 |
| r 4 = | 22.347 | d 4 = | 7.31 | | |
| r 5 = | −47.442 | d 5 = | 1.35 | n 3 = 1.60311 | ν 3 = 60.6 |

TABLE 6-continued

Numerical Embodiment 6 f = 28.72134  fno = 1:1.7~2  2ω = 47°~37°

| | | | | | | |
|---|---|---|---|---|---|---|
| r 6 = | 47.440 | d 6 = | 3.33 | | | |
| r 7 = | 54.581 | d 7 = | 2.20 | n 4 = 1.83400 | ν 4 = 37.2 | |
| r 8 = | 148.252 | d 8 = | Variable | | | |
| r 9 = | 178.059 | d 9 = | 2.75 | n 5 = 1.83400 | ν 5 = 37.2 | |
| r10 = | −61.361 | d10 = | 0.87 | | | |
| r11 = | −35.362 | d11 = | 1.10 | n 6 = 1.80518 | ν 6 = 25.4 | |
| r12 = | −58.191 | d12 = | Variable | | | |
| r13 = | 35.764 | d13 = | 3.90 | n 7 = 1.72000 | ν 7 = 50.2 | |
| r14 = | −136.966 | d14 = | 3.07 | | | |
| r15 = | ∞ | d15 = | Variable | | | |
| | Stop | | | | | |
| r16 = | 246.837 | d16 = | 0.95 | n 8 = 1.51633 | ν 8 = 64.1 | |
| r17 = | 25.711 | d17 = | Variable | | | |
| r18 = | −18.152 | d18 = | 1.30 | n 9 = 1.80518 | ν 9 = 25.4 | |
| r19 = | 59.405 | d19 = | 7.55 | n10 = 1.62299 | ν10 = 58.2 | |
| r20 = | −23.278 | d20 = | 0.20 | | | |
| r21 = | −1443.492 | d21 = | 4.50 | n11 = 1.72000 | ν11 = 43.7 | |
| r22 = | −43.052 | d22 = | Variable | | | |
| r23 = | 56.559 | d23 = | 5.15 | n12 = 1.78590 | ν12 = 44.2 | |
| r24 = | −226.806 | d24 = | 7.47 | | | |
| r25 = | ∞ | d25 = | 41.50 | n13 = 1.62299 | ν13 = 58.2 | |
| r26 = | ∞ | | | | | |

| Variable Distance | Focal Length | | |
|---|---|---|---|
| | 28.72 | 33.18 | 37.33 |
| d 8 | 7.63 | 3.84 | 1.25 |
| d12 | 7.00 | 3.48 | 0.56 |
| d15 | 4.63 | 6.43 | 8.27 |
| d17 | 9.61 | 9.36 | 8.41 |
| d22 | 0.50 | 6.26 | 10.88 |

TABLE 7

Numerical Embodiment 7 f = 25.82127  fno = 1:1.7~2  2ω = 51.8°~40.8°

| | | | | | | |
|---|---|---|---|---|---|---|
| r 1 = | 84.911 | d 1 = | 5.07 | n 1 = 1.62299 | ν 1 = 58.2 | |
| r 2 = | −270.889 | d 2 = | 0.15 | | | |
| r 3 = | 51.492 | d 3 = | 1.71 | n 2 = 1.60311 | ν 2 = 60.6 | |
| r 4 = | 22.390 | d 4 = | 8.02 | | | |
| r 5 = | −54.854 | d 5 = | 1.32 | n 3 = 1.60311 | ν 3 = 60.6 | |
| r 6 = | 43.535 | d 6 = | 6.69 | | | |
| r 7 = | 67.853 | d 7 = | 1.95 | n 4 = 1.83400 | ν 4 = 37.2 | |
| r 8 = | 151.344 | d 8 = | Variable | | | |
| r 9 = | 876.002 | d 9 = | 2.36 | n 5 = 1.83400 | ν 5 = 37.2 | |
| r10 = | −66.859 | d10 = | 1.91 | | | |
| r11 = | −31.164 | d11 = | 1.01 | n 6 = 1.72825 | ν 6 = 28.5 | |
| r12 = | −41.100 | d12 = | Variable | | | |
| r13 = | 34.251 | d13 = | 3.86 | n 7 = 1.72000 | ν 7 = 50.2 | |
| r14 = | −138.888 | d14 = | 1.65 | | | |
| r15 = | ∞ | d15 = | Variable | | | |
| | Stop | | | | | |
| r16 = | 66.903 | d16 = | 0.86 | n 8 = 1.51633 | ν 8 = 64.1 | |
| r17 = | 21.836 | d17 = | Variable | | | |
| r18 = | −17.206 | d18 = | 1.17 | n 9 = 1.78472 | ν 9 = 25.7 | |
| r19 = | 94.032 | d19 = | 7.11 | n10 = 1.51633 | ν10 = 64.1 | |
| r20 = | −21.710 | d20 = | 0.15 | | | |
| r21 = | −2571.385 | d21 = | 5.11 | n11 = 1.69680 | ν11 = 55.5 | |
| r22 = | −36.325 | d22 = | Variable | | | |
| r23 = | 56.701 | d23 = | 4.24 | n12 = 1.78590 | ν12 = 44.2 | |
| r24 = | −280.783 | d24 = | 7.47 | | | |
| r25 = | ∞ | d25 = | 41.50 | n13 = 1.62299 | ν13 = 58.2 | |
| r26 = | ∞ | | | | | |

| Variable Distance | Focal Length | | |
|---|---|---|---|
| | 25.82 | 29.56 | 33.56 |
| d 8 | 7.78 | 3.75 | 0.71 |

TABLE 7-continued

Numerical Embodiment 7 f = 25.82127  fno = 1:1.7~2  2ω = 51.8°~40.8°

| | | | |
|---|---|---|---|
| d12 | 11.21 | 8.26 | 5.02 |
| d15 | 5.18 | 6.59 | 8.30 |
| d17 | 9.50 | 9.67 | 9.08 |
| d22 | 0.37 | 5.76 | 10.92 |

TABLE 8

Numerical Embodiment 8 f = 28.69934  fno = 1:2~2.2  2ω = 47°~40.2°

| | | | | | | |
|---|---|---|---|---|---|---|
| r 1 = | 126.586 | d 1 = | 2.97 | n 1 = 1.62555 | ν 1 = 58.2 | |
| r 2 = | −116.256 | d 2 = | 0.15 | | | |
| r 3 = | 45.385 | d 3 = | 1.71 | n 2 = 1.60548 | ν 2 = 60.6 | |
| r 4 = | 18.294 | d 4 = | 5.01 | | | |
| r 5 = | −38.360 | d 5 = | 1.32 | n 3 = 1.60548 | ν 3 = 60.6 | |
| r 6 = | 39.482 | d 6 = | 1.96 | | | |
| r 7 = | 37.785 | d 7 = | 2.06 | n 4 = 1.83932 | ν 4 = 37.2 | |
| r 8 = | 104.227 | d 8 = | Variable | | | |
| r 9 = | 150.363 | d 9 = | 2.25 | n 5 = 1.83932 | ν 5 = 37.2 | |
| r10 = | −56.340 | d10 = | 0.84 | | | |
| r11 = | −28.719 | d11 = | 1.01 | n 6 = 1.73429 | ν 6 = 28.5 | |
| r12 = | −46.832 | d12 = | Variable | | | |
| r13 = | 34.558 | d13 = | 2.91 | n 7 = 1.72341 | ν 7 = 50.2 | |
| r14 = | −111.066 | d14 = | 1.25 | | | |
| r15 = | ∞ | d15 = | Variable | | | |
| | Stop | | | | | |
| r16 = | 51.400 | d16 = | 0.86 | n 8 = 1.51825 | ν 8 = 64.1 | |
| r17 = | 21.757 | d17 = | Variable | | | |
| r18 = | −15.559 | d18 = | 1.17 | n 9 = 1.79192 | ν 9 = 25.7 | |
| r19 = | 94.128 | d19 = | 7.82 | n10 = 1.51825 | ν10 = 64.1 | |
| r20 = | −19.226 | d20 = | 0.15 | | | |
| r21 = | −784.903 | d21 = | 4.62 | n11 = 1.69979 | ν11 = 55.5 | |
| r22 = | −35.914 | d22 = | Variable | | | |
| r23 = | 61.005 | d23 = | 3.84 | n12 = 1.79012 | ν12 = 44.2 | |
| r24 = | −218.244 | d24 = | 7.47 | | | |
| r25 = | ∞ | d25 = | 41.50 | n13 = 1.62555 | ν13 = 58.2 | |
| r26 = | ∞ | | | | | |

| Variable Distance | Focal Length | | |
|---|---|---|---|
| | 25.82 | 29.56 | 33.56 |
| d 8 | 7.78 | 3.75 | 0.71 |
| d12 | 11.21 | 8.26 | 5.02 |
| d15 | 5.18 | 6.59 | 8.30 |
| d17 | 9.50 | 9.67 | 9.08 |
| d22 | 0.37 | 5.76 | 10.92 |

TABLE 9

Numerical Embodiment 9 f = 33.17296  fno = 1:1.7~2  2ω = 51.6°~40.8°

| | | | | | | |
|---|---|---|---|---|---|---|
| r 1 = | 135.349 | d 1 = | 5.31 | n 1 = 1.62299 | ν 1 = 58.2 | |
| r 2 = | −261.785 | d 2 = | 0.19 | | | |
| r 3 = | 77.542 | d 3 = | 2.20 | n 2 = 1.60311 | ν 2 = 60.6 | |
| r 4 = | 27.887 | d 4 = | 10.80 | | | |
| r 5 = | −52.176 | d 5 = | 1.70 | n 3 = 1.51633 | ν 3 = 64.1 | |
| r 6 = | 68.068 | d 6 = | 6.19 | | | |
| r 7 = | 118.172 | d 7 = | 2.49 | n 4 = 1.83400 | ν 4 = 37.2 | |
| r 8 = | −3983.315 | d 8 = | Variable | | | |
| r 9 = | 92.714 | d 9 = | 3.90 | n 5 = 1.83400 | ν 5 = 37.2 | |
| r10 = | −70.519 | d10 = | 1.01 | | | |
| r11 = | −43.867 | d11 = | 1.30 | n 6 = 1.74077 | ν 6 = 27.8 | |
| r12 = | −338.058 | d12 = | Variable | | | |
| r13 = | 45.470 | d13 = | 4.97 | n 7 = 1.71300 | ν 7 = 53.9 | |
| r14 = | −96.933 | d14 = | 4.53 | | | |
| r15 = | ∞ | d15 = | Variable | | | |

TABLE 9-continued

Numerical Embodiment 9 f = 33.17296   fno = 1:1.7~2   2ω = 51.6°~40.8°

|  | Stop | d15 = |  |  |
|---|---|---|---|---|
| r16 = | 54.871 | d16 = | 1.10 | n 8 = 1.51823  ν 8 = 58.9 |
| r17 = | 23.723 | d17 = | Variable |  |
| r18 = | −18.008 | d18 = | 1.50 | n 9 = 1.76182  ν 9 = 26.5 |
| r19 = | 124.892 | d19 = | 8.40 | n10 = 1.51633  ν10 = 64.1 |
| r20 = | −24.775 | d20 = | 0.19 |  |
| r21 = | −162.271 | d21 = | 5.63 | n11 = 1.69680  ν11 = 55.5 |
| r22 = | −37.421 | d22 = | Variable |  |
| r23 = | 62.739 | d23 = | 6.63 | n12 = 1.78590  ν12 = 44.2 |
| r24 = | −217.192 | d24 = | 15.00 |  |
| r25 = | ∞ | d25 = | 32.00 | n13 = 1.51633  ν13 = 64.1 |

TABLE 9-continued

Numerical Embodiment 9 f = 33.17296   fno = 1:1.7~2   2ω = 51.6°~40.8°

| r26 = | ∞ |  |  |
|---|---|---|---|

| Variable | Focal Length | | |
|---|---|---|---|
| Distance | 33.17 | 38.17 | 43.13 |
| d 8 | 12.03 | 5.70 | 0.93 |
| d12 | 4.40 | 2.80 | 0.97 |
| d15 | 4.96 | 6.56 | 8.45 |
| d17 | 11.67 | 12.05 | 11.88 |
| d22 | 0.89 | 6.85 | 11.73 |

TABLE 10

Numerical Embodiment 10 f = 33.19405   fno = 1:1.7~2   2ω = 51.6°~40.8°

| r1 = | 108.157 | d1 = | 5.58 | n1 = 1.65844 | ν1 = 50.9 |
|---|---|---|---|---|---|
| r2 = | −358.099 | d2 = | 0.19 | | |
| r3 = | 90.704 | d3 = | 2.20 | n2 = 1.60311 | ν2 = 60.6 |
| r4 = | 27.248 | d4 = | 10.73 | | |
| r5 = | −55.302 | d5 = | 1.70 | n3 = 1.51633 | ν3 = 64.1 |
| r6 = | 79.866 | d6 = | 5.12 | | |
| r7 = | 118.279 | d7 = | 2.33 | n4 = 1.83400 | ν4 = 37.2 |
| r8 = | 1135.971 | d8 = Variable | | | |
| r9 = | 89.780 | d9 = | 3.90 | n5 = 1.83400 | ν5 = 37.2 |
| r10 = | −68.809 | d10 = | 1.18 | | |
| r11 = | −39.730 | d11 = | 1.30 | n6 = 1.69895 | ν6 = 30.1 |
| r12 = | −8466.357 | d12 = Variable | | | |
| r13 = | 54.067 | d13 = | 5.15 | n7 = 1.69680 | ν7 = 55.5 |
| r14 = | −67.922 | d14 = | 3.54 | | |
| r15 = | ∞ Stop | d15 = Variable | | | |
| r16 = | 45.413 | d16 = | 1.10 | n8 = 1.51633 | ν8 = 64.1 |
| r17 = | 24.513 | d17 = Variable | | | |
| r18 = | −17.844 | d18 = | 1.50 | n9 = 1.76182 | ν9 = 26.5 |
| r19 = | 169.940 | d19 = | 8.24 | n10 = 1.51633 | ν10 = 64.1 |
| r20 = | −24.607 | d20 = | 0.19 | | |
| r21 = | −107.661 | d21 = | 5.47 | n11 = 1.69680 | ν11 = 55.5 |
| r22 = | −34.760 | d22 = Variable | | | |
| r23 = | 57.170 | d23 = | 6.63 | n12 = 1.78590 | ν12 = 44.2 |
| r24 = | −341.017 | d24 = | 15.00 | | |
| r25 = | ∞ | d25 = | 32.00 | n13 = 1.51633 | ν13 = 64.1 |
| r26= | ∞ | | | | |

| Variable | Focal Length | | |
|---|---|---|---|
| Distance | 33.19 | 38.02 | 43.14 |
| d 8 | 13.16 | 7.64 | 3.48 |
| d 12 | 5.34 | 3.36 | 0.97 |
| d 15 | 9.13 | 11.43 | 14.25 |
| d 17 | 8.96 | 8.64 | 8.22 |
| d 22 | 0.96 | 6.48 | 10.64 |

TABLE 11

Numerical Embodiment 11 f = 28.69934   fno = 1:2~2.2   2ω = 47°~40.2°

| r1 = | 309.395 | d1 = | 3.35 | n1 = 1.65844 | ν1 = 50.9 |
|---|---|---|---|---|---|
| r2 = | −188.927 | d2 = | 0.19 | | |
| r3 = | 51.996 | d3 = | 2.20 | n2 = 1.60311 | ν2 = 60.6 |
| r4 = | 24.057 | d4 = | 8.80 | | |

TABLE 11-continued

Numerical Embodiment 11 f = 28.69934          fno = 1:2~2.2          2ω = 47°~40.2°

| | | | | | | |
|---|---|---|---|---|---|---|
| r5 = | −46.400 | d5 = | 1.70 | n3 = 1.51633 | ν3 = 64.1 |
| r6 = | 206.471 | d6 = | 3.03 | | |
| r7 = | 82.675 | d7 = | 1.80 | n4 = 1.83400 | ν4 = 37.2 |
| r8 = | 170.474 | d8 = Variable | | | |
| r9 = | 71.248 | d9 = | 3.51 | n5 = 1.79952 | ν5 = 42.2 |
| r10 = | −71.248 | d10 = | 0.91 | | |
| r11 = | −38.872 | d11 = | 1.30 | n6 = 1.69895 | ν6 = 30.1 |
| r12 = | −138.142 | d12 = Variable | | | |
| r13 = | 37.928 | d13 = | 4.18 | n7 = 1.69680 | ν7 = 55.5 |
| r14 = | −92.148 | d14 = | 3.95 | | |
| r15 = | ∞ | Stop d15 = Variable | | | |
| r16 = | 76.399 | d16 = | 1.10 | n8 = 1.51633 | ν8 = 64.1 |
| r17 = | 20.701 | d17 = Variable | | | |
| r18 = | −15.886 | d18 = | 1.55 | n9 = 1.76182 | ν9 = 26.5 |
| r19 = | 169.542 | d19 = | 8.27 | n10 = 1.51633 | ν10 = 64.1 |
| r20 = | −21.741 | d20 = | 0.19 | | |
| r21 = | −241.004 | d21 = | 5.43 | n11 = 1.69680 | ν11 = 55.5 |
| r22 = | −39.919 | d22 = Variable | | | |
| r23 = | 77.964 | d23 = | 6.17 | n12 = 1.78590 | ν12 = 44.2 |
| r24 = | −117.685 | d24 = | 15.00 | | |
| r25 = | ∞ | d25 = | 32.00 | n13 = 1.51633 | ν13 = 64.1 |
| r26 = | ∞ | | | | |

| Variable Distance | Focal Length | | |
|---|---|---|---|
| | 36.52 | 40.40 | 43.81 |
| d 8 | 8.59 | 4.08 | 0.67 |
| d 12 | 2.03 | 1.51 | 0.99 |
| d 15 | 2.85 | 3.80 | 4.74 |
| d 17 | 12.17 | 12.41 | 12.25 |
| d 22 | 0.59 | 4.42 | 7.56 |

TABLE 12

Numerical Embodiment 12 f = 28.71816          fno = 1:2~2.15          2ω = 47°~40.2°

| | | | | | |
|---|---|---|---|---|---|
| r1 = | 81.939 | d1 = | 3.56 | n1 = 1.69680 | ν1 = 55.5 |
| r2 = | −184.657 | d2 = | 0.15 | | |
| r3 = | 59.099 | d3 = | 1.25 | n2 = 1.49700 | ν2 = 81.5 |
| r4 = | 18.435 | d4 = | 6.76 | | |
| r5 = | −37.784 | d5 = | 1.05 | n3 = 1.60311 | ν3 = 60.6 |
| r6 = | −211.938 | d6 = Variable | | | |
| r7 = | 51.032 | d7 = | 2.58 | n4 = 1.83400 | ν4 = 37.2 |
| r8 = | −66.105 | d8 = | 1.36 | | |
| r9 = | −26.535 | d9 = | 0.95 | n5 = 1.59551 | ν5 = 39.2 |
| r10 = | −965.558 | d10 = Variable | | | |
| r11 = | 32.606 | d11 = | 3.49 | n6 = 1.69890 | ν6 = 55.5 |
| r12 = | −46.656 | Stop d12 = Variable | | | |
| r13 = | 57.031 | d13 = | 0.75 | n7 = 1.59551 | ν7 = 39.2 |
| r14 = | 18.369 | d14 = Variable | | | |
| r15 = | −12.626 | d15 = | 1.20 | n8 = 1.69895 | ν8 = 30.1 |
| r16 = | 98.834 | d16 = | 6.67 | n9 = 1.49700 | ν9 = 81.5 |
| r17 = | −17.485 | d17 = | 0.15 | | |
| r18 = | −93.906 | d18 = | 4.00 | n10 = 1.69680 | ν10 = 55.5 |
| r19 = | −29.798 | d19 = Variable | | | |
| r20 = | 56.671 | d20 = | 4.66 | n11 = 1.80400 | ν11 = 46.6 |
| r21 = | −112.106 | d21 = | 12.00 | | |
| r22 = | ∞ | d22 = | 26.00 | n12 = 1.51633 | ν12 = 64.1 |
| r23 = | ∞ | d23 = | 0.00 | | |
| r24 = | ∞ | d24 = | 0.70 | n13 = 1.76000 | ν13 = 55.0 |
| r25 = | ∞ | d25 = | 0.00 | | |
| r26 = | ∞ | d26 = | 0.20 | n14 = 1.50000 | ν14 = 65.0 |
| r27 = | ∞ | d27 = | 0.00 | | |
| r28 = | ∞ | d28 = | 2.30 | n15 = 1.49000 | ν15 = 65.0 |
| r29 = | ∞ | | | | |

TABLE 12-continued

Numerical Embodiment 12 f =28.71816  fno =1:2~2.15  2ω = 47°~40.2°

| Variable | Focal Length | | |
|---|---|---|---|
| Distance | 28.72 | 31.56 | 34.16 |
| d 6 | 10.89 | 7.41 | 4.78 |
| d 10 | 1.97 | 1.61 | 1.13 |
| d 12 | 3.66 | 4.56 | 5.41 |
| d 14 | 9.08 | 8.75 | 8.48 |
| d 19 | 0.43 | 3.69 | 6.22 |

TABLE 13

Numerical Embodiment 13 f = 33.20866  fno = 1:1.7~2  2ω = 51.6°~40.8°

| r1 = | 208.880 | d1 = | 4.53 | n1 = 1.62299 | v1 = 58.2 |
|---|---|---|---|---|---|
| r2 = | −203.535 | d2 = | 0.19 | | |
| r3 = | 77.886 | d3 = | 2.20 | n2 = 1.60311 | v2 = 60.6 |
| r4 = | 29.019 | d4 = | 10.28 | | |
| r5 = | −51.129 | d5 = | 1.70 | n3 = 1.51633 | v3 = 64.1 |
| r6 = | 72.055 | d6 = | 6.42 | | |
| r7 = | 155.180 | d7 = | 2.38 | n4 = 1.83400 | v4 = 37.2 |
| r8 = | −460.590 | d8 = Variable | | | |
| r9 = | 91.883 | d9 = | 4.03 | n5 = 1.83400 | v5 = 37.2 |
| r10 = | −70.037 | d10 = | 0.84 | | |
| r11 = | −44.031 | d11 = | 1.30 | n6 = 1.74077 | v6 = 27.8 |
| r12 = | −373.716 | d12 = Variable | | | |
| r13 = | 49.461 | d13 = | 5.11 | n7 = 1.71300 | v7 = 53.9 |
| r14 = | −89.177 | d14 = | 2.92 | | |
| r15 = | Stop | d15 = Variable | | | |
| r16 = | 44.404 | d16 = | 1.10 | n8 = 1.51823 | v8 = 58.9 |
| r17 = | 23.468 | d17 = Variable | | | |
| r18 = | −19.174 | d18 = | 1.50 | n9 = 1.76182 | v9 = 26.5 |
| r19 = | 83.649 | d19 = | 9.55 | n10 = 1.51633 | v10 = 64.1 |
| r20 = | −26.279 | d20 = | 0.19 | | |
| r21 = | −115.308 | d21 = | 4.86 | n11 = 1.69680 | v11 = 55.5 |
| r22 = | −38.499 | d22 = Variable | | | |
| r23 = | 62.358 | d23 = | 6.48 | n12 = 1.78590 | v12 = 44.2 |
| r24 = | −202.353 | d24 = | 15.00 | | |
| r25 = | ∞ | d25 = | 82.00 | n13 = 1.51633 | v13 = 64.1 |
| r26 = | ∞ | | | | |

| Variable | Focal Length | | |
|---|---|---|---|
| Distance | 33.21 | 38.24 | 43.14 |
| d 8 | 13.91 | 7.37 | 2.43 |
| d 12 | 4.59 | 3.15 | 1.57 |
| d 15 | 8.43 | 10.10 | 12.11 |
| d 17 | 9.15 | 9.47 | 9.23 |
| d 22 | 0.80 | 6.80 | 11.54 |

What is claimed is:

1. An optical system comprising in order from an enlargement conjugate side,
   a first lens unit,
   a second lens unit,
   a third lens unit,
   a fourth lens unit,
   a fifth lens unit, and
   a sixth lens unit,
   wherein at least four lens units out of said plurality of lens units move during zooming and said first lens unit has a negative refractive power,
   wherein each space between said plurality of lens units is changed when said four lens units are moved for said zooming.

2. The optical system according to claim 1, wherein during zooming the lens unit closest to the enlargement conjugate side and the lens unit closest to the reduction conjugate side both are fixed relative to a reduction-side conjugate point.

3. The optical system according to claim 1, which comprises at least one optical element having an aspherical surface.

4. The optical system according to claim 1, which comprises at least one optical element comprised of a material with an Abbe's number of not less than 80.

5. The optical system according to claim 1, wherein during zooming at least two movable lens units integrally move.

6. The optical system according to claim 5, wherein said second lens unit and said fifth lens unit integrally move during zooming.

7. The optical system according to claim 1, wherein said second lens unit has a positive optical power, said third lens unit a positive optical power, said fourth lens unit a negative optical power, and said sixth lens unit a positive optical power.

8. The optical system according to claim 1, wherein during zooming said second to fifth lens units move.

9. The optical system according to claim 8, wherein during zooming from a wideangle extreme to a telephoto extreme the second to fifth lens units all move toward the enlargement conjugate side.

10. The optical system according to claim 1, wherein the following condition is satisfied:

$$0.5 < -\beta 23w < 1.0,$$

where $-\beta 23w$ is a magnification at a wideangle extreme in combination of the second lens unit and the third lens unit.

11. The optical system according to claim 1, wherein the following condition is satisfied:

$$1.0 < \beta 4w < 5.0,$$

where $\beta 4w$ is a magnification at a wideangle extreme of the fourth lens unit.

12. The optical system according to claim 1, said optical system comprising a stop, wherein said stop is disposed in the second or third lens unit.

13. The optical system according to claim 12, wherein during zooming said stop moves integrally with said third lens unit.

14. The optical system according to claim 1, wherein at least one lens unit out of the first, fifth, and sixth lens units includes a lens unit having an aspherical surface.

15. The optical system according to claim 1, wherein the fifth lens unit comprises at least one biconcave lens element and at least two positive lens elements in the order named from the enlargement side.

16. The optical system according to claim 1, wherein the following condition is satisfied:

$$1.2 < f6/fw < 2.2,$$

where fw is a focal length of the entire system at a wideangle extreme and f6 is a focal length of the sixth lens unit.

17. The optical system according to claim 1, wherein focus adjustment is implemented by moving the first lens unit on the optical axis.

18. The optical system according to claim 1, wherein said third lens unit consists of one positive lens element.

19. The optical system according to claim 1, wherein said second lens unit comprises a positive lens element and a negative lens element having a stronger power on the enlargement conjugate side than on the reduction conjugate side, in the order named from the enlargement conjugate side.

20. The optical system according to claim 1, wherein said first lens unit comprises a biconvex lens element, a negative meniscus lens element being convex on the enlargement conjugate side, a negative lens element, and a positive lens element having a stronger power on the enlargement conjugate side than on the reduction conjugate side, in the order named from the enlargement conjugate side.

21. The optical system according to claim 1, wherein said first lens unit comprises a biconvex lens element, a negative meniscus lens element being convex on the enlargement conjugate side, and a negative lens element having a stronger power on the enlargement conjugate side than on the reduction conjugate side, in the order named from the enlargement conjugate side.

22. The optical system according to claim 1, wherein the following condition is satisfied:

$$0.02 < fw/f2 < 0.6,$$

where fw is a focal length at a wideangle extreme of the entire lens unit and f2 a focal length of said second lens unit.

23. The optical system according to claim 1, wherein the following condition is satisfied:

$$-1 < fw/f1 < -0.3,$$

where f1 is a focal length of said first lens unit and fw a focal length at a wideangle extreme of the entire optical system.

24. The optical system according to claim 1, wherein the following condition is satisfied:

$$0.45 < fw/f3 < 1.3,$$

where f3 is a focal length of said third lens unit and fw a focal length at a wideangle extreme of the entire optical system.

25. The optical system according to claim 1, wherein the following condition is satisfied:

$$-0.9 < fw/f4 < -0.1,$$

where f4 is a focal length of said fourth lens unit and fw a focal length at a wideangle extreme of the entire optical system.

26. The optical system according to claim 1, wherein the following condition is satisfied:

$$-0.15 < fw/f5 < 0.35,$$

where f5 is a focal length of said fifth lens unit and fw a focal length at a wideangle extreme of the entire optical system.

27. The optical system according to claim 1, wherein the following condition is satisfied:

$$0.2 < fw/f6 < 0.8,$$

where f6 is a focal length of said sixth lens unit and fw a focal length at a wideangle extreme of the entire optical system.

28. The optical system according to claim 1, wherein said fourth lens unit comprises one negative lens element having a stronger power on the reduction conjugate side than on the enlargement conjugate side.

29. The optical system according to claim 1, wherein said fifth lens unit comprises a negative lens element having a stronger power on the enlargement conjugate side than on the reduction conjugate side, a positive lens element having a stronger power on the reduction conjugate side than on the enlargement conjugate side, a positive lens element having a stronger power on the reduction conjugate side than on the enlargement conjugate side in the order named from the enlargement conjugate side.

30. The optical system according to claim 1, wherein said sixth lens unit comprises one positive lens element having a stronger power on the enlargement conjugate side than on the reduction conjugate side.

31. The optical system according to claim 1, wherein focus adjustment is implemented by moving said first lens unit along the optical axis.

32. The optical system according to claim 1, wherein the following condition is satisfied:

$$0.8 < bf/fw,$$

where bf is an air-reduced length between a reduction-side conjugate point and a surface closest to the reduction conjugate side in the lens unit closest to the reduction conjugate side out of said at least six lens units when an enlargement-side conjugate point is at infinity from said optical system, and fw a focal length at a wideangle extreme of the entire optical system.

33. The optical system according to claim 1, wherein the following conditions are satisfied:

$$0.2 < M2/M3 < 1,$$

$$0.4 < M4/M3 < 1,$$

$$0.4 < M5/M3 < 1,$$

where M2 is a moving distance of the second lens unit during zooming from a wideangle extreme to a telephoto extreme, M3 a moving distance of the third lens unit during the zooming from the wideangle extreme to the telephoto extreme, M4 a moving distance of the fourth lens unit during the zooming from the wideangle extreme to the telephoto extreme, and M5 a moving distance of the fifth lens unit during the zooming from the wideangle extreme to the telephoto extreme.

34. The optical system according to claim 1. wherein during zooming from a wideangle extreme to a telephoto extreme, a spacing between the first lens unit and second lens unit decreases, a spacing between the second lens unit and third lens unit decreases, a spacing between the third lens unit and fourth lens unit increases, and a spacing between the fifth lens unit and sixth lens unit increases.

35. The optical system according to claim 1, wherein the following condition is satisfied:

$$|fw/tkw| < 0.25,$$

where fw is a focal length at a wideangle extreme of the entire optical system and tkw a distance between a reduction-side conjugate point at the wideangle extreme and a position of a reduction-side pupil.

36. The optical system according to claim 1, wherein a full-aperture F-value at a wideangle extreme of the optical system is not more than 2.3.

37. The optical system according to claim 1, wherein a full-aperture F-value at a wideangle extreme of the optical system is not more than 2.0.

38. An image projection apparatus comprising:

an image forming element for forming an image, and the optical system as set forth in claim 1, wherein the image formed by said image forming element located at a reduction-side conjugate point of said optical system is enlarged and projected.

39. The image projection apparatus according to claim 38, wherein said image forming element is a liquid crystal display device.

40. An image pickup apparatus comprising:

the optical system as set forth in claim 1, and a photosensitive member disposed at a reduction-side conjugate point of said optical system, wherein an image of an object is projected onto said photosensitive member disposed at the reduction-side conjugate point, using said optical system.

* * * * *